United States Patent
Eguchi

(10) Patent No.: US 9,787,962 B2
(45) Date of Patent: Oct. 10, 2017

(54) ACCELERATED SUPER-RESOLUTION PROCESSING METHOD FOR TV VIDEO IMAGES, ACCELERATED SUPER-RESOLUTION PROCESSING DEVICE FOR TV VIDEO IMAGES THAT IS USED IN SAME METHOD, FIRST TO SIXTH ACCELERATED SUPER-RESOLUTION PROCESSING PROGRAMS, AND FIRST TO SECOND STORAGE MEDIA

(71) Applicant: Lightron International Co., Ltd., Saitama (JP)

(72) Inventor: Mitsuo Eguchi, Saitama (JP)

(73) Assignee: Lightron International Co., Ltd., Saita, ashi Saitama (JP)

( * ) Notice: Subject to any disclaimer, the term of this patent is extended or adjusted under 35 U.S.C. 154(b) by 0 days.

(21) Appl. No.: 15/103,349

(22) PCT Filed: Nov. 27, 2014

(86) PCT No.: PCT/JP2014/081474
§ 371 (c)(1),
(2) Date: Jun. 10, 2016

(87) PCT Pub. No.: WO2015/087712
PCT Pub. Date: Jun. 18, 2015

(65) Prior Publication Data
US 2016/0366387 A1 Dec. 15, 2016

(30) Foreign Application Priority Data
Dec. 11, 2013 (JP) .................................. 2013-255951

(51) Int. Cl.
H04N 7/01 (2006.01)
H04N 9/64 (2006.01)
(Continued)

(52) U.S. Cl.
CPC ............ *H04N 9/646* (2013.01); *G06T 5/003* (2013.01); *H04N 5/208* (2013.01); *H04N 5/21* (2013.01);
(Continued)

(58) Field of Classification Search
CPC .. H04N 9/646; H04N 5/57; H04N 5/21; H04N 7/0125; H04N 7/01; H04N 7/0117;
(Continued)

(56) References Cited

U.S. PATENT DOCUMENTS

| 2008/0095358 A1 | 4/2008 | Eguchi et al. ................. 348/28 |
| 2012/0105655 A1 | 5/2012 | Ishii et al. ................ 348/208.4 |
| 2012/0314093 A1 | 12/2012 | Tamayama et al. ....... 348/208.1 |

FOREIGN PATENT DOCUMENTS

| JP | 2013-3610 A | 1/2013 |
| JP | 2013-175003 A | 9/2013 |

(Continued)

Primary Examiner — Sherrie Hsia
(74) Attorney, Agent, or Firm — Harrington & Smith

(57) ABSTRACT

A 70,000-gate device and method which provide substantially real-time TV video images that are similar to pre-degradation original images by: setting luminance distribution of a degraded image and an estimated luminance distribution of initial values of a reconstructed image for one frame of TV video images; using a first PSF luminance distribution in a first-time iterative calculation, said first PSF luminance distribution having been specified in accordance with the degree of degradation of the degraded image; using a second PSF luminance distribution in a second-time iterative calculation; and while setting a reconstructed image estimated luminance distribution from the first-time iterative calculation as a second-time estimated luminance distribution of the initial values of the reconstructed image, performing the second-time iterative calculation in an image reconstructioner which determines, in the luminance distribution of the degraded image, the most likely estimated
(Continued)

luminance distribution of the reconstructed image based on the Bayse probability theorem.

22 Claims, 34 Drawing Sheets

(51) Int. Cl.
*H04N 5/21* (2006.01)
*G06T 5/00* (2006.01)
*H04N 5/57* (2006.01)
*H04N 5/208* (2006.01)

(52) U.S. Cl.
CPC ..... *H04N 5/57* (2013.01); *G06T 2207/10016* (2013.01)

(58) Field of Classification Search
CPC .......... H04N 9/64; H04N 11/20; G06T 5/003; G06T 2207/10016; G06T 3/4053; G06T 3/4076
USPC ....... 348/625, 630, 631, 441, 459, 453, 575; 382/162, 167, 254
See application file for complete search history.

(56) References Cited

FOREIGN PATENT DOCUMENTS

| WO | WO 2006/041126 A1 | 4/2006 |
| WO | WO 2011/099244 A1 | 8/2011 |

AFTER IMAGE RESTORATION PROCESSING

BEFORE IMAGE RESTORATION PROCESSING

ACCELERATED SUPER-RESOLUTION PROCESSING METHOD FOR TV VIDEO IMAGES, ACCELERATED SUPER-RESOLUTION PROCESSING DEVICE FOR TV VIDEO IMAGES THAT IS USED IN SAME METHOD, FIRST TO SIXTH ACCELERATED SUPER-RESOLUTION PROCESSING PROGRAMS, AND FIRST TO SECOND STORAGE MEDIA

TECHNICAL FIELD

The present invention relates to image processing of TV video. In particular, the present invention relates to TV-video accelerated super-resolution processing methods, TV-video accelerated super-resolution processing devices using the same, first to sixth accelerated super-resolution processing programs, and first and second storage media for restoring degraded TV video to pre-degradation TV video by removing degraded information included in TV video, such as optical blurring or unsharpness, by way of mathematical computational processing based on Bayse probability theory.

BACKGROUND ART

TV video is composed of 30 or more still images per second, referred to as frames. There is a problem in that each frame, whether digital or analog, includes degraded information, such as optical blurring or unsharpness, even if it is not blurred to such an extent that it becomes unclear.

FIG. 1 shows an example of degraded information included in a frame of actual TV video. FIG. 1 includes two images: the left image represents a frame composed only of Y (luminance components) of TV video acquired by using an X-ray pinhole camera; on the other hand, the right image represents an image in which degraded information has been reduced by subjecting the left image in FIG. 1 to super-resolution processing using related art invented by the inventor of the present invention (Patent Literatures 1 and 2). A comparison between the images in FIG. 1 indicates that actual TV video includes degraded information, such as optical blurring or unsharpness.

In the image restoration technologies invented by the inventor of the present invention (Patent Literatures 1 and 2), while repeating iterations according to formulas based on Bayse probability theory by using information about one still image including degraded information, such as optical blurring or unsharpness, a maximum-likelihood degradation factor and a maximum-likelihood restored image, i.e., an image after super-resolution processing, having a maximum likelihood for the luminance distribution of the still image are obtained through numerical computations. However, since a huge amount of computational processing is required for this calculation, there has been a problem in that it is difficult to handle TV video, which requires real-time processing.

There has been a problem with the image restoration technologies invented by the inventor of the present invention (Patent Literatures 1 and 2) in that they require a large scale of computation and are not suitable for substantially real-time processing since complex numbers are handled in the computation. In order to solve this problem, in a technology for which a patent application has been filed, the inventor of the present invention has changed the type of numbers handled in the computation from complex numbers to real numbers and proposed a hardware implementation using FPGAs (Field Programmable Gate Arrays), allowing substantially real-time processing. However, there have been problems in that the number of gates in the hardware implementation is as large as 1.5 million gates, and thus, costs are high and the installation area is large.

Another type of conventional super-resolution technology for TV video is a "super-resolution reconstruction" method (Patent Literatures 3 and 4), in which attention is paid to a certain object existing in a plurality of frames constituting TV video and the positions of that object are aligned to superimpose the plurality of frames, thereby realizing super resolution, which is a method that has been introduced into products. However, in a case where the size of the object considerably varies or where such an object is not included in a plurality of frames, such as in a scene involving intense motion or in a scene involving frequent zoom-ins or zoom-outs, there has been a problem in that super-resolution based on "super-resolution reconstruction" methods is not possible.

As another method, in a method described in Non-Patent Literature 1, Bayes statistical processing is executed on the basis of a plurality of successive still images acquired by using video cameras from mutually slightly different viewpoints, thereby obtaining a super-resolution still image. However, this method requires a large amount of memory for constantly storing a plurality of still images including degraded information. Furthermore, in order to obtain a still image having super-resolution, it is necessary to constantly process a plurality of still images. This requires a huge amount of computation as well as requiring a large amount of memory, which prohibits processing of TV video.

LIST OF PRIOR ART DOCUMENTS

Patent Literature

{PTL 1}
International Publication No.: Japanese Patent Publication No. 4568730 (WO2006/041127)
{PTL 2}
International Publication No.: Japanese Patent No. 4575387 (WO2006/041126)
{PTL3}
Japanese Unexamined Patent Application, Publication No. 2009-296410
{PTL4}
Japanese Unexamined Patent Application, Publication No. 2009-100407

Non Patent Literature

{NPL 1}
Atsunori Kanemura et al., "Bayesian Image Superresolution and Its Hierarchical Extensions," The Brain and Neural Networks, vol. 15, No. 3 (2008), 181-192

SUMMARY OF INVENTION

Problem to be Solved by Invention

With any of the methods described in Patent Literatures 1 to 4 and Non-Patent Literature 1, there has been a problem in that it is not possible to execute super-resolution processing of TV video on the basis of only information about a frame including degraded information, such as optical blurring or unsharpness.

In order to solve this problem, the inventor of the present application invented and filed a patent application for TV-video super-resolution processing methods and TV-video super-resolution processing devices that allow substantially real-time processing by changing the type of numbers handled in the computation in the image restoration technologies invented by himself (Patent Literatures 1 and 2) from complex numbers to real numbers and adopting a hardware implementation using FPGAs. However, there have been problems in that the number of gates in the FPGA implementation in the form of an LSI (Large Scale Integration) is as large as 1.5 million gates, and thus, costs are high and the installation area is large.

Accordingly, it is an object of the present invention to provide TV-video accelerated super-resolution processing methods, TV-video accelerated super-resolution processing devices using the same, first to sixth accelerated super-resolution processing programs, and first and second storage media for solving these problems and allowing super-resolution processing of TV video.

Solution to Problem

In order to solve the problems described above, the present invention provides a TV-video accelerated super-resolution processing method using an accelerated algorithm newly invented by the inventor of the present invention, a TV-video accelerated super-resolution processing device based on the method, first to sixth accelerated super-resolution processing programs, and first and second storage media. In this accelerated algorithm, since iterations are executed in an accelerated manner, a small number of iterations suffices. Thus, compared with the algorithm used in the TV-video super-resolution processing method invented by the inventor of the present invention and for which a patent application has been filed, it becomes possible to considerably reduce the number of processing steps.

A first invention according to the present invention relates to a TV-video accelerated super-resolution processing method for reducing optical degradation from a frame included in single-frame TV video signals to restore the degraded TV video signals to the pre-degradation single-frame TV video signals. The TV-video accelerated super-resolution processing method of the first invention according to the present invention is characterized by including (S1) a step of setting a maximum number of iterations; (S2) a degradation-index designating step of designating a degradation index suitable for a degradation state of the TV video while the TV video is being viewed; (S3) a PSF (Point Spread Function) preparing step of preparing a first PSF luminance distribution associated with the degradation index and a series of PSF luminance distributions derived from the first PSF luminance distribution and organized in association with numbers of iterations; (S4) a degraded-image preparing step of preparing, from single-frame TV video signals, a luminance distribution of a degraded image constituted of a single-frame luminance distribution; (S5) a restored-image-initial-value preparing step of setting the luminance distribution of the degraded image as an estimated luminance distribution of restored-image initial values; (S6) a PSF-size obtaining step of obtaining a PSF size, the PSF size referring to an image size that is the same among the series of PSF luminance distributions; (S7) a first resetting step of setting a counter that counts the number of iterations to 1; (S8) a first restored-image-initial-value correcting step of copying the estimated luminance distribution of the restored-image initial values, setting the estimated luminance distribution as an estimated luminance distribution of corrected-restored-image initial values, and correcting the estimated luminance distribution of the corrected-restored-image initial values on the basis of the PSF size; (S9) a PSF selecting step of selecting one PSF luminance distribution associated with the value of the counter from the series of PSF luminance distributions and setting the selected one as a PSF luminance distribution; (S10) a step of convolving the estimated luminance distribution of the corrected-restored-image initial values with the PSF luminance distribution to obtain a first function; (S11) a step of inverting the first function to obtain a second function; (S12) a step of multiplying the second function by the luminance distribution of the degraded image to obtain a third function; (S13) a step of multiplying the estimated luminance distribution of the restored-image initial values by the third function to obtain an estimated luminance distribution of a restored image; (S14) a step of incrementing the counter by 1; (S15) a step of testing a hypothesis that the value of the counter is greater than or equal to the maximum number of iterations, proceeding to step (S16) if the test result is false, and proceeding to step (S18) if the test result is true; (S16) a step of substituting the estimated luminance distribution of the restored image for the estimated luminance distribution of the restored-image initial values; (S17) a step of returning to step (S8); (S18) a step of outputting the estimated luminance distribution of the restored image as a luminance distribution of a maximum-likelihood restored image; (S19) a preparing step constituted of steps (S1) to (S7); (S20) a first image restoring step constituted of steps (S8) to (S18), and the TV-video accelerated super-resolution processing method is also characterized by including (S21) a first accelerated super-resolution processing step of completing the maximum number of iterations by executing iterations in ascending order of the index on S of steps in the preparing step S19 and the first image restoring step S20 and outputting the luminance distribution of the maximum-likelihood restored image; and (S22) a TV-video rendering step of rendering the luminance distribution of the maximum-likelihood restored image into single-frame TV video signals and outputting the TV video signals as super-resolution TV video signals. The first invention is the same as the invention described in Claim 1.

A second invention according to the present invention relates to a second aspect of the PSF preparing step constituting the TV-video accelerated super-resolution processing method of the first invention. The second aspect of the PSF preparing step is characterized by including (S30) a step of searching, by using the degradation index, a PSF database created by organizing PSF luminance distributions in one-to-one association with degradation indices and setting a hit PSF luminance distribution as a first PSF luminance distribution; (S31) a step of inputting 1 to and thereby resetting a second counter that counts numbers; (S32) a step of setting the first PSF luminance distribution as a luminance distribution of PSF initial values; (S33) a step of incrementing the second counter by 1; (S34) a step of testing a hypothesis that the value of the second counter has exceeded the maximum number of iterations, proceeding to step (S35) if the test result is false, and jumping to step (S38) if the test result is true; (S35) a step of restoring a luminance distribution of PSF initial values through a PSF restoring step to obtain a luminance distribution of a maximum-likelihood restored PSF; (S36) a step of setting the luminance distribution of the maximum-likelihood restored PSF as an n-th PSF luminance distribution, where n signifies the value of the second counter; (S37) a step of returning to step (S33); and (S38) a step of connecting the first PSF luminance distribution to the n_max-th PSF luminance distribution in that order to form a series of PSF luminance distributions, where n_max signifies the maximum number of iterations and n signifies a natural number less than n_max, and labeling the series of PSF luminance distributions with the degradation indices to create the series of PSF luminance distributions associated with the degradation indices. The second invention is the same as the invention described in Claim 2.

A third invention according to the present invention relates to a third aspect of the PSF preparing step constituting the TV-video accelerated super-resolution processing method of the first invention. The third aspect of the PSF preparing step is characterized by including: (S40) a step of setting the maximum number of iterations to 5; (S41) a step of executing the PSF preparing step in advance for all the pairs of degradation indices and PSF luminance distributions associated therewith in the PSF database to obtain a series of PSF luminance distributions for each of the degradation indices and editing the series of PSF luminance distributions for each of the degradation indices to prepare an extended PSF database in which the series of PSF luminance distributions is organized in association with the degradation indices; and (S42) a step of searching the extended PSF database by using the degradation index and retrieving and outputting a hit series of PSF luminance distributions. The third invention is the same as the invention described in Claim 3.

A fourth invention according to the present invention relates to a PSF restoring step constituting the second aspect of the PSF preparing step of the second invention. The PSF restoring step is characterized by including (S50) a step of assigning 6 to the maximum number of iterations; (S51) a step of considering the luminance distribution of the PSF initial values as a luminance distribution of a degraded image and setting the luminance distribution as a degraded PSF luminance distribution; (S52) a step of setting the luminance distribution of the PSF initial values as an estimated luminance distribution of restored PSF initial values; (S53) a step of assigning 1 to and thereby resetting the counter; (S54) a restored-PSF-initial-value correcting step of setting the estimated luminance distribution 20 of the restored-PSF initial values as an estimated luminance distribution 21 of corrected-restored-PSF initial values and, when convolving the luminance distribution 15 of the PSF initial values with the estimated luminance distribution 21 of the corrected-restored-PSF initial values, calculating a region where computation is difficult, the region occurring in a peripheral region in the estimated luminance distribution 21 of the corrected-restored-PSF initial values, on the basis of the image size of the luminance distribution 15 of the PSF initial values, copying the pixels associated with a top-edge boundary in the region where computation is difficult, pasting the copied pixels to the outside of the top-edge boundary of the estimated luminance distribution 21 of the corrected-restored-PSF initial values in mirror symmetry with respect to the top-edge boundary, and executing similar computations clockwise for a right edge, a bottom edge, and finally a left edge, thereby correcting the estimated luminance distribution 21 of the corrected-restored-PSF initial values; (S55) a step of convolving the luminance distribution of the PSF initial values with the estimated luminance distribution of the corrected-restored-PSF initial values to obtain a fourth function; (S56) a step of inverting the fourth function to obtain a fifth function; (S57) a step of multiplying the fifth function by the degraded PSF luminance distribution to obtain a sixth function; (S58) a step of multiplying the estimated luminance distribution of the restored-PSF initial values by the sixth function to obtain an estimated luminance distribution of a restored PSF; (S59) a step of incrementing the counter by 1; (S60) a step of testing a hypothesis that the value of the counter has exceeded the maximum number of iterations, proceeding to step (S61) if the test result is false, and jumping to step (S63) if the test result is true; (S61) a step of substituting the estimated luminance distribution of the restored PSF for the estimated luminance distribution of the restored-PSF initial values; (S62) a step of jumping to step (S54); and (S63) a step of outputting the estimated luminance distribution of the restored PSF as a luminance distribution of a maximum-likelihood restored PSF. The fourth invention is the same as the invention described in Claim 4.

A fifth invention according to the present invention relates to the first restored-image-initial-value correcting step constituting the TV-video accelerated super-resolution processing method if the first invention. The first restored-image-initial-value correcting step is characterized by including (S70) a step of setting the estimated luminance distribution of the restored-image initial values as an estimated luminance distribution of corrected-restored-image initial values; (S71) a step of calculating, on the basis of the PSF size, a region where computation is difficult, the region occurring in a peripheral region in the estimated luminance distribution of the corrected-restored-image initial values when convolving one of the series of PSF luminance distributions with the estimated luminance distribution of the corrected-restored-image initial values; (S72) a step of copying the pixels in the region where computation is difficult in the estimated luminance distribution of the corrected-restored-image initial values, individually inverting the copied pixels in mirror symmetry with respect to the four edges of the estimated luminance distribution of the corrected-restored-image initial values, and pasting the pixels to the outside of the boundaries at the four edges of the estimated luminance distribution of the corrected-restored-image initial values to correct the estimated luminance distribution; (S73) a step of copying the pixels in a top-left corner region in the region where computation is difficult in the estimated luminance distribution of the corrected-restored-image initial values, rotating the copied pixels in the top-left corner region by 180 degrees about the vertex at the top-left corner, and pasting the pixels to a blank region generated in the top-left corner region of the estimated luminance distribution of the corrected-restored-image initial values to correct the estimated luminance distribution; (S74) a step of copying the pixels in a top-right corner region in the region where computation is difficult in the estimated luminance distribution of the corrected-restored-image initial values, rotating the copied pixels in the top-right corner region by 180 degrees about the vertex at the top-right corner, and pasting the pixels to a blank region generated in the top-right corner region of the estimated luminance distribution of the corrected-restored-image initial values to correct the estimated luminance distribution; (S75) a step of copying the pixels in a bottom-left corner region in the region where computation is difficult in the estimated luminance distribution of the corrected-restored-image initial values, rotating the copied pixels in the bottom-left corner region by 180 degrees about the vertex at the top-left corner, and pasting the pixels to a blank region generated in the bottom-left corner region of the estimated luminance distribution of the corrected-restored-image initial values to correct the estimated luminance distribution; and (S76) a step of copying the pixels in a bottom-right corner region in the region where computation is difficult in the estimated luminance distribution of the corrected-restored-image initial values, rotating the copied pixels in the bottom-right corner region by 180 degrees about the vertex at the top-right corner, and pasting the pixels to a blank region generated in the bottom-right corner region of the estimated luminance distribution of the corrected-restored-image initial values to correct the estimated luminance distribution. The fifth invention is the same as the invention described in Claim 5.

A sixth invention according to the present invention relates to a second aspect of the first image restoring step constituting the TV-video accelerated super-resolution processing method of the first invention. The second aspect of the first image restoring step is characterized by including (S80) a PSF providing step of providing an n-th iteration of a first single-iteration image restoring step with an n-th PSF luminance distribution as a PSF luminance distribution among the series of PSF luminance distributions, where n_max signifies the maximum number of iterations and n signifies a natural number less than n_max; (S81) the single-iteration image restoring step of executing a computation corresponding to one iteration in iterations based on a formula of Bayse probability theory from the PSF luminance distribution, the estimated luminance distribution of the restored-image initial values, and the luminance distribution of the degraded image to obtain and output an estimated luminance distribution of a restored image having a maximum likelihood for the luminance distribution of the degraded image; the single-iteration image restoring step S81 including (S82) a second restored-image-initial-value correcting step, constituted of the same processing procedure as the first restored-image-initial-value correcting step, of correcting the estimated luminance distribution of the restored-image initial values on the basis of the PSF size to obtain an estimated luminance distribution of corrected-restored-image initial values; (S83) a step of convolving the PSF luminance distribution with the estimated luminance distribution of the corrected-restored-image initial values to obtain a seventh function; (S84) a step of inverting the seventh function to obtain an eighth function; (S85) a step of multiplying the eighth function by the luminance distribution of the degraded image to obtain a ninth function; (S86) a step of multiplying the estimated luminance distribution of the restored-image initial values by the ninth function to obtain an estimated luminance distribution of a restored image; and (S87) a step of outputting the estimated luminance distribution of the restored image, and (S88) the second aspect of the first image restoring step is characterized by being a second image restoring step constituted of a series connection of n_max iterations configured by connecting the output of step (S87) of the n-th iteration S81-*n* of the first single-iteration image restoring step to step (S82) of the (n+1)-th iteration S81-(*n*+1) of the first single-iteration image restoring step, and in the second image restoring step S88, n_max iterations, corresponding to the number of iterations of the first single-iteration image restoring step S81 connected in series, are executed, and the estimated luminance distribution of the restored image output from the n_max-th iteration S81-*n*_max of the first single-iteration image restoring step is output as a luminance distribution of a maximum-likelihood restored image. The sixth invention is the same as the invention described in Claim 6.

A seventh invention according to the present invention relates to a third aspect of the first image restoring step constituting the TV-video accelerated super-resolution processing program of the first invention. The third aspect of the first image restoring step is characterized by including (S90) a step of assigning 0 to and thereby resetting the counter; (S91) a step of assigning 1 to and thereby resetting the second counter; (S92) a step of testing a hypothesis that the value of the counter is not 0, proceeding to step (S93) if the test result is false, and jumping to step (S96) if the test result is true; (S93) a step of transferring the luminance distribution of the degraded image to a buffer for saving the degraded image and to a buffer for the restored-image initial values; (S94) a step of jumping to step (S96); (S95) a step of transferring an estimated luminance distribution of a restored image in step (S102) to the buffer for the restored-image initial values; (S96) a step of setting an m-th PSF luminance distribution in the series of PSF luminance distributions as a PSF luminance distribution, where m signifies the value of the second counter; (S97) a step of reading the estimated luminance distribution of the restored-image initial values from the buffer for the restored-image initial values; (S98) a third restored-image-initial-value correcting step, constituted of the same processing procedure as the first restored-image-initial-value correcting step, of correcting the estimated luminance distribution of the restored-image initial values on the basis of the PSF size and setting the result as an estimated luminance distribution of corrected-restored-image initial values; (S99) a step of convolving the PSF luminance distribution with the estimated luminance distribution of the corrected-restored-image initial values to obtain a tenth function; (S100) a step of inverting the tenth function to obtain an eleventh function; (S101) a step of reading the luminance distribution of the degraded image from the buffer for saving the degraded image and multiplying the eleventh function by the luminance distribution to obtain a twelfth function; (S102) a step of multiplying the estimated luminance distribution of the restored-image initial values by the twelfth function to obtain an estimated luminance distribution of a restored image; (S103) a step of incrementing the counter by 1; (S104) a step of incrementing the second counter by 1; (S105) a step of testing a hypothesis that the value of the counter has exceeded the maximum number of iterations, jumping to step (S95) if the test result is false, and proceeding to step (S106) if the test result is true; and (S106) a step of outputting the estimated luminance distribution of the restored image as a luminance distribution of a maximum-likelihood restored image, and (S107) the third aspect of the first image restoring step is a third image restoring step of completing the maximum number of iterations by executing iterations in ascending order of the index on S in the individual steps and outputting the maximum-likelihood restored image having a maximum likelihood. The seventh invention is the same as the invention described in Claim 7.

An eighth invention according to the present invention relates to the degraded-image preparing step constituting the TV-video accelerated super-resolution processing method of the first invention. The degraded-image preparing step is characterized by including (S110) an RGB-signal extracting step of extracting RGB signals constituting a frame from TV video signals for the frame; (S111) a delaying step of outputting, with a delay corresponding to one frame, the TV video signals remaining after extracting the RGB signals from the single-frame TV video signals; (S112) a YUV conversion step of subjecting the RGB signals to YUV conversion to obtain YUV signals; (S113) a Y-degraded-image extracting step of extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and (S114) a degamma processing step of executing degamma processing of the luminance distribution of the Y degraded image to obtain and output a luminance distribution of a degraded image constituted of a single-frame luminance distribution. The eighth invention is the same as the invention described in Claim 8.

A ninth invention according to the present invention relates to the TV-vide rendering step constituting the TV-video accelerated super-resolution processing method of the first invention. The TV-video rendering step is characterized by including (S120) a gamma processing step of executing gamma processing of the luminance distribution of the maximum-likelihood restored image; (S121) a restored-image combining step of combining the distribution of the U degraded image and the distribution of the V degraded image kept in the Y-degraded-image extracting step with the luminance distribution of the maximum-likelihood restored image after the gamma processing constituted of Y components to obtain a distribution of a single YUV restored image; (S122) an RGB conversion step of executing RGB conversion of the distribution of the YUV restored image to obtain a distribution of an RGB restored image; (S123) an RGB-signal conversion step of reading the distribution of the RGB restored image and outputting RGB signals; and (S124) a TV-video-signal combining step of combining the RGB signals with the remaining TV video signals output in the delaying step to obtain and output super-resolution TV video signals constituted of single-frame TV video signals. The ninth invention is the same as the invention described in Claim 9.

A tenth invention according to the present invention relates to the PSF luminance distributions of the first to seventh inventions constituting the TV-video accelerated super-resolution processing methods. The PSF luminance distributions are characterized by being constituted of frameless square pixels of the same size, constituting two-dimensional normal distributions in which the centers are brightest, and having a size of 5×5 pixels. The tenth invention is the same as the invention described in Claim 10.

An eleventh invention according to the present invention is a first accelerated super-resolution processing program for causing a computer to execute the preparing step and first image restoring step constituting the TV-video accelerated super-resolution processing method of the first invention. The eleventh invention is the same as the invention described in Claim 11.

A twelfth invention according to the present invention is a second accelerated super-resolution processing program for causing a computer to execute the preparing step constituting the TV-video accelerated super-resolution processing method of the first invention and the second image restoring step constituting the TV-video accelerated super-resolution processing method of the sixth invention. The twelfth invention is the same as the invention described in Claim 12.

A thirteenth invention according to the present invention is a third accelerated super-resolution processing program for causing a computer to execute the preparing step constituting the TV-video accelerated super-resolution processing method of the first invention and the third image restoring step constituting the TV-video accelerated super-resolution processing method of the seventh invention. The thirteenth invention is the same as the invention described in Claim 13.

Each of the first accelerated super-resolution processing program, the second accelerated super-resolution processing program, and the third accelerated super-resolution processing program is written by using languages that can be read and executed by a computer, for example, C++, XTML, HTML, and JAVA (registered trademark). In the present invention, C++, XTML, HTML, and JAVA (registered trademark) are used.

A fourteenth invention according to the present invention is a first storage medium characterized in that the first accelerated super-resolution processing program of the eleventh invention, the second accelerated super-resolution processing program of the twelfth invention, and the third accelerated super-resolution processing program of the thirteenth invention are all encrypted, in that these encrypted first accelerated super-resolution processing program, second accelerated super-resolution processing program, and third accelerated super-resolution processing program are stored, and in that the storage medium can be connected to a computer and can be read by the computer. The fourteenth invention is the same as the invention described in Claim 14.

In the present invention, as the first storage medium, a USB (Universal Serial Bus) flash memory stick having a capacity not less than 8 GBytes and supporting encrypted storage can be used. As other examples, a CD (Compact Disk), a DVD (Digital Versatile Disk), a flash memory card, an external HDD (Hard Disk Drive), an external SDD (Solidstate Disk Drive), etc. having a capacity not less than 8 GBytes and supporting encrypted storage can be used.

A fifteenth invention according to the present invention relates to a TV-video accelerated super-resolution processing device for reducing optical degradation from a frame included in single-frame TV video signals to restore the degraded TV video signals to the pre-degradation single-frame TV video signals in accordance with the TV-video accelerated super-resolution processing methods constituted of the first to fifth and eighth to tenth inventions. The TV-video accelerated super-resolution processing device is characterized by including (W1) a means for setting a maximum number of iterations; (W2) a degradation-index designating means for designating a degradation index suitable for a degradation state of the TV video while the TV video is being viewed; (W3) a PSF preparing means for preparing a first PSF luminance distribution associated with the degradation index and a series of PSF luminance distributions derived from the first PSF luminance distribution and organized in association with numbers of iterations; (W4) a degraded-image preparing means for preparing, from single-frame TV video signals, a luminance distribution of a degraded image constituted of a single-frame luminance distribution; (W5) a restored-image-initial-value preparing means for setting the luminance distribution of the degraded image as an estimated luminance distribution of restored-image initial values; (W6) a PSF-size obtaining means for obtaining a PSF size, the PSF size referring to an image size that is the same among the series of PSF luminance distributions; (W7) a first resetting means for setting a counter that counts the number of iterations to 1; (W8) a first restored-image-initial-value correcting means for copying the estimated luminance distribution of the restored-image initial values, setting the estimated luminance distribution as an estimated luminance distribution of corrected-restored-image initial values, and correcting the estimated luminance distribution of the corrected-restored-image initial values on the basis of the PSF size; (W9) a PSF selecting means for selecting one PSF luminance distribution associated with the value of the counter from the series of PSF luminance distributions and setting the selected one as a PSF luminance distribution; (W10) a means for convolving the estimated luminance distribution of the corrected-restored-image initial values with the PSF luminance distribution to obtain a thirteenth function; (W11) a means for inverting the thirteenth function to obtain a fourteenth function; (W12) a means for multiplying the fourteenth function by the luminance distribution of the degraded image to obtain a fifteenth function; (W13) a means for multiplying the estimated luminance distribution of the restored-image initial values by the fifteenth function to obtain an estimated luminance distribution of a restored image; (W14) a means for incrementing the counter by 1; (W15) a means for testing a hypothesis that the value of the counter is greater than or equal to the maximum number of iterations, proceeding to means (W16) if the test result is false, and proceeding to means (W18) if the test result is true; (W16) a means for substituting the estimated luminance distribution of the restored image for the estimated luminance distribution of the restored-image initial values; (W17) a means for returning to means (W8); (W18) a means for outputting the estimated luminance distribution of the restored image as a luminance distribution of a maximum-likelihood restored image; (W19) a preparing means constituted of means (W1) to (W7); (W20) a first image restoring means constituted of means (W8) to (W18), and the TV-video accelerated super-resolution processing device is also characterized by including (W21) a first accelerated super-resolution processing means for completing the maximum number of iterations by executing iterations in ascending order of the index on W of means in the preparing means W19 and the first image restoring means W20 and outputting the luminance distribution of the maximum-likelihood restored image; and (W22) a TV-video rendering means for rendering the luminance distribution of the maximum-likelihood restored image into single-frame TV video signals and outputting the TV video signals as super-resolution TV video signals. The fifteenth invention is the same as the invention described in Claim 15.

A sixteenth invention according to the present invention relates to a second aspect of the PSF preparing means constituting the TV-video accelerated super-resolution processing device of the fifteenth invention. The second aspect of the PSF preparing means is characterized by including (W30) a means for searching, by using the degradation index, a PSF database created by organizing PSF luminance distributions in one-to-one association with degradation indices and setting a hit PSF luminance distribution as a first PSF luminance distribution; (W31) a means for inputting 1 to and thereby resetting a second counter that counts numbers; (W32) a means for setting the first PSF luminance distribution as a luminance distribution of PSF initial values; (W33) a means for incrementing the second counter by 1; (W34) a means for testing a hypothesis that the value of the second counter has exceeded the maximum number of iterations, proceeding to means (W35) if the test result is false, and jumping to means (W38) if the test result is true; (W35) a means for restoring a luminance distribution of PSF initial values with a PSF restoring means to obtain a luminance distribution of a restored PSF; (W36) a means for setting the luminance distribution of the restored PSF as an n-th PSF luminance distribution, where n signifies the value of the second counter; (W37) a means for returning to means (W33); and (W38) a means for connecting the first PSF luminance distribution to the n_max-th luminance distribution in that order to form a series of PSF luminance distributions, where n_max signifies the maximum number of iterations and n signifies a natural number less than n_max, and labeling the series of PSF luminance distributions with the degradation indices to create the series of PSF luminance distributions associated with the degradation indices. The sixteenth invention is the same as the invention described in Claim 16.

A seventeenth invention according to the present invention relates to a third aspect of the PSF preparing means constituting the TV-video accelerated super-resolution processing device of the fifteenth invention. The third aspect of the PSF preparing means is characterized by including (W40) a means for setting the maximum number of iterations to 5; (W41) a means for executing the PSF preparing means in advance for all the pairs of degradation indices and PSF luminance distributions associated therewith in the PSF database to obtain a series of PSF luminance distributions for each of the degradation indices and editing the series of PSF luminance distributions for each of the degradation indices to prepare an extended PSF database in which the series of PSF luminance distributions is organized in association with the degradation indices; and (W42) a means for searching the extended PSF database by using the degradation index and retrieving a hit series of PSF luminance distributions. The seventeenth invention is the same as the invention described in Claim 17.

An eighteenth invention according to the present invention relates to a PSF restoring means constituting the TV-video accelerated super-resolution processing device of the sixteenth invention. The PSF restoring means is characterized by including (W50) a means for assigning 6 to the maximum number of iterations; (W51) a means for considering the luminance distribution of the PSF initial values as a luminance distribution of a degraded image and setting the luminance distribution as a degraded PSF luminance distribution; (W52) a means for setting the luminance distribution of the PSF initial values as an estimated luminance distribution of restored PSF initial values; (W53) a means for assigning 1 to and thereby resetting the counter; (W54) a restored-PSF-initial-value correcting means for setting the estimated luminance distribution of the restored-PSF initial values as an estimated luminance distribution of corrected-restored-PSF initial values and, when convolving the luminance distribution of the PSF initial values with the estimated luminance distribution of the corrected-restored-PSF initial values, calculating a region where computation is difficult, the region occurring in a peripheral region in the estimated luminance distribution of the corrected-restored-PSF initial values, on the basis of the image size of the luminance distribution of the PSF initial values, copying the pixels associated with a top-edge boundary in the region where computation is difficult, pasting the copied pixels to the outside of the top-edge boundary of the estimated luminance distribution of the corrected-restored-PSF initial values in mirror symmetry with respect to the top-edge boundary, and executing similar computations clockwise for a right edge, a bottom edge, and finally a left edge, thereby correcting the estimated luminance distribution of the corrected-restored-PSF initial values; (W55) a means for convolving the luminance distribution of the PSF initial values with the estimated luminance distribution of the corrected-restored-PSF initial values to obtain a sixteenth function; (W56) a means for inverting the sixteenth function to obtain a seventeenth function; (W57) a means for multiplying the seventeenth function by the degraded PSF luminance distribution to obtain an eighteenth function; (W58) a means for multiplying the estimated luminance distribution of the restored-PSF initial values by the eighteenth function to obtain an estimated luminance distribution of a restored PSF; (W59) a means for incrementing the counter by 1; (W60) a means for testing a hypothesis that the value of the counter has exceeded the maximum number of iterations, proceeding to means (W61) if the test result is false, and jumping to means (W63) if the test result is true; (W61) a means for substituting the estimated luminance distribution of the restored PSF for the estimated luminance distribution of the restored-PSF initial values; (W62) a means for jumping to means (W54); and (W63) a means for outputting the estimated luminance distribution of the restored PSF as a luminance distribution of a maximum-likelihood restored PSF. The eighteenth invention is the same as the invention described in Claim 18.

A nineteenth invention according to the present invention relates to the first restored-image-initial-value correcting means constituting the TV-video accelerated super-resolution processing device of the fifteenth invention. The first restored-image-initial-value correcting means is characterized by including (W70) a means for setting the estimated luminance distribution of the restored-image initial values as an estimated luminance distribution of corrected-restored-image initial values; (W71) a means for calculating, on the basis of the PSF size, a region where computation is difficult, the region occurring in a peripheral region in the estimated luminance distribution of the corrected-restored-image initial values when convolving one of the series of PSF luminance distributions with the estimated luminance distribution of the corrected-restored-image initial values; (W72) a means for copying the pixels in the region where computation is difficult in the estimated luminance distribution of the corrected-restored-image initial values, individually inverting the copied pixels in mirror symmetry with respect to the four edges of the estimated luminance distribution of the corrected-restored-image initial values, and pasting the pixels to the outside of the boundaries at the four edges of the estimated luminance distribution of the corrected-restored-image initial values to correct the estimated luminance distribution; (W73) a means for copying the pixels in a top-left corner region in the region where computation is difficult in the estimated luminance distribution of the corrected-restored-image initial values, rotating the copied pixels in the top-left corner region by 180 degrees about the vertex at the top-left corner, and pasting the pixels to a blank region generated in the top-left corner region of the estimated luminance distribution of the corrected-restored-image initial values to correct the estimated luminance distribution; (W74) a means for copying the pixels in a top-right corner region in the region where computation is difficult in the estimated luminance distribution of the corrected-restored-image initial values, rotating the copied pixels in the top-right corner region by 180 degrees about the vertex at the top-right corner, and pasting the pixels to a blank region generated in the top-right corner region of the estimated luminance distribution of the corrected-restored-image initial values to correct the estimated luminance distribution; (W75) a means for copying the pixels in a bottom-left corner region in the region where computation is difficult in the estimated luminance distribution of the corrected-restored-image initial values, rotating the copied pixels in the bottom-left corner region by 180 degrees about the vertex at the top-left corner, and pasting the pixels to a blank region generated in the bottom-left corner region of the estimated luminance distribution of the corrected-restored-image initial values to correct the estimated luminance distribution; and (W76) a means for copying the pixels in a bottom-right corner region in the region where computation is difficult in the estimated luminance distribution of the corrected-restored-image initial values, rotating the copied pixels in the bottom-right corner region by 180 degrees about the vertex at the top-right corner, and pasting the pixels to a blank region generated in the bottom-right corner region of the estimated luminance distribution of the corrected-restored-image initial values to correct the estimated luminance distribution. The nineteenth invention is the same as the invention described in Claim 19.

A twentieth invention according to the present invention relates to a second aspect of the first image restoring means constituting the TV-video accelerated super-resolution processing device of the fifteenth invention. The second aspect of the first image restoring means is characterized by including (W80) a PSF providing means for providing an n-th stage of a first single-iteration image restoring means with an n-th PSF luminance distribution as a PSF luminance distribution among the series of PSF luminance distributions, where n_max signifies the maximum number of iterations and n signifies a natural number less than n_max; (W81) the single-iteration image restoring means for executing a computation corresponding to one iteration in iterations based on a formula of Bayse probability theory from the PSF luminance distribution, the estimated luminance distribution of the restored-image initial values, and the luminance distribution of the degraded image to obtain and output an estimated luminance distribution of a restored image having a maximum likelihood for the luminance distribution of the degraded image; (W82) a means for obtaining an estimated luminance distribution of corrected-restored-image initial values by a second restored-image-initial-value correcting means constituted of the same configuration as the first restored-image-initial-value correcting means; (W83) a means for convolving the PSF luminance distribution with the estimated luminance distribution of the corrected-restored-image initial values to obtain a nineteenth function; (W84) a means for inverting the nineteenth function to obtain a twentieth function; (W85) a means for multiplying the twentieth function by the luminance distribution of the degraded image to obtain a twenty-first function; (W86) a means for multiplying the estimated luminance distribution of the restored-image initial values by the twenty-first function to obtain an estimated luminance distribution of a restored image; (W87) a means for outputting the estimated luminance distribution of the restored image; and (W88) the second aspect of the first image restoring means is a second image restoring means constituted of a series connection of n_max stages configured by connecting the output of means (W87) of the n-th stage W81-*n* of the first single-iteration image restoring means to means (W82) of the (n+1)-th stage W81-(*n*+1) of the first single-iteration image restoring means, and is characterized in that, in the second image restoring means W88, n_max iterations, corresponding to the number of stages of the first single-iteration image restoring means W81 connected in series, are executed, and the estimated luminance distribution of the restored image output from the n_max-th stage W81-*n*_max of the first single-iteration image restoring means is output as a luminance distribution of a maximum-likelihood restored image. The twentieth invention is the same as the invention described in Claim 20.

A twenty-first invention according to the present invention relates to a third aspect of the first image restoring means constituting the TV-video super-resolution processing device of the fifteenth invention. The third aspect of the first image restoring means is characterized by including (W90) a means for assigning 0 to and thereby resetting the counter; (W91) a means for assigning 1 to and thereby resetting the second counter; (W92) a means for testing a hypothesis that the value of the counter is not 0, proceeding to means (W93) if the test result is false, and jumping to means (W96) if the test result is true; (W93) a means for transferring the luminance distribution of the degraded image to a buffer for saving the degraded image and to a buffer for the restored-image initial values; (W94) a means for jumping to means (W96); (W95) a means for transferring an estimated luminance distribution of a restored image of means (W102) to the buffer for the restored-image initial values; (W96) a means for setting an m-th PSF luminance distribution in the series of PSF luminance distributions as a PSF luminance distribution, where m signifies the value of the second counter; (W97) a means for reading the estimated luminance distribution of the restored-image initial values from the buffer for the restored-image initial values; (W98) a third restored-image-initial-value correcting means, constituted of the same configuration as the first restored-image-initial-value correcting means, for correcting the estimated luminance distribution of the restored-image initial values and setting the estimated luminance distribution as an estimated luminance distribution of corrected-restored-image initial values; (W99) a means for convolving the PSF luminance distribution with the estimated luminance distribution of the corrected-restored-image initial values to obtain a twenty-second function; (W100) a means for inverting the twenty-second function to obtain a twenty-third function; (W101) a means for multiplying the twenty-third function by the luminance distribution of the degraded image to obtain a twenty-fourth function; (W102) a means for multiplying the estimated luminance distribution of the restored-image initial values by the twenty-fourth function to obtain an estimated luminance distribution of a restored image; (W103) a means for incrementing the counter by 1; (W104) a means for incrementing the second counter by 1; (W105) a means for testing a hypothesis that the value of the counter has exceeded the maximum number of iterations, jumping to means (W95) if the test result is false, and proceeding to means (W106) if the test result is true; and (W106) a means for outputting the estimated luminance distribution of the restored image as a luminance distribution of a maximum-likelihood restored image, and is characterized in that (W107) the third aspect of the first image restoring means is a third image restoring means for completing the maximum number of iterations by executing iterations in ascending order of the index on S of the individual means and outputting the maximum-likelihood restored image having a maximum likelihood. The twenty-first invention is the same as the invention described in Claim 21.

A twenty-second invention according to the present invention relates to the degraded-image preparing means constituting the TV-video accelerated super-resolution processing device of the fifteenth invention. The degraded-image preparing means is characterized by including (W110) an RGB-signal extracting means for extracting RGB signals constituting a frame from TV video signals for the frame; (W111) a delaying means for outputting, with a delay corresponding to one frame, the TV video signals remaining after extracting the RGB signals from the single-frame TV video signals; (W112) a YUV conversion means for subjecting the RGB signals to YUV conversion to obtain YUV signals; (W113) a Y-degraded-image extracting means for extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and (W114) a degamma processing means for executing degamma processing of the luminance distribution of the Y degraded image to obtain and output a luminance distribution of a degraded image constituted of a single-frame luminance distribution. The twenty-second invention is the same as the invention described in Claim 22.

A twenty-third invention according to the present invention relates to the TV-video rendering means constituting the TV-video accelerated super-resolution processing device of the fifteenth invention. The TV-video rendering means is characterized by including (W120) a gamma processing means for executing gamma processing of the luminance distribution of the maximum-likelihood restored image; (W121) a restored-image combining means for combining the distribution of the U degraded image and the distribution of the V degraded image kept by the Y-degraded-image extracting means with the luminance distribution of the maximum-likelihood restored image after the gamma processing constituted of Y components to obtain a distribution of a single YUV restored image; (W122) an RGB conversion means for executing RGB conversion of the distribution of the YUV restored image to obtain a distribution of an RGB restored image; (W123) an RGB-signal conversion means for reading the distribution of the RGB restored image and outputting RGB signals; and (W124) a TV-video-signal combining means for combining the RGB signals with the remaining TV video signals output by the delaying means to obtain and output super-resolution TV video signals constituted of single-frame TV video signals. The twenty-third invention is the same as the invention described in Claim 23.

A twenty-fourth invention according to the present invention is a fourth accelerated super-resolution processing program for implementing and executing the preparing means and first image restoring means constituting the TV-video accelerated super-resolution processing device of the fifteenth invention. The twenty-fourth invention is the same as the invention described in Claim 24.

A twenty-fifth invention according to the present invention is a fifth accelerated super-resolution processing program for implementing and executing the preparing means constituting the TV-video accelerated super-resolution processing device of the fifteenth invention and the second image restoring means constituting the TV-video accelerated super-resolution processing device of the twentieth invention. The twenty-fifth invention is the same as the invention described in Claim 25.

A twenty-sixth invention according to the present invention is a sixth accelerated super-resolution processing program for implementing and executing the preparing means constituting the TV-video accelerated super-resolution processing device of the fifteenth invention and the third image restoring means constituting the TV-video accelerated super-resolution processing device of the twenty-first invention. The twenty-sixth invention is the same as the invention described in Claim 26.

Each of the fourth accelerated super-resolution processing program, the fifth accelerated super-resolution processing program, and the sixth accelerated super-resolution processing program is written by using languages that can be read and executed by a computer, for example, C++, XTML, HTML, and JAVA (registered trademark). In the present invention, C++, XTML, HTML, and JAVA (registered trademark) are used.

A twenty-seventh invention according to the present invention is a second storage medium wherein the fourth accelerated super-resolution processing program, the fifth accelerated super-resolution processing program, and the sixth accelerated super-resolution processing program are individually encrypted, these encrypted fourth accelerated super-resolution processing program, fifth accelerated super-resolution processing program, and sixth accelerated super-resolution processing program are stored, and the storage medium can be connected to a computer and can be read by the computer.

The same storage medium as the first storage medium can be used as the second storage medium according to the present invention.

Advantageous Effects of Invention

There has hitherto been a problem in that the number of gates in an LSI implementation of a device that executes super-resolution processing of TV video by continuously restoring an image only from information about a frame of the TV video is as large as 1.5 million gates, which is not economical. By applying the TV-video accelerated super-resolution processing methods and devices according to the present invention, an effect of reduction in the number of steps and the number of means, which makes it possible to obtain super-resolution images of a quality comparable to before through just two iterations, an effect of increased speed, an effect of substantially real-time processing, an effect of reduction in the number of gates in an LSI implementation to about seven thousand gates, which is about 3% compared with before, and an economical effect that the cost of an LSI implementation is inexpensive are realized at least partially. Furthermore, since the present invention is applicable irrespective of the type of radiation source for TV video, for example, video acquired by using an infrared camera or an X-ray camera may be used. That is, another advantage is afforded in that the range of applications is broad.

DESCRIPTION OF EMBODIMENTS

Figure 1:
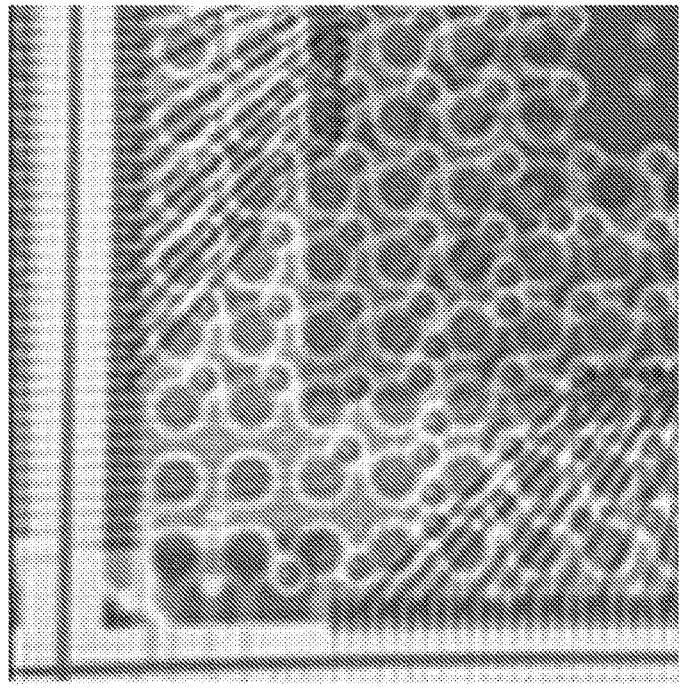
FIG. 1 is a drawing showing an example of degraded information included in a frame of actual TV video.
Figure 1:
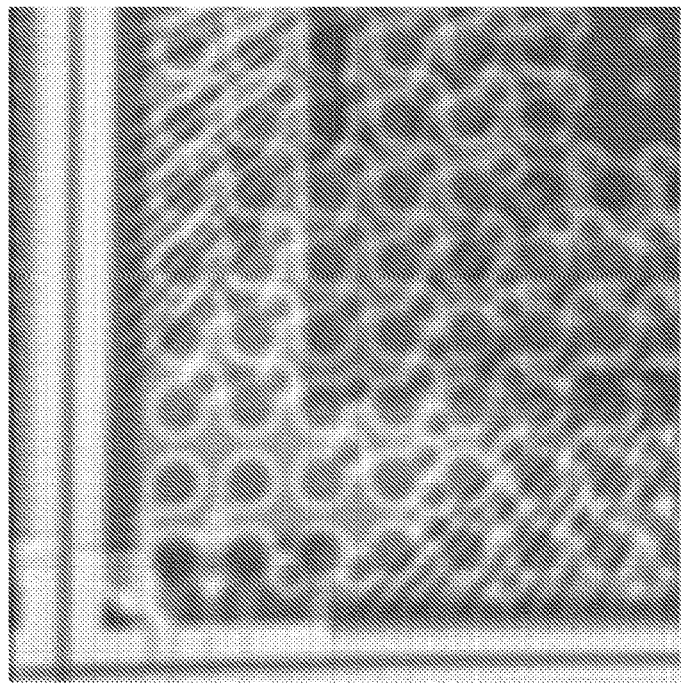

The best mode for carrying out the present invention will be described with reference to the drawings as appropriate.

In the present invention, a degraded image, a PSF, and a restored image are individually constituted of an array of frameless square pixels of the same size. Each of the pixels is an RGB color pixel composed of a primary red component (R) having an 8-bit depth, a primary green component (G) having an 8-bit depth, and a primary blue component (B) having an 8-bit depth. In the case where a pixel has the same number of bits for the RGB components, the pixel becomes a grayscale pixel. In the present invention, a PSF is composed of only grayscale pixels.

In the present invention, in a degraded image, a PSF, and a restored image, the pixel at the top left corner is considered as the origin, an axis that is parallel to a row of pixels including the origin and extending along the horizontal direction without changing the row is considered as the x axis, and an axis that is parallel to a column of pixels including the origin and extending along the vertical direction without changing the column is considered as the y axis. All the pixels in a degraded image, a PSF, and a restored image can be designated by two-dimensional coordinates (x, y).

In the present invention, a degraded image and a restored image have the same image size and the same coordinates. In the present invention, however, since cases where an image is blurred to such an extent that it is unrecognizable are not considered, the peripheral region in a PSF is substantially zero, and in order to reduce the number of calculations, it is presupposed that the assumption holds true that the PSF luminance distribution does not change regardless of its position in a degraded image and a restored image. The PSF size used is 5×5 pixels.

In the present invention, only PSFs, degraded images, and restored images individually composed of luminance components are handled, and only luminance components are used in restoring computations. This is because this results in a reduction in the number of computations but does not cause changes in hue. It has been confirmed that the quality of super-resolution processing according to the method of the present invention is comparable to that in the case where the R, G, and B components are restored individually.

In the present invention, a PSF, a degraded image, and a restored image are individually composed of luminance components. Thus, these are individually referred to as a PSF luminance distribution, a luminance distribution of a degraded image, and an estimated luminance distribution of a restored image. A luminance distribution of a restored image is referred to as an estimated luminance distribution since an accurate luminance distribution of a restored image is unknown. When an image is restored by a TV-video accelerated super-resolution processing method according to the present invention, a restored image substantially converges to a state without optical degradation and is substantially comparable to an original image. Thus, a luminance distribution of a maximum-likelihood restored image is referred to as a luminance distribution.

Figure 2:
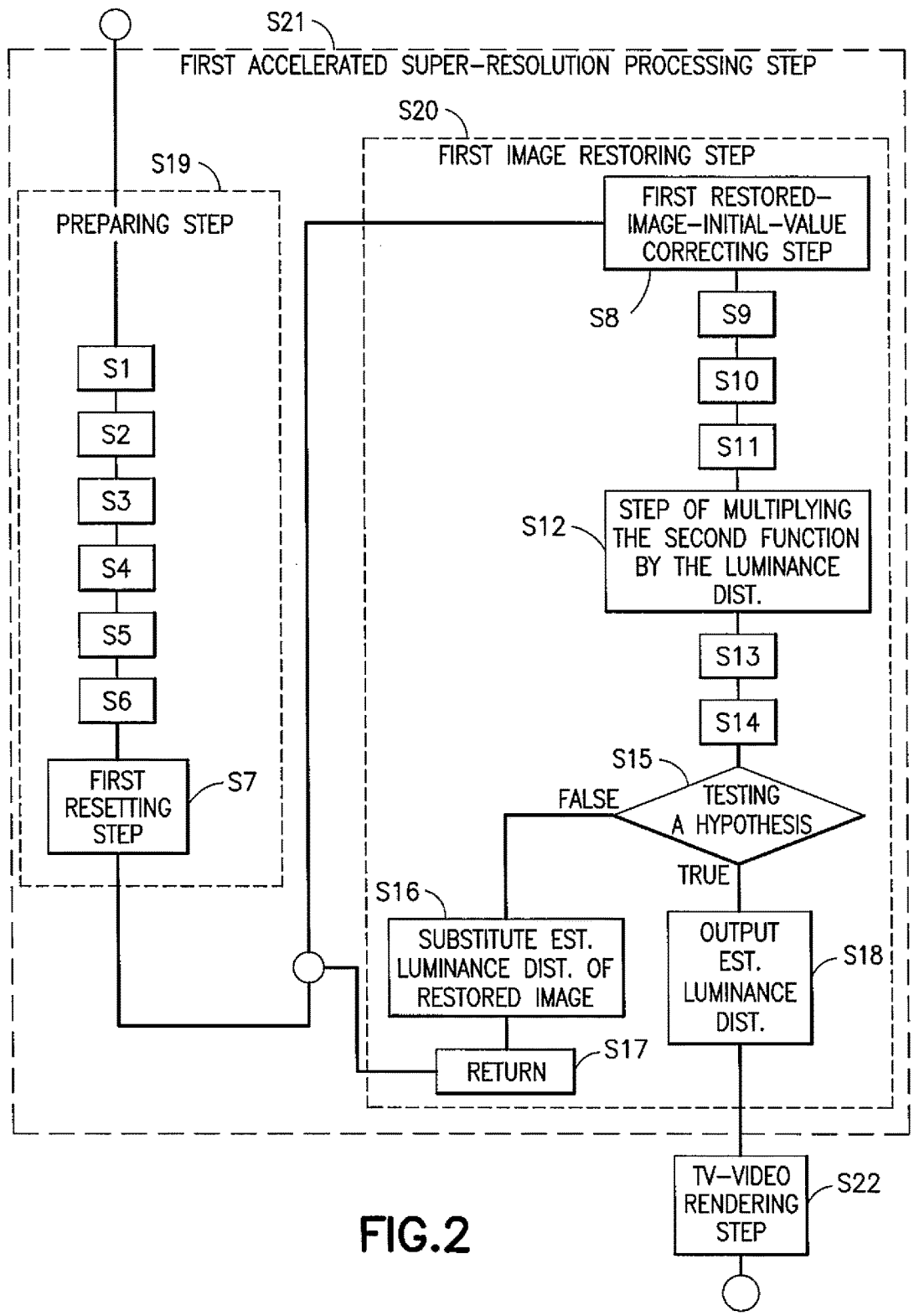
FIG. 2 is a flowchart showing an example of a processing procedure in a TV-video accelerated super-resolution processing method of a first invention according to the present invention.

FIG. 2 shows, in the form of a flowchart, an example of a processing procedure in a TV-video accelerated super-resolution processing method of a first invention according to the present invention. In the flowchart shown in FIG. 2, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies a maximum number of iterations 1, thick lines signify processing flows, circles having white backgrounds signify a joint, a start, and an end of processing, and black circles signify branches and joints of data.

The TV-video accelerated super-resolution processing method shown in FIG. 2 is characterized by including (S1) a step of setting a maximum number of iterations 1; (S2) a degradation-index designating step of designating a degradation index 2 suitable for a degradation state of TV video while the TV video is being viewed; (S3) a PSF preparing step of preparing a first PSF luminance distribution 14 associated with the degradation index 2 and a series of PSF luminance distributions 3 derived from the first PSF luminance distribution and organized in association with numbers of iterations; (S4) a degraded-image preparing step of preparing, from single-frame TV video signals 5, a luminance distribution 4 of a degraded image constituted of a single-frame luminance distribution; (S5) a restored-image-initial-value preparing step of setting the luminance distribution 4 of the degraded image as an estimated luminance distribution 6 of restored-image initial values; (S6) a PSF-size obtaining step of obtaining a PSF size 7, the PSF size referring to an image size that is the same among the series of PSF luminance distributions 3; (S7) a first resetting step of setting a counter that counts the number of iterations to 1; (S8) a first restored-image-initial-value correcting step of copying the estimated luminance distribution 6 of the restored-image initial values, setting the estimated luminance distribution as an estimated luminance distribution 8 of corrected-restored-image initial values, and correcting the estimated luminance distribution 8 of the corrected-restored-image initial values on the basis of the PSF size 7; (S9) a PSF selecting step of selecting one PSF luminance distribution associated with the value of the counter from the series of PSF luminance distributions 3 and setting the selected one as a PSF luminance distribution 9; (S10) a step of convolving the estimated luminance distribution 8 of the corrected-restored-image initial values with the PSF luminance distribution 9 to obtain a first function; (S11) a step of inverting the first function to obtain a second function; (S12)

a step of multiplying the second function by the luminance distribution 4 of the degraded image to obtain a third function; (S13) a step of multiplying the estimated luminance distribution 6 of the restored-image initial values by the third function to obtain an estimated luminance distribution 10 of a restored image; (S14) a step of incrementing the counter by 1; (S15) a step of testing a hypothesis that the value of the counter is greater than or equal to the maximum number of iterations 1, proceeding to step (S16) if the test result is false, and proceeding to step (S18) if the test result is true; (S16) a step of substituting the estimated luminance distribution 10 of the restored image for the estimated luminance distribution 6 of the restored-image initial values; (S17) a step of returning to step (S8); (S18) a step of outputting the estimated luminance distribution 10 of the restored image as a luminance distribution 11 of a maximum-likelihood restored image; (S19) a preparing step constituted of steps (S1) to (S7); (S20) a first image restoring step constituted of steps (S8) to (S18), and is characterized by including (S21) a first accelerated super-resolution processing step of completing the maximum number of iterations by executing iterations in ascending order of the index on S of steps in the preparing step S19 and the first image restoring step S20 and outputting the luminance distribution 11 of the maximum-likelihood restored image; and (S22) a TV-video rendering step of rendering the luminance distribution 11 of the maximum-likelihood restored image into single-frame TV video signals and outputting the TV video signals as super-resolution TV video signals 12. Referring to FIG. 2, the processing starts from step S1 and ends at step S22. Since the TV-video accelerated super-resolution processing method shown in FIG. 2 is a method of processing for a frame, it is necessary to continuously execute all the steps shown in FIG. 2 on a frame-by-frame basis in order to generate video.

In the first image restoring step S20, iterations are executed according to equation 1 to obtain a luminance distribution 11 of a maximum-likelihood image from a luminance distribution 4 of degraded image. Equation 1 is obtained by rewriting equation 15 in Patent Literature 2, invented by the inventor of the present invention and registered, for accelerated computation such that real-value processing and a convolution are possible. Since a PSF is used instead of an OTF (Optical Transfer Function), which is a Fourier transform product of a PSF, and the phase is not taken into consideration, compared with the method according to equation 15 in Patent Literature 2, the restoration accuracy is reduced. However, since TV video is rarely blurred to such an extent that the image is unrecognizable, the method according to equation 1 works practically without problems. Furthermore, in the method according to equation 1, by using PSF luminance distributions derived from the same PSF and having degrees of restoration corresponding to numbers of iterations, a computation for convolving the result of computation in the parentheses with an inverted function of a PSF, which is necessary in the method according to equation 15 in Patent Literature 2, is omitted. Thus, the number of steps is reduced by 40%. Furthermore, accelerated computation becomes possible, making it possible to obtain a luminance distribution of a maximum-likelihood restored image that is comparable to a substantially converged state (a state extremely close to the pre-degradation state) with only a few iterations.

[Eq. 1]

$$F_{k+1} = F_k \left( \frac{G}{F_k \circledast H_k} \right) \quad (1)$$

In equation 1, F signifies an estimated luminance distribution of a restored image, the index of F signifies that the value is a k-th value, G signifies a luminance distribution of a degraded image, H signifies a PSF luminance distribution, the index of H signifies that the value is a k-th value, and a symbol having an asterisk inside a circle signifies a convolution. Furthermore, k is a positive integer. When k is 1, $F_1$ signifies an estimated luminance distribution of restored-image initial values, and H1 signifies the first PSF luminance distribution. When k is n, $F_n$ signifies an estimated luminance distribution of a restored image in the n-th iteration, and $H_n$ signifies the n-th PSF luminance distribution.

Since the present invention is directed to TV video and TV video is rarely blurred to such an extent that the image is unrecognizable, a luminance distribution G of a degraded image is used as an estimated luminance distribution $F_1$ of the initial values of F in equation 1.

The convolution used in the present invention is a convolution integral. Equation 2 is an example of a formula of an ordinary convolution integral. Equation 2 indicates that F(i, j) is convolved with H(M, N) to obtain a result G(i, j). In the present invention, however, since the distributions of images having finite sizes are handled, data is discretized, and thus a linear convolution is used for a convolution integral. Equation 3 is an example of a formula of an ordinary linear convolution.

[Eq. 2]

$$G(i, j) = F(i, j) \circledast H(M, N) \quad (2)$$

[Eq. 3]

$$G(i, j) = \sum_{N=-n}^{n} \sum_{M=-m}^{m} F(1 - M, j - N) \cdot H(M, N) \quad (3)$$

In equations 2 and 3, i, j, m, n, M, and N are positive integers. However, in the convolutions according to equations 2 and 3, a region that is to be excluded occurs in the larger one of F and H involved in the convolutions, and the region that is to be excluded can be represented by the greatest integer not exceeding half of the size of the smaller one of F and H. For example, in the case where F has a size not smaller than 100×100 pixels and H that is convolved with F has a size of 3×3 pixels, one pixel in a peripheral region in F becomes a region that is to be excluded. In the case where H that is convolved with F has a size of 5×5 pixels, two pixels in a peripheral region in F become a region that is to be excluded.

Accordingly, in the present invention, the number of peripheral pixels in a region that is to be excluded is calculated according to the size of H used, the outermost pixels of F existing in the region that is to be excluded are copied and pasted in mirror symmetry to the outside of the boundary of F to create new pixels, and then the position of the outermost edges, i.e., the image F and its size, is changed, which prevents the occurrence of a region that is to be excluded after the computation. At this time, pixels are copied and pasted on an edge-by-edge basis, clockwise starting from the top edge, to include the new pixels in the pixels of F proper, thereby preventing the occurrence of a region that is not copied and pasted at the four corners. For example, in the case where H has a size of 5×5 and F has a size of W×L, the size of F changes from W×L to W×(L+2) after the first copy and paste operation, the size of F changes from W×(L+2) to (W+2)×(L+2) after the second copy and paste operation, the size of F changes from (W+2)×(L+2) to (W+2)×(L+4) after the third copy and paste operation, and the size of F changes from (W+2)×(L+4) to (W+4)×(L+4) after the fourth copy and paste operation, whereby the entire size of (W+4)×(L+4) become filled with pixels.

In the PSF preparing step S3, the first PSF luminance distribution 14 associated with the degradation index 2 is used at the time of the first iteration, the second PSF luminance distribution is used at the time of the second iteration, and the n-th PSF luminance distribution is used at the time of the n-th iteration. The second PSF luminance distribution is obtained by restoring the first PSF luminance distribution in the PSF restoring step, the third PSF luminance distribution is obtained by restoring the second PSF luminance distribution in the PSF restoring step, and the n-th PSF luminance distribution is obtained by restoring the (n−1)-th PSF luminance distribution in the PSF restoring step. Thus, the second and subsequent PSF luminance distributions are all rooted in the first PSF luminance distribution 14 associated with the degradation index 2 and constitutes a series derived from the first PSF luminance distribution 14. The first PSF luminance distribution 14 to the n-th PSF luminance distribution 17 form a series of PSF luminance distributions 3 associated with the degradation index 2.

Figure 3:
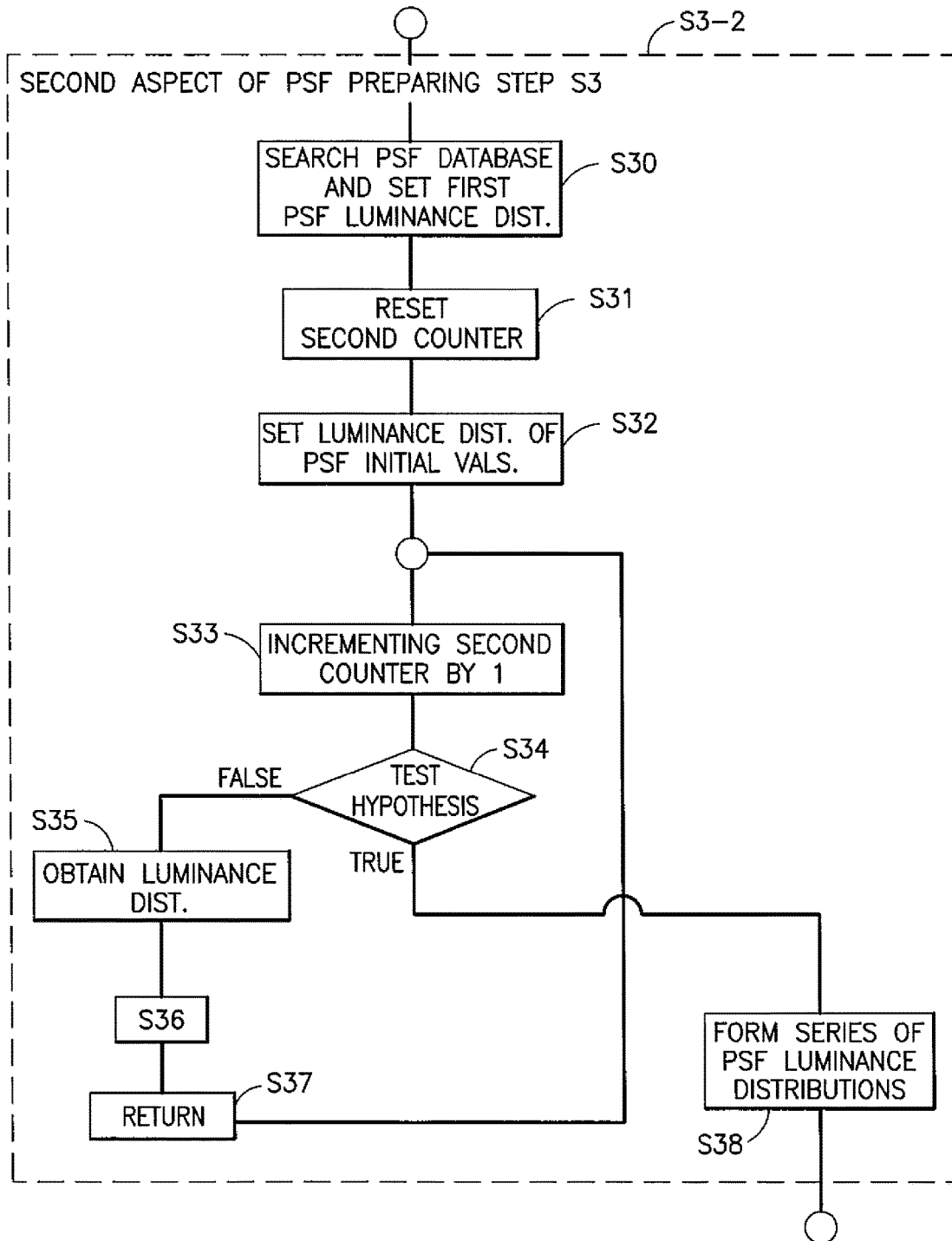
FIG. 3 is a flowchart showing an example of a processing procedure in a second aspect of a PSF preparing step of a second invention according to the present invention.

FIG. 3 shows, in the form of a flowchart, an example of a processing procedure in a second aspect S3-2 of the PSF preparing step S3 of a second invention according to the present invention. In the flowchart shown in FIG. 3, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies the maximum number of iterations 1, thick lines signify processing flows, circles having white backgrounds signify a joint, a start, and an end of processing, and black circles signify branches and joints of data.

The second aspect S3-2 of the PSF preparing step S3 shown in FIG. 3 is characterized by including (S30) a step of searching, by using the degradation index 2, a PSF database 13 created by organizing PSF luminance distributions in one-to-one association with degradation indices and setting a hit PSF luminance distribution 9 as a first PSF luminance distribution 14; (S31) a step of inputting 1 to and thereby resetting a second counter that counts numbers; (S32) a step of setting the first PSF luminance distribution 14 as a luminance distribution 15 of PSF initial values; (S33) a step of incrementing the second counter by 1; (S34) a step of testing a hypothesis that the value of the second counter has exceeded the maximum number of iterations 1, proceeding to step (S35) if the test result is false, and terminating the procedure if the test result is true; (S35) a step of restoring a luminance distribution 15 of PSF initial values through a PSF restoring step S63 to obtain a luminance distribution 16 of a maximum-likelihood restored PSF; (S36) a step of setting the luminance distribution 16 of the maximum-likelihood restored PSF as an n-th PSF luminance distribution 17, where n signifies the value of the second counter; (S37) a step of returning to step (S33); and (S38) a step of connecting the first PSF luminance distribution 14 to n_max-th PSF luminance distribution 25 in that order to form a series of PSF luminance distributions 3, where n_max signifies the maximum number of iterations 1 and n signifies a natural number less than n_max, and labeling the series of PSF luminance distributions 3 with the degradation indices 2 to create the series of PSF luminance distributions 3 associated with the degradation indices 2.

Figure 4:
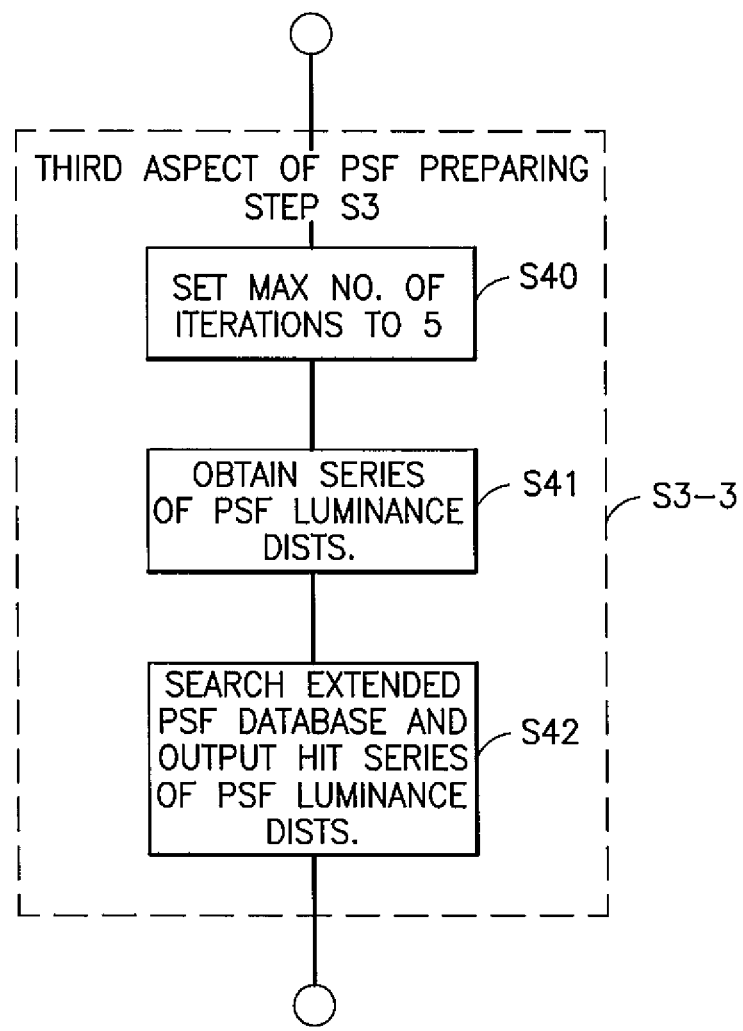
FIG. 4 is a flowchart showing an example of a processing procedure in a third aspect of a PSF preparing step of a third invention according to the present invention.

FIG. 4 shows, in the form of a flowchart, an example of a processing procedure in a third aspect S3-3 of the PSF preparing step S3 of a third invention according to the present invention. In the flowchart shown in FIG. 4, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies the maximum number of iterations 1, thick lines signify processing flows, circles having white backgrounds signify a joint, a start, and an end of processing, and black circles signify branches and joints of data.

The third aspect S3-3 of the PSF preparing step S3 shown in FIG. 4 is characterized by including (S40) a step of setting the maximum number of iterations 1 to 5; (S41) a step of executing the PSF preparing step in advance for all the pairs of degradation indices and PSF luminance distributions associated therewith in the PSF database 13 to obtain a series of PSF luminance distributions 3 for each of the degradation indices and editing the series of PSF luminance distributions for each of the degradation indices to prepare an extended PSF database 18 in which the series of PSF luminance distributions is organized in association with the degradation indices; and (S42) a step of searching the extended PSF database 18 by using the degradation index 2 and retrieving a hit series of PSF luminance distributions 3.

Figure 5:
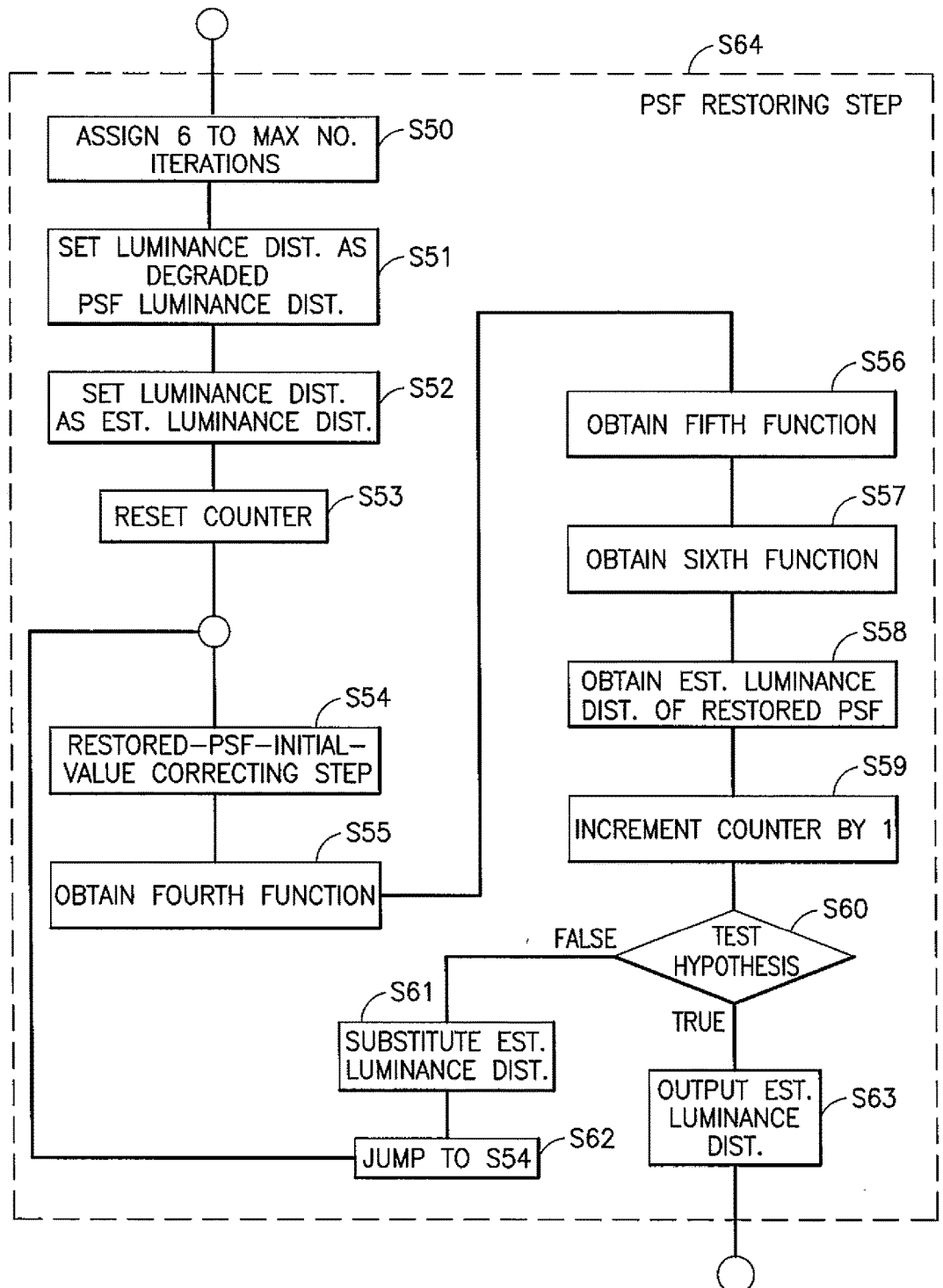
FIG. 5 is a flowchart showing an example of a processing procedure in a PSF restoring step of a fourth invention according to the present invention.

FIG. 5 shows, in the form of a flowchart, an example of a processing procedure in a PSF restoring step S63 of a fourth invention according to the present invention. In the flowchart shown in FIG. 5, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies the maximum number of iterations 1, thick lines signify processing flows, circles having white backgrounds signify a joint, a start, and an end of processing, and black circles signify branches and joints of data.

The PSF restoring step S64 shown in FIG. 5 is characterized by including (S50) a step of assigning 6 to the maximum number of iterations 1; (S51) a step of considering the luminance distribution 15 of the PSF initial values as a luminance distribution of a degraded image and setting the luminance distribution as a degraded PSF luminance distribution 19; (S52) a step of setting the luminance distribution 15 of the PSF initial values as an estimated luminance distribution 20 of restored PSF initial values; (S53) a step of assigning 1 to and thereby resetting the counter; (S54) a restored-PSF-initial-value correcting step of setting the estimated luminance distribution 20 of the restored-PSF initial values as an estimated luminance distribution 21 of corrected-restored-PSF initial values and, when convolving the luminance distribution 15 of the PSF initial values with the estimated luminance distribution 21 of the corrected-restored-PSF initial values, calculating a region where computation is difficult, the region occurring in a peripheral region in the estimated luminance distribution 21 of the corrected-restored-PSF initial values, on the basis of the image size of the luminance distribution 15 of the PSF initial values, copying the pixels associated with a top-edge boundary in the region where computation is difficult, pasting the copied pixels to the outside of the top-edge boundary of the estimated luminance distribution 21 of the corrected-restored-PSF initial values in mirror symmetry with respect to the top-edge boundary, and executing similar computations clockwise for a right edge, a bottom edge, and finally a left edge, thereby correcting the estimated luminance distribution 21 of the corrected-restored-PSF initial values; (S55) a step of convolving the luminance distribution 15 of the PSF initial values with the estimated luminance distribution 21 of the corrected-restored-PSF initial values to obtain a fourth function; (S56) a step of inverting the fourth function to obtain a fifth function; (S57) a step of multiplying the fifth function by the degraded PSF luminance distribution 19 to obtain a sixth function; (S58) a step of multiplying the estimated luminance distribution 20 of the restored-PSF initial values by the sixth function to obtain an estimated luminance distribution 22 of a restored PSF; (S59) a step of incrementing the counter by 1; (S60) a step of testing a hypothesis that the value of the counter has exceeded the maximum number of iterations 1, proceeding to step (S61) if the test result is false, and jumping to step (S63) if the test result is true; (S61) a step of substituting the estimated luminance distribution 22 of the restored PSF for the estimated luminance distribution 20 of the restored-PSF initial values; (S62) a step of jumping to step (S54); and (S63) a step of outputting the estimated luminance distribution 22 of the restored PSF as a luminance distribution 16 of a maximum-likelihood restored PSF.

Figure 6:
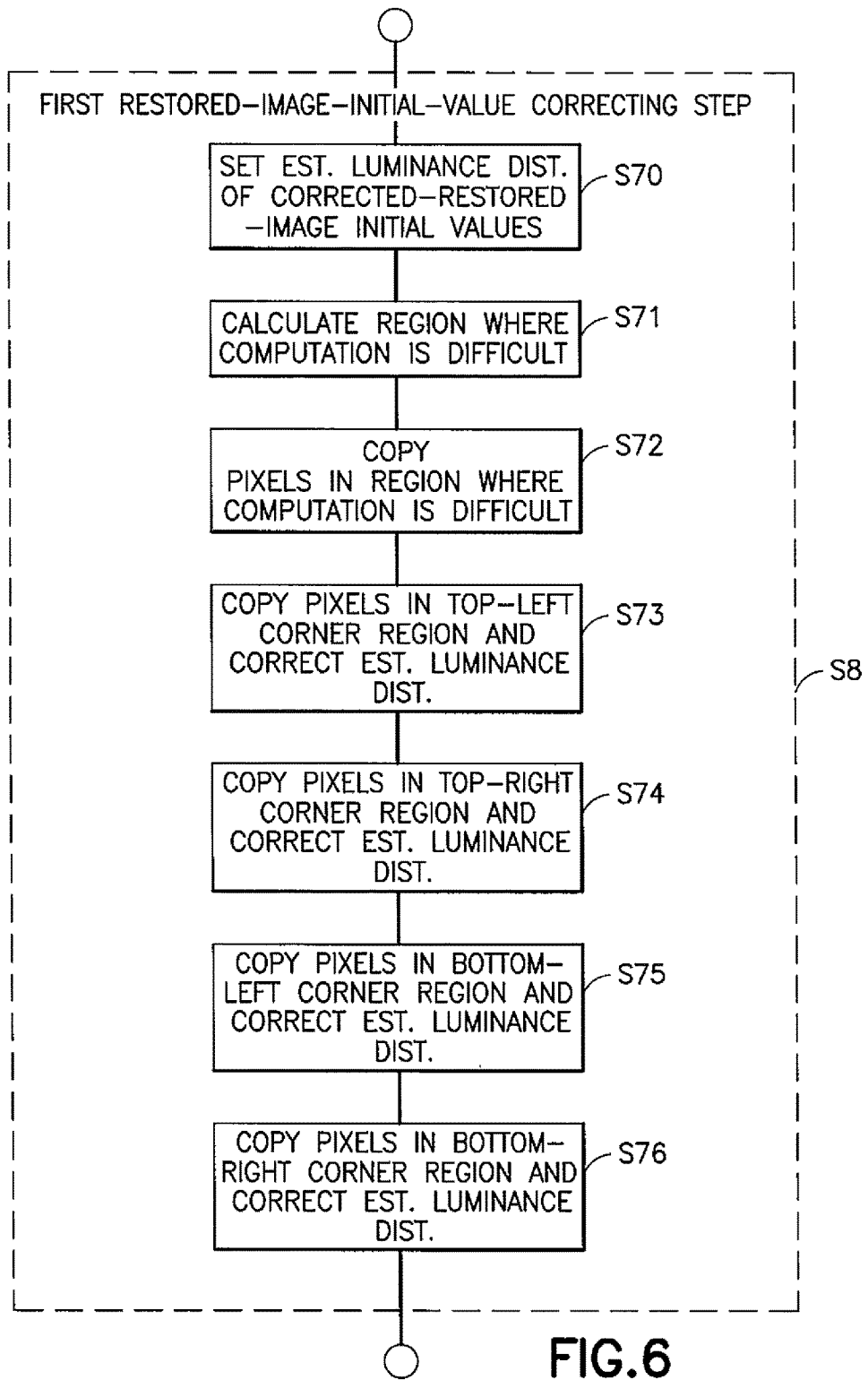
FIG. 6 is a flowchart showing an example of a processing procedure in a first restored-image-initial-value correcting step of a fifth invention according to the present invention.

FIG. 6 shows, in the form of a flowchart, an example of a processing procedure in the first restored-image-initial-value correcting step S8 of a fifth invention according to the present invention. In the flowchart shown in FIG. 5, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies the maximum number of iterations 1, thick lines signify processing flows, circles having white backgrounds signify a joint, a start, and an end of processing, and black circles signify branches and joints of data.

The first restored-image-initial-value correcting step S8 shown in FIG. 6 is characterized by including (S70) a step of setting the estimated luminance distribution 6 of the restored-image initial values as an estimated luminance distribution 8 of corrected-restored-image initial values; (S71) a step of calculating, on the basis of the PSF size 7, a region where computation is difficult, the region occurring in a peripheral region in the estimated luminance distribution 8 of the corrected-restored-image initial values when convolving one of the series of PSF luminance distributions 3 with the estimated luminance distribution 8 of the corrected-restored-image initial values; (S72) a step of copying the pixels in the region where computation is difficult in the estimated luminance distribution 8 of the corrected-restored-image initial values, individually inverting the copied pixels in mirror symmetry with respect to the four edges of the estimated luminance distribution of the corrected-restored-image initial values, and pasting the pixels to the outside of the boundaries at the four edges of the estimated luminance distribution 8 of the corrected-restored-image initial values to correct the estimated luminance distribution 8; (S73) a step of copying the pixels in a top-left corner region in the region where computation is difficult in the estimated luminance distribution 8 of the corrected-restored-image initial values, rotating the copied pixels in the top-left corner region by 180 degrees about the vertex at the top-left corner, and pasting the pixels to a blank region generated in the top-left corner region of the estimated luminance distribution 8 of the corrected-restored-image initial values to correct the estimated luminance distribution 8; (S74) a step of copying the pixels in a top-right corner region in the region where computation is difficult in the estimated luminance distribution 8 of the corrected-restored-image initial values, rotating the copied pixels in the top-right corner region by 180 degrees about the vertex at the top-right corner, and pasting the pixels to a blank region generated in the top-right corner region of the estimated luminance distribution 8 of the corrected-restored-image initial values to correct the estimated luminance distribution 8; (S75) a step of copying the pixels in a bottom-left corner region in the region where computation is difficult in the estimated luminance distribution 8 of the corrected-restored-image initial values, rotating the copied pixels in the bottom-left corner region by 180 degrees about the vertex at the top-left corner, and pasting the pixels to a blank region generated in the bottom-left corner region of the estimated luminance distribution 8 of the corrected-restored-image initial values to correct the estimated luminance distribution 8; and (S76) a step of copying the pixels in a bottom-right corner region in the region where computation is difficult in the estimated luminance distribution 8 of the corrected-restored-image initial values, rotating the copied pixels in the bottom-right corner region by 180 degrees about the vertex at the top-right corner, and pasting the pixels to a blank region generated in the bottom-right corner region of the estimated luminance distribution 8 of the corrected-restored-image initial values to correct the estimated luminance distribution 8.

Figure 7:
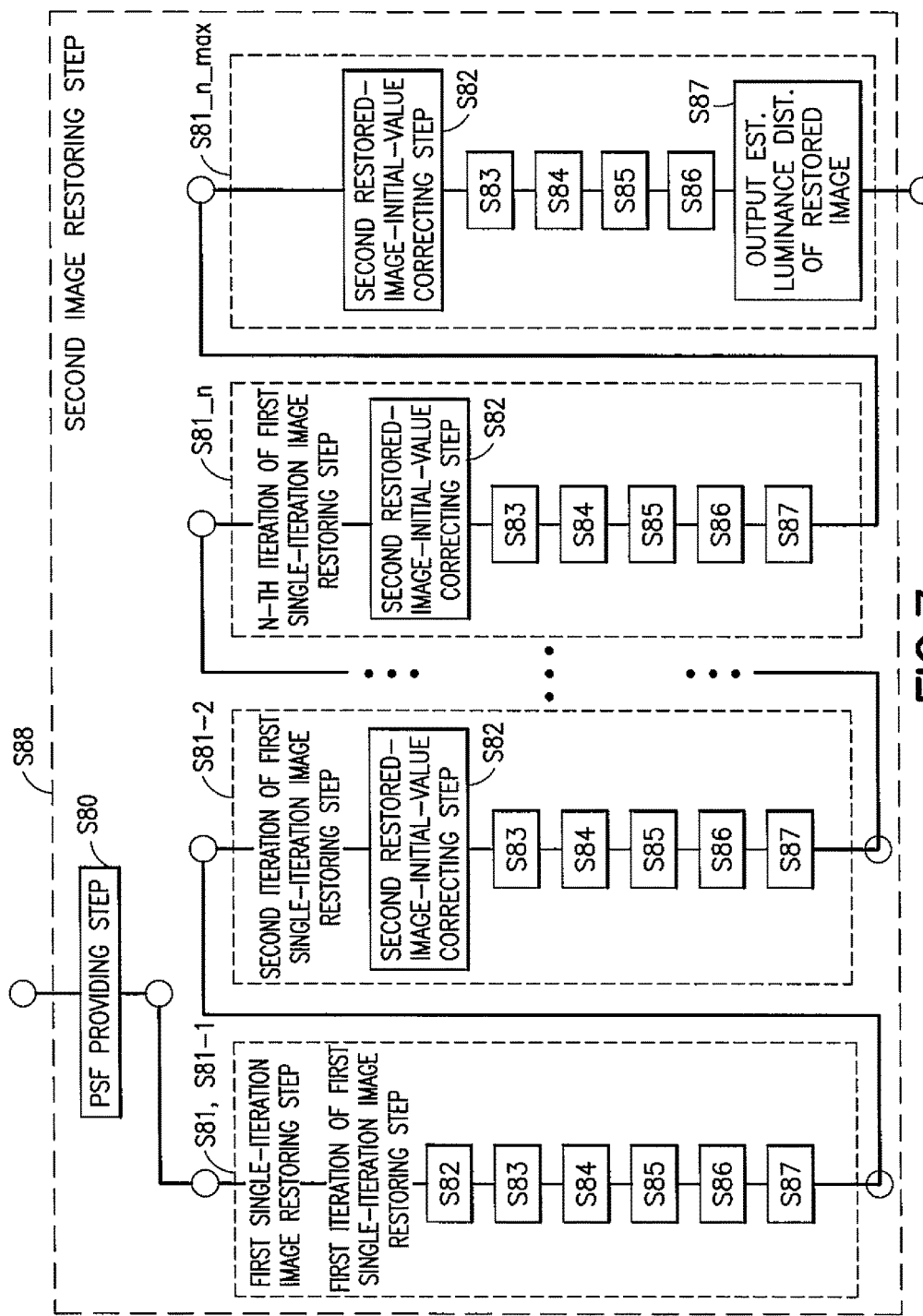
FIG. 7 is a flowchart showing an example of a processing procedure in a second image restoring step, as a second aspect of a first image restoring step, of a sixth invention according to the present invention.

FIG. 7 shows, in the form of a flowchart, an example of a processing procedure in the first image restoring step S20 of a sixth invention according to the present invention. In the flowchart shown in FIG. 7, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies the maximum number of iterations 1, thick lines signify processing flows, circles having white backgrounds signify a joint, a start, and an end of processing, and black circles signify branches and joints of data.

The second image restoring step S88 shown in FIG. 7 is characterized by including (S80) a PSF providing step of providing an n-th iteration S81-$n$ of a first single-iteration image restoring step with an n-th PSF luminance distribution 17 as a PSF luminance distribution 9 among the series of PSF luminance distributions 3, where n_max signifies the maximum number of iterations 1 and n signifies a natural number less than n_max; and (S81) the single-iteration image restoring step of executing a computation corresponding to one iteration in iterations based on a formula of Bayse probability theory from the PSF luminance distribution 9, the estimated luminance distribution 6 of the restored-image initial values, and the luminance distribution 4 of the degraded image to obtain and output an estimated luminance distribution 10 of a restored image having a maximum likelihood for the luminance distribution 4 of the degraded image, the single-iteration image restoring step S81 including (S82) a second restored-image-initial-value correcting step, constituted of the same processing procedure as the first restored-image-initial-value correcting step, of correcting the estimated luminance distribution 6 of the restored-image initial values on the basis of the PSF size 7 to obtain an estimated luminance distribution 8 of corrected-restored-image initial values; (S83) a step of convolving the PSF luminance distribution 9 with the estimated luminance distribution 8 of the corrected-restored-image initial values to obtain a seventh function; (S84) a step of inverting the seventh function to obtain an eighth function; (S85) a step of multiplying the eighth function by the luminance distribution 4 of the degraded image to obtain a ninth function; (S86) a step of multiplying the estimated luminance distribution 6 of the restored-image initial values by the ninth function to obtain an estimated luminance distribution 10 of a restored image; and (S87) a step of outputting the estimated luminance distribution 10 of the restored image, and is characterized by being (S88) a second image restoring step constituted of a series connection of n_max iterations configured by connecting the output of step (S87) of the n-th iteration S81-$n$ of the first single-iteration image restoring step to step (S82) of the (n+1)-th iteration S81-($n$+1) of the first single-iteration image restoring step, and in the second image restoring step S88, n_max iterations, corresponding to the number of iterations of the first single-iteration image restoring step S81 connected in series, are executed, and the estimated luminance distribution 10 of the restored image output from the n_max-th iteration S81-$n$_max of the first single-iteration image restoring step is output as a luminance distribution 11 of a maximum-likelihood restored image.

The second image restoring step S88 shown in FIG. 7 is formed of a series connection of the first iteration S81-1 of the first single-iteration image restoring step configured the same as the first single-iteration image restoring step S81, the second iteration S81-2 of the first single-iteration image restoring step configured the same as the first single-iteration image restoring step S81, the n-th iteration S81-$n$ of the first single-iteration image restoring step configured the same as the first single-iteration image restoring step S81, and the n_max-th iteration S81-$n$_max of the first single-iteration image restoring step configured the same as the first single-iteration image restoring step S81. The third iteration S70-3 of the second single-iteration image restoring step to the iteration S81-($n$_max−1) immediately before the final iteration of the single-iteration image restoring step are omitted since these iterations are connected in the same manner as the second iteration.

In the second image restoring step S88, in the steps equivalent to step S83 in the first iteration S81-1 of the first single-iteration image restoring step to the n_max-th iteration S88-$n$_max of the n_max-th single-iteration image restoring step, PSF luminance distributions matching the number of iterations provided in the PSF providing step S80 are read. For example, the first PSF luminance distribution 14 is read in the first iteration S81-1 of the single-iteration image restoring step, the second PSF luminance distribution 24 is read in the second iteration S81-2 of the single-iteration image restoring step, the n-th PSF luminance distribution 17 is read in the n-th iteration S81-$n$ of the first single-iteration image restoring step, and the n_max-th PSF luminance distribution 25 is read in the n_max-th iteration S81-$n$_max of the first single-iteration image restoring step.

In the second image restoring step S88, in the steps equivalent to step S85 in the first iteration S81-1 of the first single-iteration image restoring step to the n_max-th iteration S88-$n$_max of the n_max-th single-iteration image restoring step, the luminance distribution 4 of the degraded image is read from the degraded-image preparing step S4 of the preparing step S19. Furthermore, in the step equivalent to step S82 in the first iteration S81-1 of the first single-iteration image restoring step, the estimated luminance distribution 6 of the restored-image initial values is read from the restored-image-initial-value preparing step S5. In the step equivalent to step S82 in the n-th iteration S81-$n$ (2≤n≤) of the first single-iteration image restoring step, the estimated luminance distribution 10 of the restored image, output from the step equivalent to step S87 in the preceding (n−1)-th iteration S81-($n$−1) (2≤n≤) of the first single-iteration image restoring step, is read. Furthermore, in the step equivalent to step S87 in the n_max-th iteration S88-$n$_max of the n_max-th single-iteration image restoring step, the estimated luminance distribution 10 of the restored image is output as the luminance distribution 11 of the maximum-likelihood restored image. Furthermore, with the second image restoring step S88 shown in FIG. 7, if the same number of iterations of the second single-iteration image restoring step S81 as the maximum number of iterations 1 are connected in series, a restoration ability comparable to that of the first image restoring step S20 shown in FIG. 2 is provided.

Figure 8:
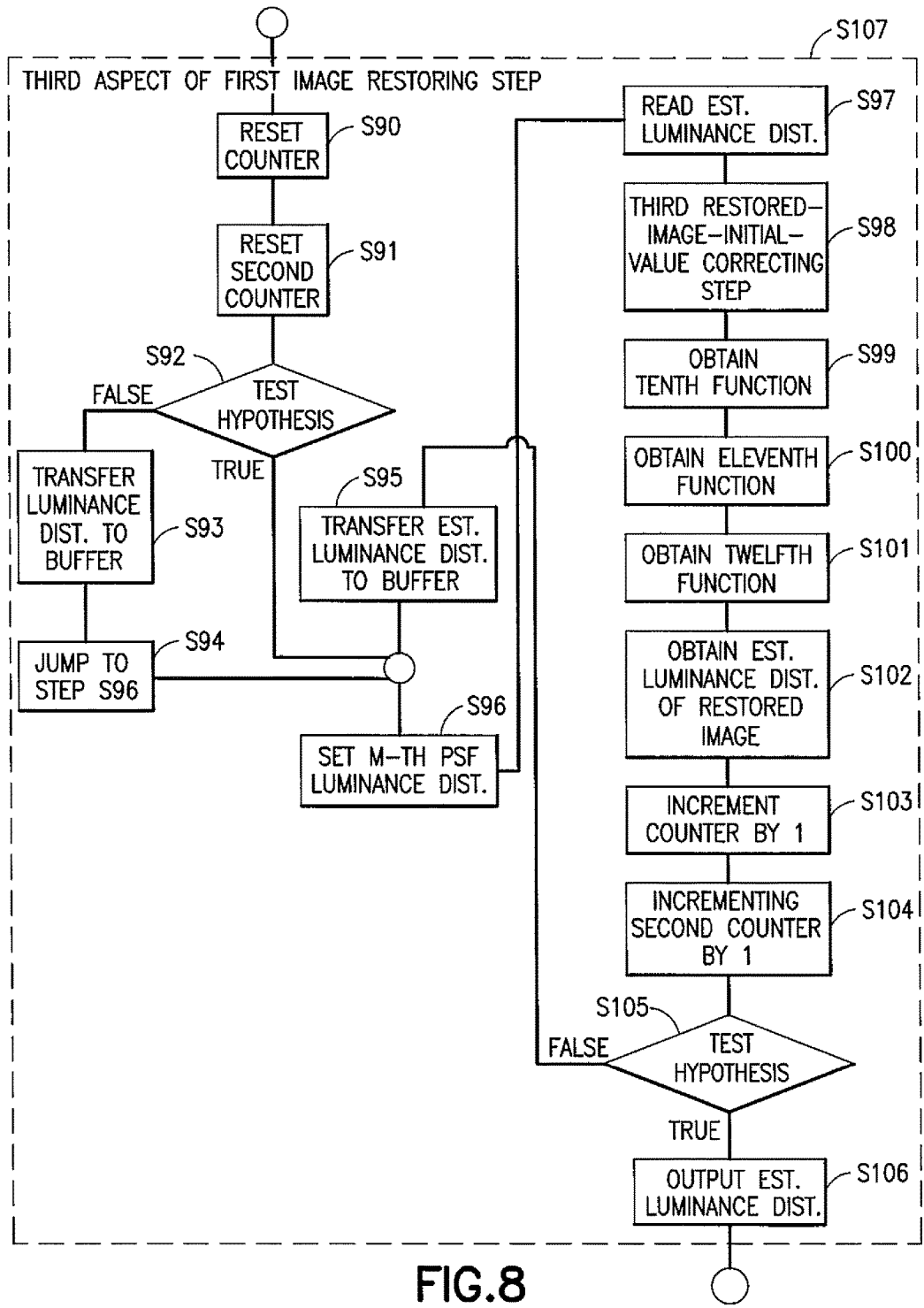
FIG. 8 is a flowchart showing an example of a processing procedure in a third image restoring step of a seventh invention according to the present invention.

FIG. 8 shows, in the form of a flowchart, an example of a processing procedure in third image restoring step S107 of a seventh invention according to the present invention. In the flowchart shown in FIG. 8, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies the maximum number of iterations 1, thick lines signify processing flows, circles having white backgrounds signify a joint, a start, and an end of processing, and black circles signify branches and joints of data.

The third image restoring step S107 shown in FIG. 8 is characterized by including (S90) a step of assigning 0 to and thereby resetting the counter; (S91) a step of assigning 1 to and thereby resetting the second counter; (S92) a step of testing a hypothesis that the value of the counter is not 0, proceeding to step (S93) if the test result is false, and jumping to step (S96) if the test result is true; (S93) a step of transferring the luminance distribution 4 of the degraded image to a buffer 26 for saving the degraded image and to a buffer 27 for the restored-image initial values; (S94) a step of jumping to step (S96); (S95) a step of transferring an estimated luminance distribution 10 of a restored image in step (S102) to the buffer 27 for the restored-image initial values; (S96) a step of setting an m-th PSF luminance distribution in the series of PSFs 3 as a PSF luminance distribution 9, where m signifies the value of the second counter; (S97) a step of reading the estimated luminance distribution 6 of the restored-image initial values from the buffer 27 for the restored-image initial values; (S98) a third restored-image-initial-value correcting step, constituted of the same processing procedure as the first restored-image-initial-value correcting step, of correcting the estimated luminance distribution 6 of the restored-image initial values on the basis of the PSF size 7 and setting the result as an estimated luminance distribution 8 of corrected-restored-image initial values; (S99) a step of convolving the PSF luminance distribution 9 with the estimated luminance distribution 8 of the corrected-restored-image initial values to obtain a tenth function; (S100) a step of inverting the tenth function to obtain an eleventh function; (S101) a step of reading the luminance distribution 4 of the degraded image from the buffer 26 for saving the degraded image and multiplying the eleventh function by the luminance distribution to obtain a twelfth function; (S102) a step of multiplying the estimated luminance distribution 6 of the restored-image initial values by the twelfth function to obtain an estimated luminance distribution 10 of a restored image; (S103) a step of incrementing the counter by 1; (S104) a step of incrementing the second counter by 1; (S105) a step of testing a hypothesis that the value of the counter has exceeded the maximum number of iterations 1, jumping to step (S95) if the test result is false, and proceeding to step (S106) if the test result is true; and (S106) a step of outputting the estimated luminance distribution 10 of the restored image as a luminance distribution 11 of a maximum-likelihood restored image, and is characterized by being (S107) a third image restoring step of completing the maximum number of iterations by executing iterations in ascending order of the index on S in the individual steps and outputting the maximum-likelihood restored image having a maximum likelihood.

Figures 9, 10:
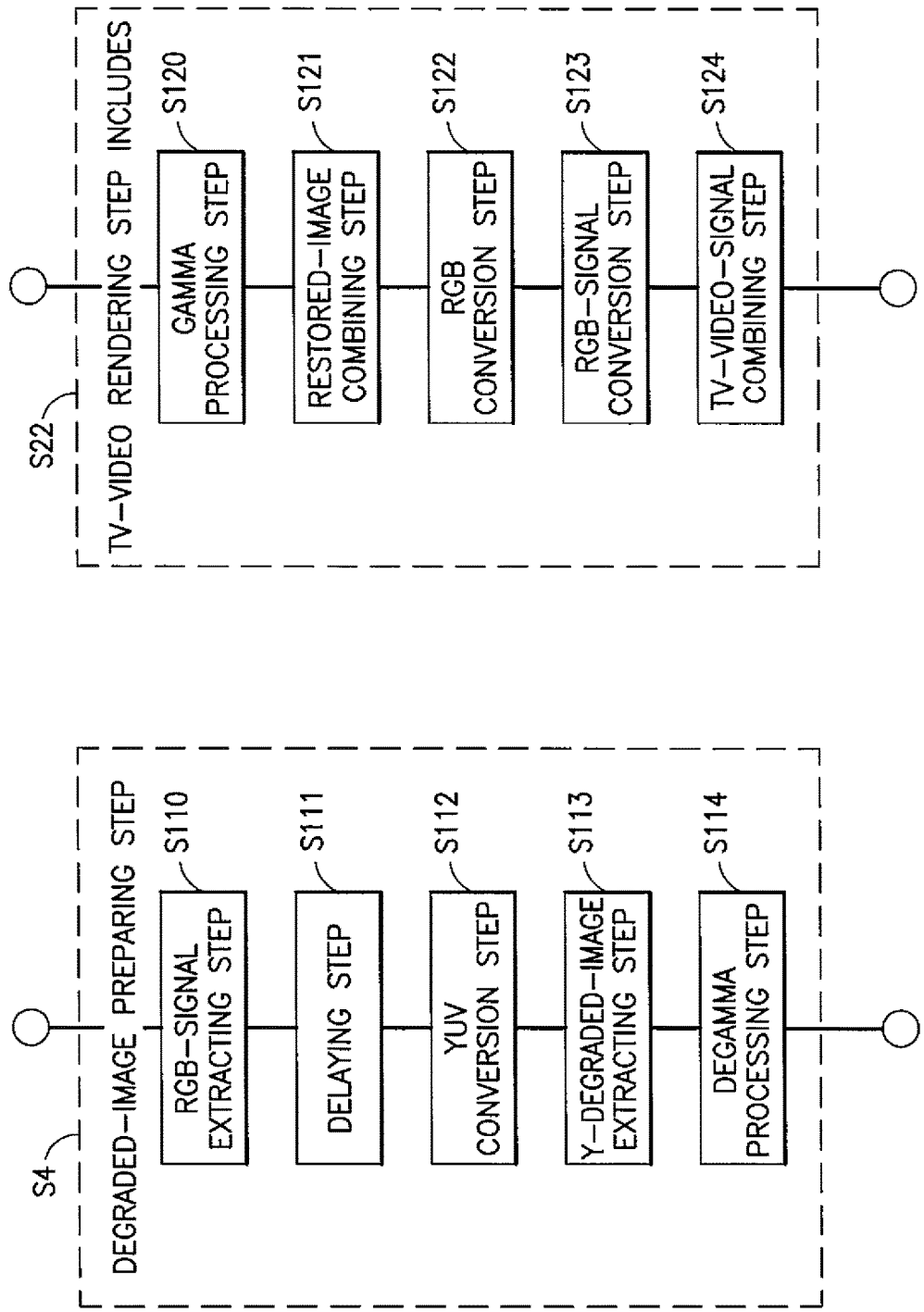
FIG. 9 is a flowchart showing an example of a processing procedure in a degraded-image preparing step of an eighth invention according to the present invention.
FIG. 10 is a flowchart showing an example of a processing procedure in a TV-video rendering step of a ninth invention according to the present invention.

FIG. 9 shows, in the form of a flowchart, an example of a processing procedure in the degraded-image preparing step S4 of an eighth invention according to the present invention. In the flowchart shown in FIG. 9, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies the maximum number of iterations 1, thick lines signify processing flows, circles having white backgrounds signify a joint, a start, and an end of processing, and black circles signify branches and joints of data.

The degraded-image preparing step S4 shown in FIG. 9 is characterized by including (S110) an RGB-signal extracting step of extracting RGB signals 28 constituting a frame from TV video signals 15 for the frame; (S111) a delaying step of outputting, with a delay corresponding to one frame, the TV video signals 29 remaining after extracting the RGB signals 28 from the single-frame TV video signals 15; (S112) a YUV conversion step of subjecting the RGB signals 28 to YUV conversion to obtain YUV signals 30; (S113) a Y-degraded-image extracting step of extracting a luminance distribution 4 of a degraded image constituted of only Y signals representing luminance components among the YUV signals 30 to obtain a luminance distribution 31 of a Y degraded image and keeping a distribution 32 of a U degraded image constituted of only the remaining U signals and a distribution 33 of a V degraded image constituted of only the remaining V signals; and (S114) a degamma processing step of executing degamma processing of the luminance distribution 31 of the Y degraded image to obtain and output a luminance distribution 4 of a degraded image constituted of a single-frame luminance distribution.

FIG. 10 shows, in the form of a flowchart, an example of a processing procedure in the TV-video rendering step S22 of a ninth invention according to the present invention. In the flowchart shown in FIG. 10, rectangles containing step numbers on white backgrounds signify steps other than determining steps, diamonds containing step numbers on white backgrounds signify determining steps, arrows signify directions of data input/output, rectangles containing numbers on white backgrounds signify elements, for example, 1 signifies the maximum number of iterations 1, thick lines signify processing flows, circles having white backgrounds signify a joint, a start, and an end of processing, and black circles signify branches and joints of data.

The TV-video rendering step S22 shown in FIG. 10 is characterized by including (S120) a gamma processing step of executing gamma processing of the luminance distribution 11 of the maximum-likelihood restored image; (S121) a restored-image combining step of combining the distribution 32 of the U degraded image and the distribution 33 of the V degraded image kept in the Y-degraded-image extracting step S113 with the luminance distribution 11 of the maximum-likelihood restored image after the gamma processing constituted of Y components to obtain a distribution 34 of a single YUV restored image; (S122) an RGB conversion step of executing RGB conversion of the distribution 34 of the YUV restored image to obtain a distribution 35 of an RGB restored image; (S123) an RGB-signal conversion step of reading the distribution 35 of the RGB restored image and outputting RGB signals 36; and (S124) a TV-video-signal combining step of combining the RGB signals 36 with the remaining TV video signals 29 output in the delaying step S111 to obtain and output super-resolution TV video signals 12 constituted of single-frame TV video signals.

Figure 11:
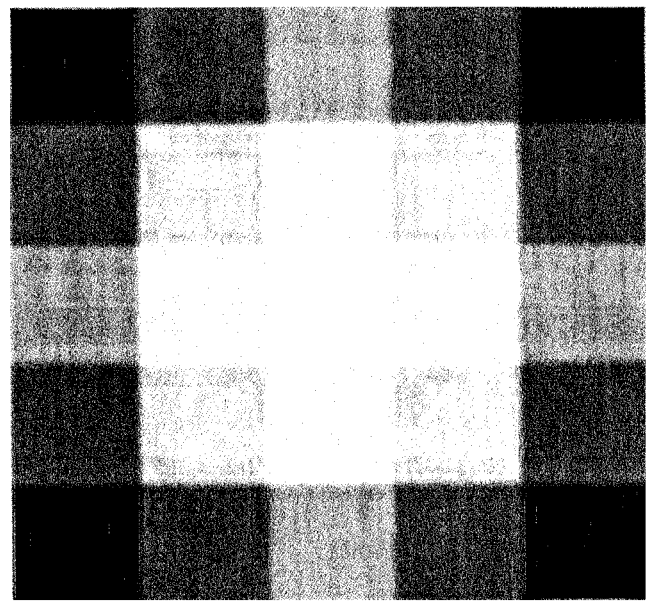
FIG. 11 is a flowchart showing an example of a PSF luminance distribution of a tenth invention according to the present invention.

FIG. 11 shows an example of a PSF luminance distribution 9 of a tenth invention according to the present invention. The PSF luminance distribution 9 shown in FIG. 11 is characterized by being constituted of frameless square pixels of the same size, constituting a two-dimensional normal distribution in which the center is brightest, and having a size of 5×5 pixels. Since the PSF luminance distribution 9 is a two-dimensional normal distribution, the PSF luminance distribution 9 is point symmetric and shift invariant.

A first accelerated super-resolution processing program 37 of an eleventh invention according to the present invention is a program in which all the steps in the preparing step S19 and the first image restoring step S20 are created virtually and in which a processing procedure of these steps is described.

A second accelerated super-resolution processing program 38 of a twelfth invention according to the present invention is a program in which all the steps in the preparing step S19 and the second image restoring step S88 are created virtually and in which a processing procedure of these steps is described.

A third accelerated super-resolution processing program 39 of a thirteenth invention according to the present invention is a program in which all the steps in the preparing step S19 and the third image restoring step S107 are created virtually and in which a processing procedure of these steps is described.

A fourteenth invention according to the present invention is a first storage medium 46 characterized in that the first accelerated super-resolution processing program 37, the second accelerated super-resolution processing program 38, and the third accelerated super-resolution processing program 39 are all encrypted, in that these encrypted first accelerated super-resolution processing program 37, second accelerated super-resolution processing program 38, and third accelerated super-resolution processing program 39 are stored, and in that the first storage medium 46 can be connected to a computer and can be read by the computer.

Figure 12:
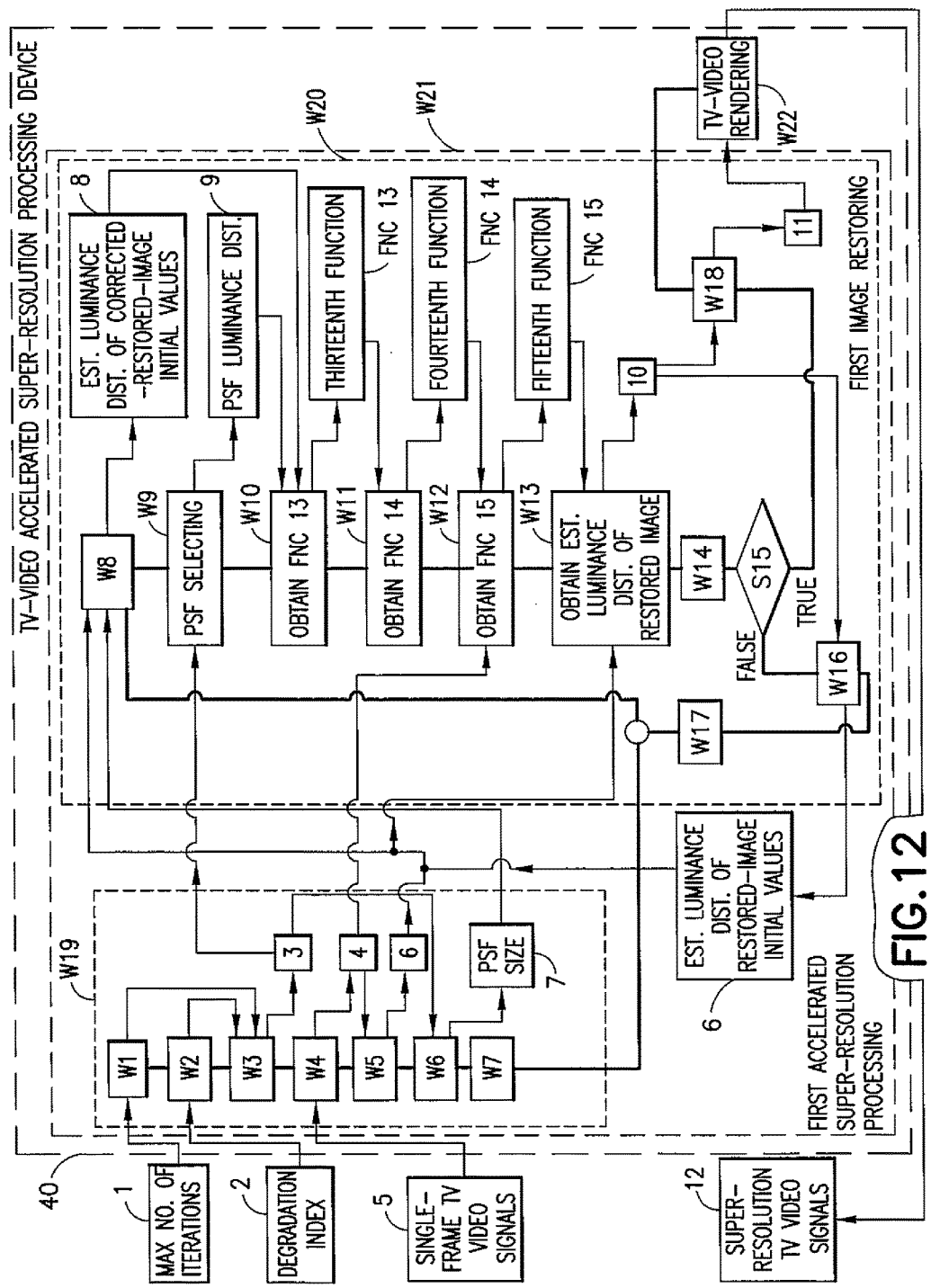
FIG. 12 is a diagram showing an example relating to the configuration of a TV-video accelerated super-resolution processing device of a fifteenth invention according to the present invention.

FIG. 12 shows an example relating to the configuration of a TV-video accelerated super-resolution processing device 40 of a fifteenth invention according to the present invention. In FIG. 12, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The TV-video accelerated super-resolution processing device 40 shown in FIG. 12 is characterized by including (W1) a means for setting a maximum number of iterations 1; (W2) a degradation-index designating means for designating a degradation index 2 suitable for a degradation state of the TV video while the TV video is being viewed; (W3) a PSF preparing means for preparing a first PSF luminance distribution 14 associated with the degradation index 2 and a series of PSF luminance distributions 3 derived from the first PSF luminance distribution and organized in association with numbers of iterations; (W4) a degraded-image preparing means for preparing, from single-frame TV video signals 5, a luminance distribution 4 of a degraded image constituted of a single-frame luminance distribution; (W5) a restored-image-initial-value preparing means for setting the luminance distribution 4 of the degraded image as an estimated luminance distribution 6 of restored-image initial values; (W6) a PSF-size obtaining means for obtaining a PSF size 7, the PSF size referring to an image size that is the same among the series of PSF luminance distributions 3; (W7) a first resetting means for setting a counter that counts the number of iterations to 1; (W8) a first restored-image-initial-value correcting means for copying the estimated luminance distribution 6 of the restored-image initial values, setting the estimated luminance distribution 6 as an estimated luminance distribution 8 of corrected-restored-image initial values, and correcting the estimated luminance distribution 8 of the corrected-restored-image initial values on the basis of the PSF size 7; (W9) a PSF selecting means for selecting one PSF luminance distribution associated with the value of the counter from the series of PSF luminance distributions 3 and setting the selected one as a PSF luminance distribution 9; (W10) a means for convolving the estimated luminance distribution 8 of the corrected-restored-image initial values with the PSF luminance distribution 9 to obtain a thirteenth function; (W11) a means for inverting the thirteenth function to obtain a fourteenth function; (W12) a means for multiplying the fourteenth function by the luminance distribution 4 of the degraded image to obtain a fifteenth function; (W13) a means for multiplying the estimated luminance distribution 6 of the restored-image initial values by the fifteenth function to obtain an estimated luminance distribution 10 of a restored image; (W14) a means for incrementing the counter by 1; (W15) a means for testing a hypothesis that the value of the counter is greater than or equal to the maximum number of iterations 1, proceeding to means (W16) if the test result is false, and proceeding to means (W18) if the test result is true; (W16) a means for substituting the estimated luminance distribution 10 of the restored image for the estimated luminance distribution 6 of the restored-image initial values; (W17) a means for returning to means (W8); (W18) a means for outputting the estimated luminance distribution 10 of the restored image as a luminance distribution 11 of a maximum-likelihood restored image; (W19) a preparing means constituted of means (W1) to (W7); (W20) a first image restoring means constituted of means (W8) to (W18), and is characterized by including (W21) a first accelerated super-resolution processing means for completing the maximum number of iterations 1 by executing iterations in ascending order of the index on W of means in the preparing means W19 and the first image restoring means W20 and outputting the luminance distribution 11 of the maximum-likelihood restored image; and (W22) a TV-video rendering means for rendering the luminance distribution 11 of the maximum-likelihood restored image into single-frame TV video signals 41 and outputting the TV video signals 41 as super-resolution TV video signals 12.

Figure 13:
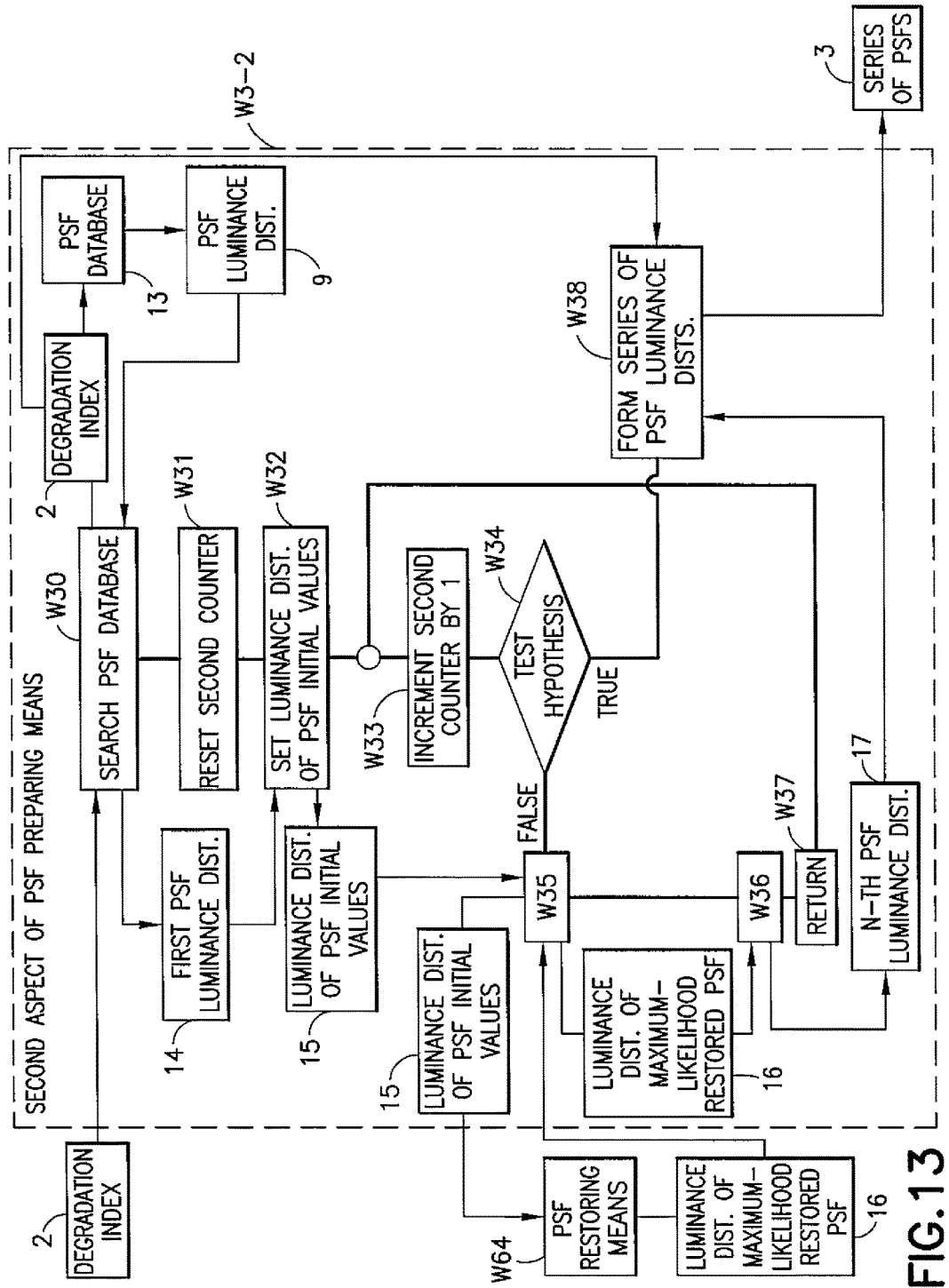
FIG. 13 is a diagram showing an example relating to the configuration of a second aspect of a PSF preparing means of a sixteenth invention according to the present invention.

FIG. 13 shows an example relating to the configuration of a second aspect W3-2 of the PSF preparing means W3 of a sixteenth invention according to the present invention. In FIG. 13, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The second aspect W3-2 of the PSF preparing means W3 shown in FIG. 13 is characterized by including (W30) a means for searching, by using the degradation index 2, a PSF database 13 created by organizing PSF luminance distributions in one-to-one association with degradation indices and setting a hit PSF luminance distribution 9 as a first PSF luminance distribution 14; (W31) a means for inputting 1 to and thereby resetting a second counter that counts numbers; (W32) a means for setting the first PSF luminance distribution 14 as a luminance distribution 15 of PSF initial values; (W33) a means for incrementing the second counter by 1; (W34) a means for testing a hypothesis that the value of the second counter has exceeded the maximum number of iterations 1, proceeding to means (W35) if the test result is false, and jumping to means (W38) if the test result is true; (W35) a means for restoring a luminance distribution 15 of PSF initial values with a PSF restoring means W63 to obtain a luminance distribution 16 of a maximum-likelihood restored PSF; (W36) a means for setting the luminance distribution 16 of the maximum-likelihood restored PSF as an n-th PSF luminance distribution 17, where n signifies the value of the second counter; (W37) a means for returning to means (W33); and (W38) a series-of-luminance-distributions creating step of connecting the first PSF luminance distribution 14 to n_max-th PSF luminance distribution 25 in that order to form a series of PSF luminance distributions, where n_max signifies the maximum number of iterations and n signifies a natural number less than n_max, and labeling the series of PSF luminance distributions with the degradation indices 2 to create the series of PSF luminance distributions 3 associated with the degradation indices.

In the step W38 of creating a series of PSF luminance distributions, shown in FIG. 13, for example, assuming that the degradation index 2 is represented by using an integer variable BF, the image filename of the n-th luminance distribution 17 ($1 \leq n \leq n\_max$) is represented as PSF_BF_n.bmp, and the name of a two-dimensional character array is SPSF, the n-th luminance distribution 17 is received from the means W36, a filename PSF_BF_n.bmp is created from BF and n, the n-th luminance distribution 17 is stored in a large-capacity storage means of a computer, for example, an HDD (Hard Disk Drive), with this filename attached, and the filename is stored in an array SPSF(BF, n), whereby a series of PSF luminance distributions 3 is created.

Figure 14:
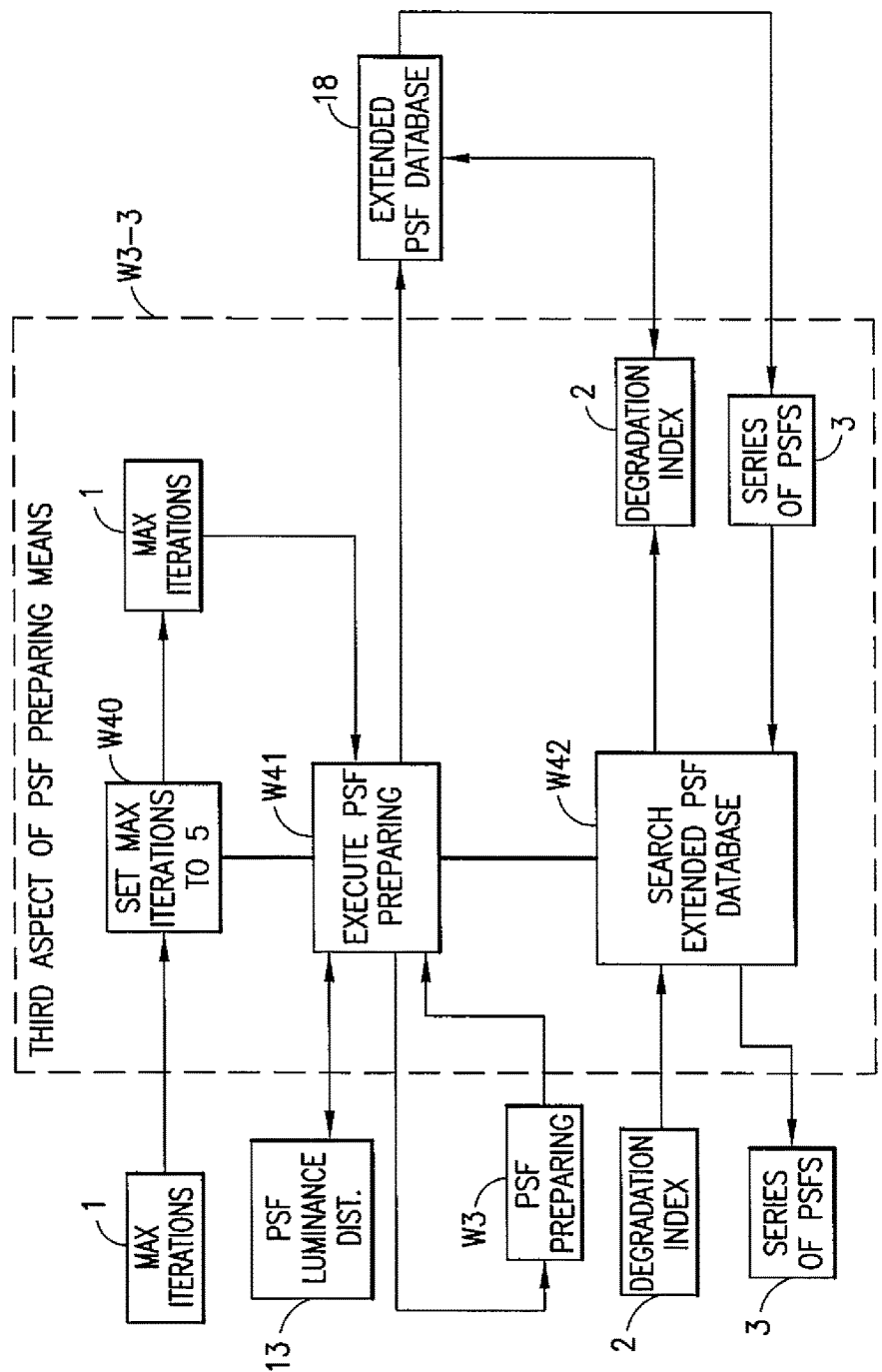
FIG. 14 is a diagram showing an example relating to the configuration of a third aspect of a PSF preparing means of a seventeenth invention according to the present invention.

FIG. 14 shows an example relating to the configuration of a third aspect W3-3 of the PSF preparing means of a seventeenth invention according to the present invention. In FIG. 14, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The third aspect W3-3 of the PSF preparing means W3 shown in FIG. 14 is characterized by including (W40) a means for setting the maximum number of iterations 1 to 5; (W41) a means for executing the PSF preparing means W3 in advance for all the pairs of degradation indices and PSF luminance distributions associated therewith in the PSF database 13 to obtain a series of PSF luminance distributions for each of the degradation indices and editing the series of PSF luminance distributions for each of the degradation indices to prepare an extended PSF database 18 in which the series of PSF luminance distributions is organized in association with the degradation indices; and (W42) a means for searching the extended PSF database 18 by using the degradation index 2 and retrieving and outputting a hit series of PSF luminance distributions 3.

Figure 15:
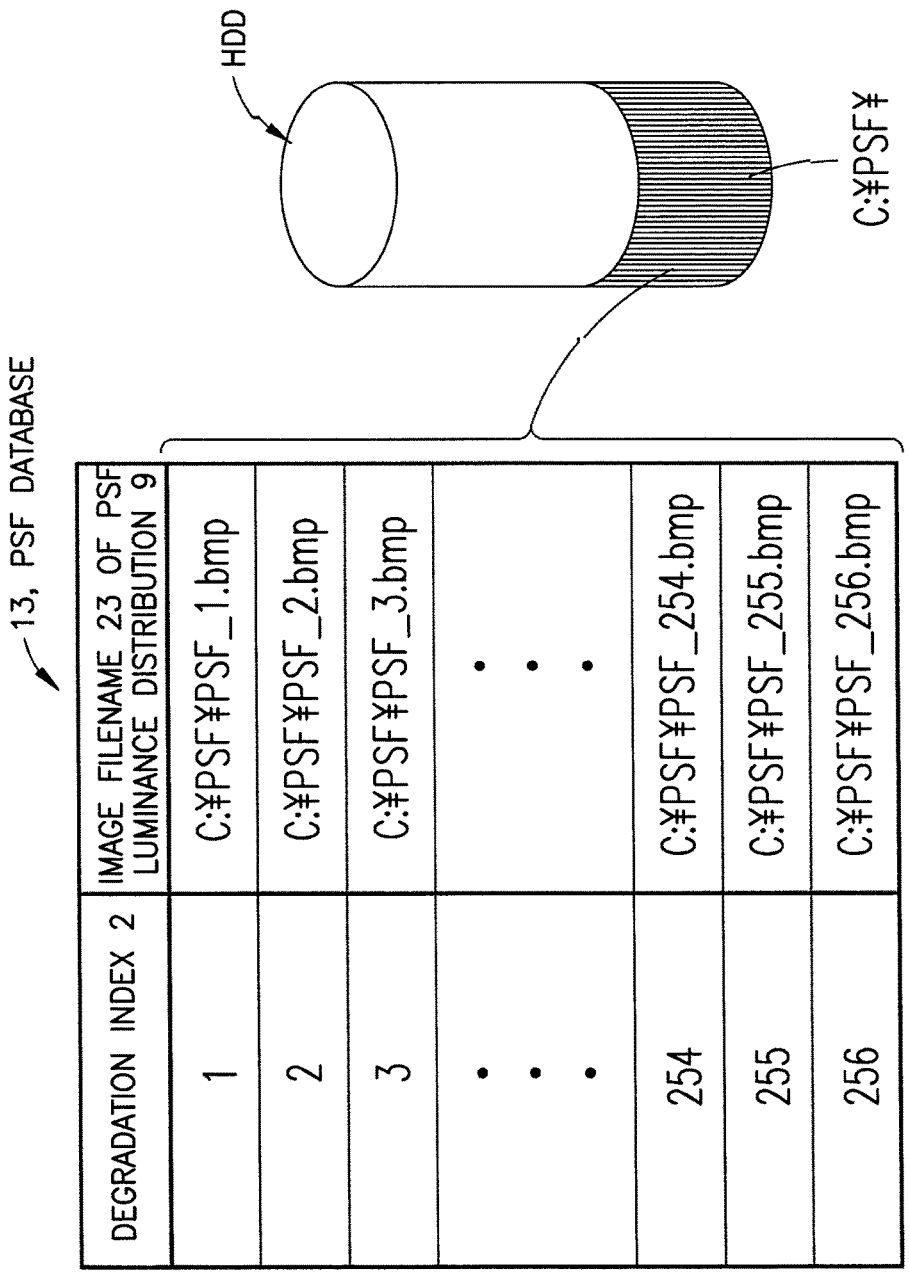
FIG. 15 is a diagram showing an example of data in a PSF database according to the present invention.

FIG. 15 shows an example of data in the PSF database 13 according to the present invention. The PSF database 13 shown in FIG. 15 is a table in CSV format and is stored in an HDD. In the PSF database 13, degradation indices 2 at 256 levels are described in the first column from the left, and the image filenames 23 of PSF luminance distributions 9 associated with the individual degradation indices 2 are described as paths in the second column from the left. The image files of the PSF luminance distributions 9 exist under a directory "PSF" in the C drive in the HDD, and the image filenames of the PSF luminance distributions 9 are associated with the degradation indices 2. For example, in the case where the degradation index 2 is 1, the image filename C:¥PSF¥PSF_1.bmo of the PSF luminance distribution 9 on the first row from the top of the PSF database 13 indicates the storage location of the image file of the PSF luminance distribution 9 associated with the degradation index 2. For example, the means W30 searches the PSF database 13 by using the degradation index 2 to obtain the image filename of the PSF luminance distribution 9 associated with the degradation index 2 and obtains the PSF luminance distribution 9 associated with the image filename of the PSF luminance distribution 9 by reading it from the HDD. The PSF database 13 can also be defined in the form of a two-dimensional array instead of CSV format.

Figure 16:
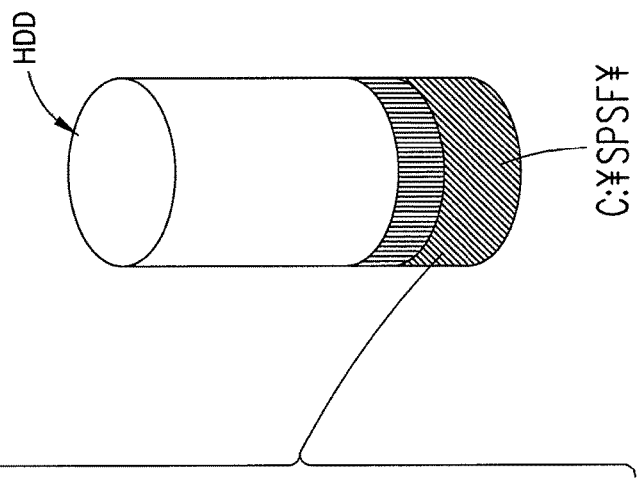
FIG. 16 is a diagram showing an example of data in an extended PSF database according to the present invention.

FIG. 16 shows an example of data in the extended PSF database 18 according to the present invention. The extended PSF database 18 shown in FIG. 16 is a table in CSV format and is stored in an HDD. In the extended PSF database 18, degradation indices 2 at 256 levels are described in the first column from the left, and the image filenames 23 of PSF luminance distributions 9 associated with the individual degradation indices 2 are described as paths in the second and subsequent columns from the left. The second and subsequent columns are associated with the numbers of iterations. In the second column from the left, information for the case where the number of iterations 1 is 1 is described. In the third column from the left, information for the case where the number of iterations 1 is 2 is described. In the last column, information for the case where the number of iterations is n_max is described. The image files of PSF luminance distributions 9 exist under a directory "SPSF in the C drive in the HDD, and the image filenames of the PSF luminance distributions 9 are associated with the degradation indices 2 and the numbers of iterations 1. For example, in the case where the degradation index 2 is 1 and the number of iterations is 1, C:¥SPSF¥SPSF_1_1.bmp, which is the image filename 23 of the PSF luminance distribution 9 in the second column from the left on the first row from the top of the extended PSF database 18, indicates the storage location of the image file of the PSF luminance distribution associated with the degradation index 2 and the number of iterations 1. For example, the means W42 searches the extended PSF database 18 by using the degradation index 2 to identify the row associated with the degradation index 2 in the extended PSF database 18, obtains the image filenames of the PSF luminance distributions 9 in that row sequentially from the column associated with a number of iterations of 1 to the column associated with a number of iterations of n_max, and stores the image filenames in the two-dimensional array SPSF(BF, n), thereby obtaining a series of PSF luminance distributions 3. SPSF(BF, n) is a two-dimensional character array, in which BF is a variable representing the degradation index 2 and n is a variable representing the number of iterations. Then, using the degradation index 2 as BF and the number of iterations as n, the means W9 obtains the image filename 23 of the PSF luminance distribution 9 from SPSF(BF, n) and obtains the PSF luminance distribution 9 corresponding to the image filename 23 of the PSF luminance distribution 9 by reading it from the HDD. The extended PSF database 18 can also be defined in the form of a two-dimensional array instead of CSV format.

Figure 17:
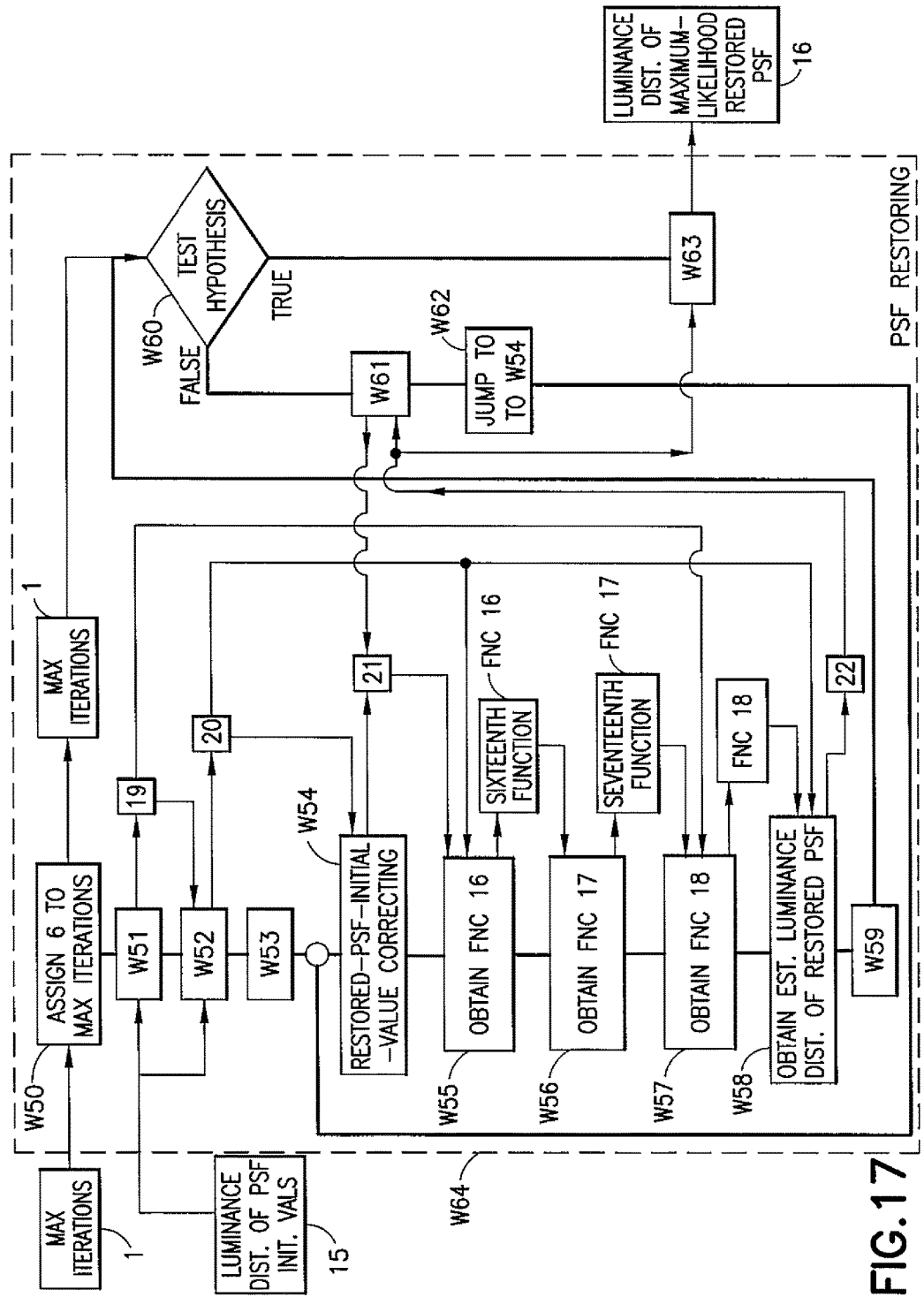
FIG. 17 is a diagram showing an example relating to the configuration of a PSF restoring means of an eighteenth invention according to the present invention.

FIG. 17 shows an example relating to the configuration of the PSF restoring means of an eighteenth invention according to the present invention. In FIG. 17, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The PSF restoring means shown in FIG. 17 is characterized by including (W50) a means for assigning 6 to the maximum number of iterations 1; (W51) a means for considering the luminance distribution 15 of the PSF initial values as a luminance distribution of a degraded image and setting the luminance distribution as a degraded PSF luminance distribution 19; (W52) a means for setting the luminance distribution 15 of the PSF initial values as an estimated luminance distribution 20 of restored PSF initial values; (W53) a means for assigning 1 to and thereby resetting the counter; (W54) a restored-PSF-initial-value correcting means for setting the estimated luminance distribution 20 of the restored-PSF initial values as an estimated luminance distribution 21 of corrected-restored-PSF initial values and, when convolving the luminance distribution 15 of the PSF initial values with the estimated luminance distribution 21 of the corrected-restored-PSF initial values, calculating a region where computation is difficult, the region occurring in a peripheral region in the estimated luminance distribution 21 of the corrected-restored-PSF initial values, on the basis of the image size of the luminance distribution 15 of the PSF initial values, copying the pixels associated with a top-edge boundary in the region where computation is difficult, pasting the copied pixels to the outside of the top-edge boundary of the estimated luminance distribution 21 of the corrected-restored-PSF initial values in mirror symmetry with respect to the top-edge boundary, and executing similar computations clockwise for a right edge, a bottom edge, and finally a left edge, thereby correcting the estimated luminance distribution 21 of the corrected-restored-PSF initial values; (W55) a means for convolving the luminance distribution 15 of the PSF initial values with the estimated luminance distribution 21 of the corrected-restored-PSF initial values to obtain a sixteenth function; (W56) a means for inverting the sixteenth function to obtain a seventeenth function; (W57) a means for multiplying the seventeenth function by the degraded PSF luminance distribution 19 to obtain an eighteenth function; (W58) a means for multiplying the estimated luminance distribution 20 of the restored-PSF initial values by the eighteenth function to obtain an estimated luminance distribution 22 of a restored PSF; (W59) a means for incrementing the counter by 1; (W60) a means for testing a hypothesis that the value of the counter has exceeded the maximum number of iterations 1, jumping to means (W61) if the test result is false, and jumping to means (W63) if the test result is true; (W61) a means for substituting the estimated luminance distribution 22 of the restored PSF for the estimated luminance distribution 20 of the restored-PSF initial values; (W62) a means for jumping to means (W54); and (W63) a means for outputting the estimated luminance distribution 22 of the restored PSF as a luminance distribution 16 of a maximum-likelihood restored PSF.

Figure 18:
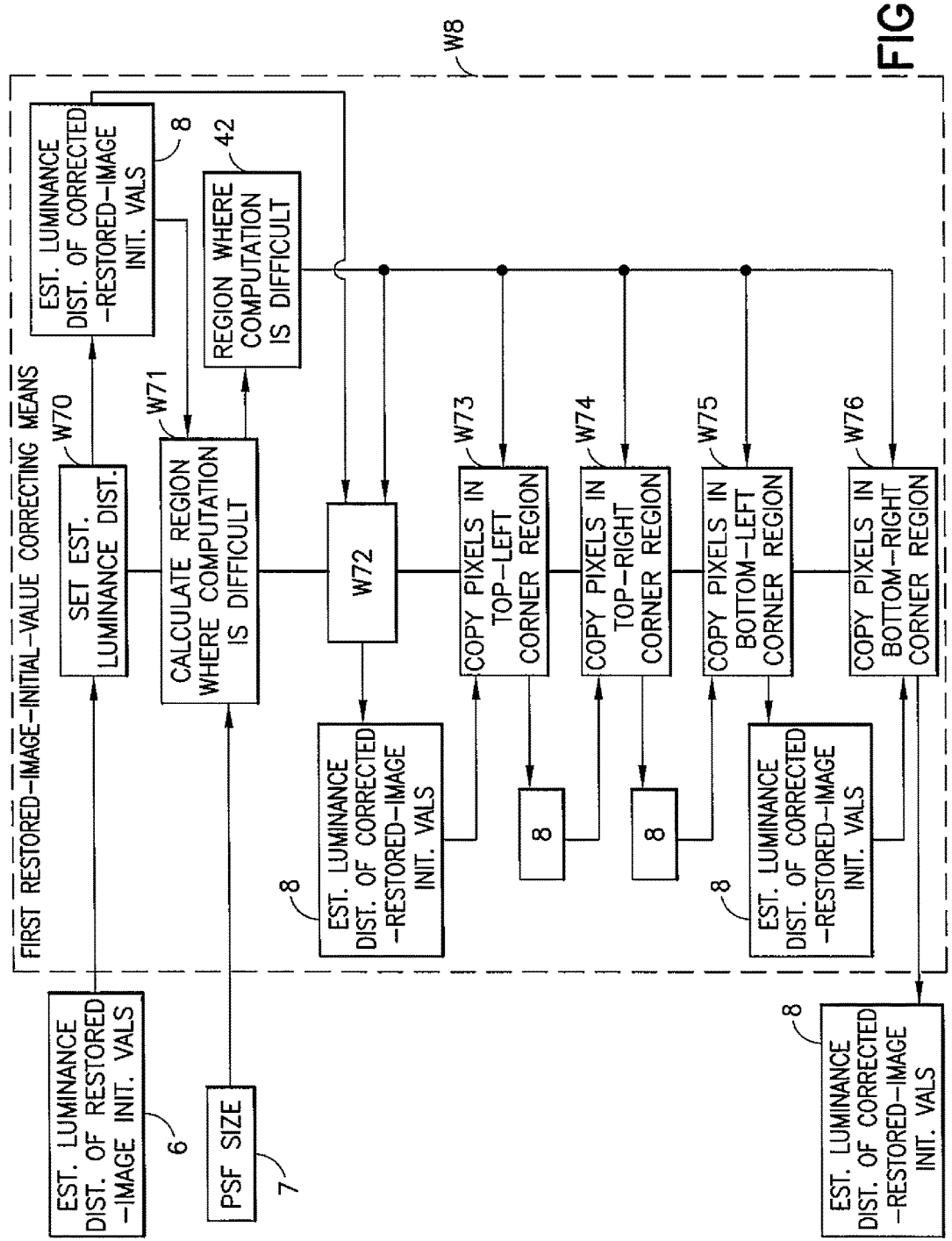
FIG. 18 is a diagram showing an example relating to the configuration of a first restored-image-initial-value correcting means of a nineteenth invention according to the present invention.

FIG. 18 shows an example relating to the configuration of the first restored-image-initial-value correcting means of a nineteenth invention according to the present invention. In FIG. 18, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The first restored-image-initial-value correcting means W8 shown in FIG. 18 is characterized by including (W70) a means for setting the estimated luminance distribution 6 of the restored-image initial values as an estimated luminance distribution 8 of corrected-restored-image initial values; (W71) a means for calculating, on the basis of the PSF size 7, a region 42 where computation is difficult, the region 42 occurring in a peripheral region in the estimated luminance distribution 8 of the corrected-restored-image initial values when convolving one of the series of PSF luminance distributions 3 with the estimated luminance distribution 8 of the corrected-restored-image initial values; (W72) a means for copying the pixels in the region 42 where computation is difficult in the estimated luminance distribution 8 of the corrected-restored-image initial values, individually inverting the copied pixels in mirror symmetry with respect to the four edges of the estimated luminance distribution 8 of the corrected-restored-image initial values, and pasting the pixels to the outside of the boundaries at the four edges of the estimated luminance distribution 8 of the corrected-restored-image initial values to correct the estimated luminance distribution 8; (W73) a means for copying the pixels in a top-left corner region in the region 42 where computation is difficult in the estimated luminance distribution 8 of the corrected-restored-image initial values, rotating the copied pixels in the top-left corner region by 180 degrees about the vertex at the top-left corner, and pasting the pixels to a blank region generated in the top-left corner region of the estimated luminance distribution 8 of the corrected-restored-image initial values to correct the estimated luminance distribution 8; (W74) a means for copying the pixels in a top-right corner region in the region 42 where computation is difficult in the estimated luminance distribution 8 of the corrected-restored-image initial values, rotating the copied pixels in the top-right corner region by 180 degrees about the vertex at the top-right corner, and pasting the pixels to a blank region generated in the top-right corner region of the estimated luminance distribution 8 of the corrected-restored-image initial values to correct the estimated luminance distribution 8; (W75) a means for copying the pixels in a bottom-left corner region in the region 42 where computation is difficult in the estimated luminance distribution 8 of the corrected-restored-image initial values, rotating the copied pixels in the bottom-left corner region by 180 degrees about the vertex at the top-left corner, and pasting the pixels to a blank region generated in the bottom-left corner region of the estimated luminance distribution 8 of the corrected-restored-image initial values to correct the estimated luminance distribution 8; and (W76) a means for copying the pixels in a bottom-right corner region in the region 42 where computation is difficult in the estimated luminance distribution 8 of the corrected-restored-image initial values, rotating the copied pixels in the bottom-right corner region by 180 degrees about the vertex at the top-right corner, and pasting the pixels to a blank region generated in the bottom-right corner region of the estimated luminance distribution 8 of the corrected-restored-image initial values to correct the estimated luminance distribution 8.

Figure 19:
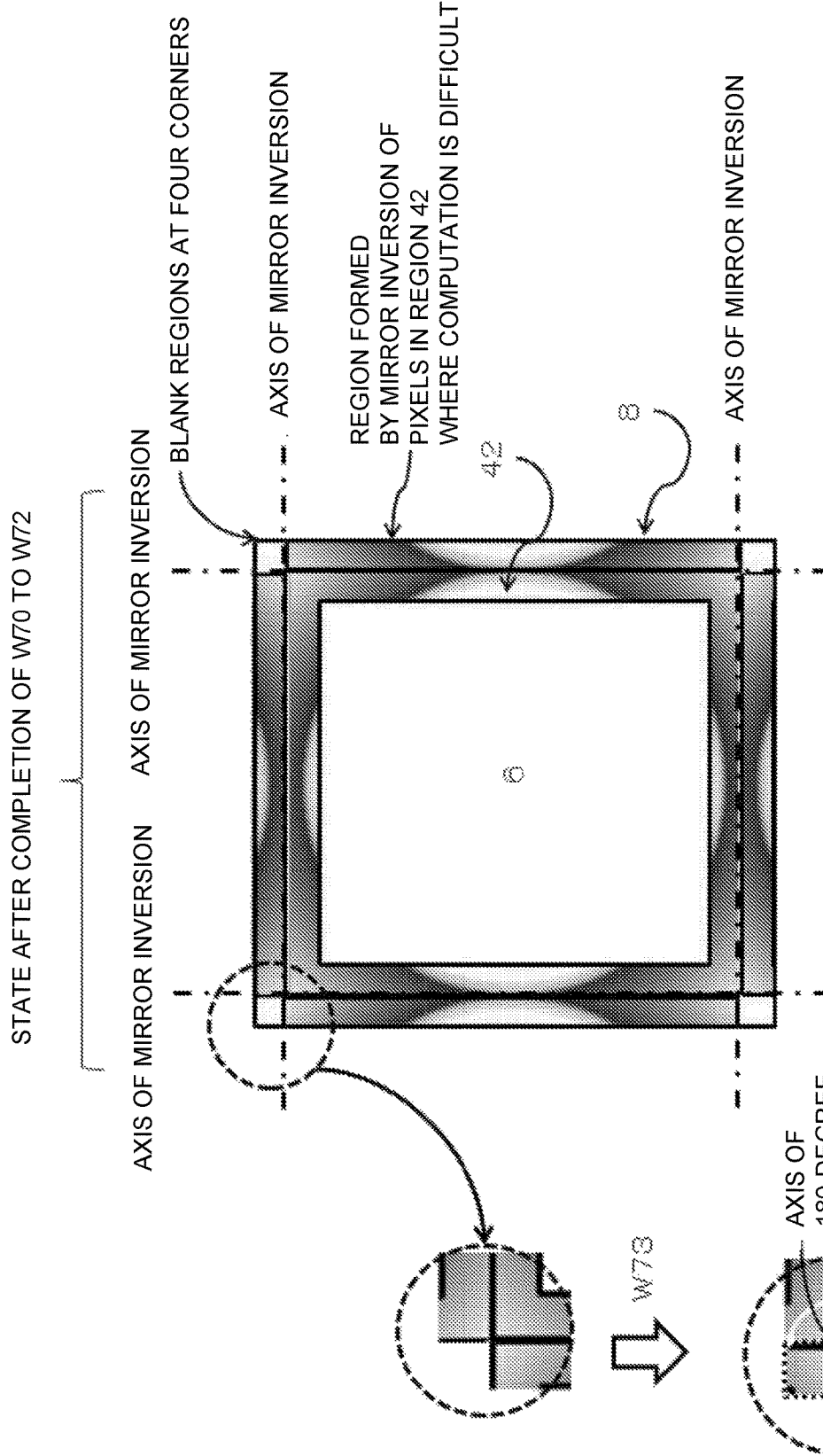
FIG. 19 is an illustration showing an example of correction in a region where computation is difficult, the region occurring in a peripheral region in an estimated luminance distribution of restored-image initial values obtained by the first restored-image-initial-value correcting means.

FIG. 19 shows an example of correction of the region 42 where computation is difficult, which occurs in a peripheral region in the estimated luminance distribution 6 of the restored-image initial values obtained by the first restored-image-initial-value correcting means W8. FIG. 19 shows the state where the estimated luminance distribution 8 of the corrected-restored-image initial values has been generated from the estimated luminance distribution 6 of the restored-image initial values by the means W70 to W72. In this state, blank regions exist at the four corners of the estimated luminance distribution 8 of the corrected-restored-image initial values. W73 compensates for and corrects the blank region at the top left corner of the estimated luminance distribution of the corrected-restored-image initial values by copying the pixels in the top-left corner region of the region 42 where computation is difficult in the estimated luminance distribution 6 of the restored-image initial values, rotating the copied region by 180 degrees about the top left vertex, and pasting the pixels.

Figure 20:
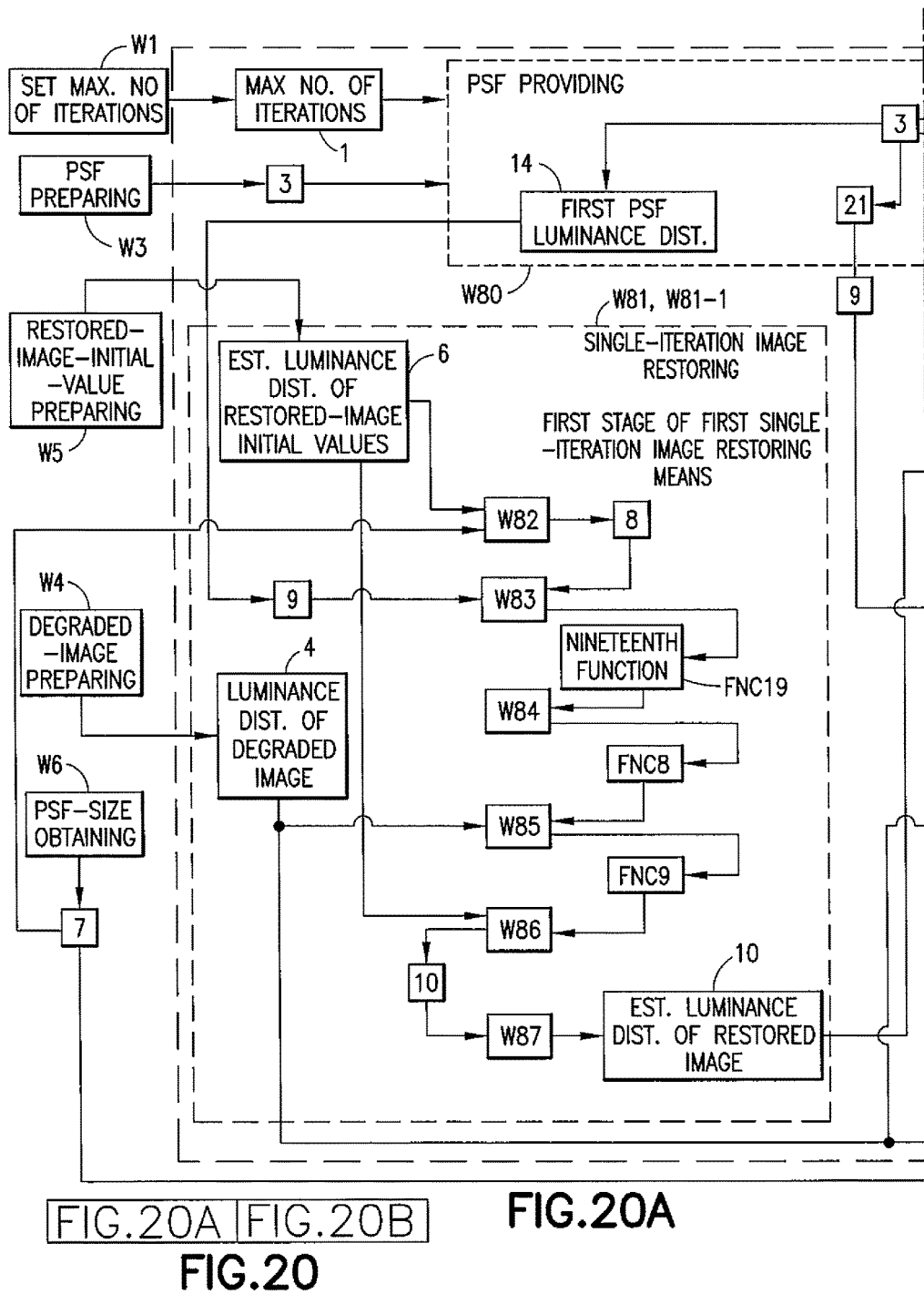
FIGS. 20A and 20B are diagrams showing an example relating to the configuration of a second image restoring means, as a second aspect of the first image restoring means, of a twentieth invention according to the present invention.
Figure 20B:
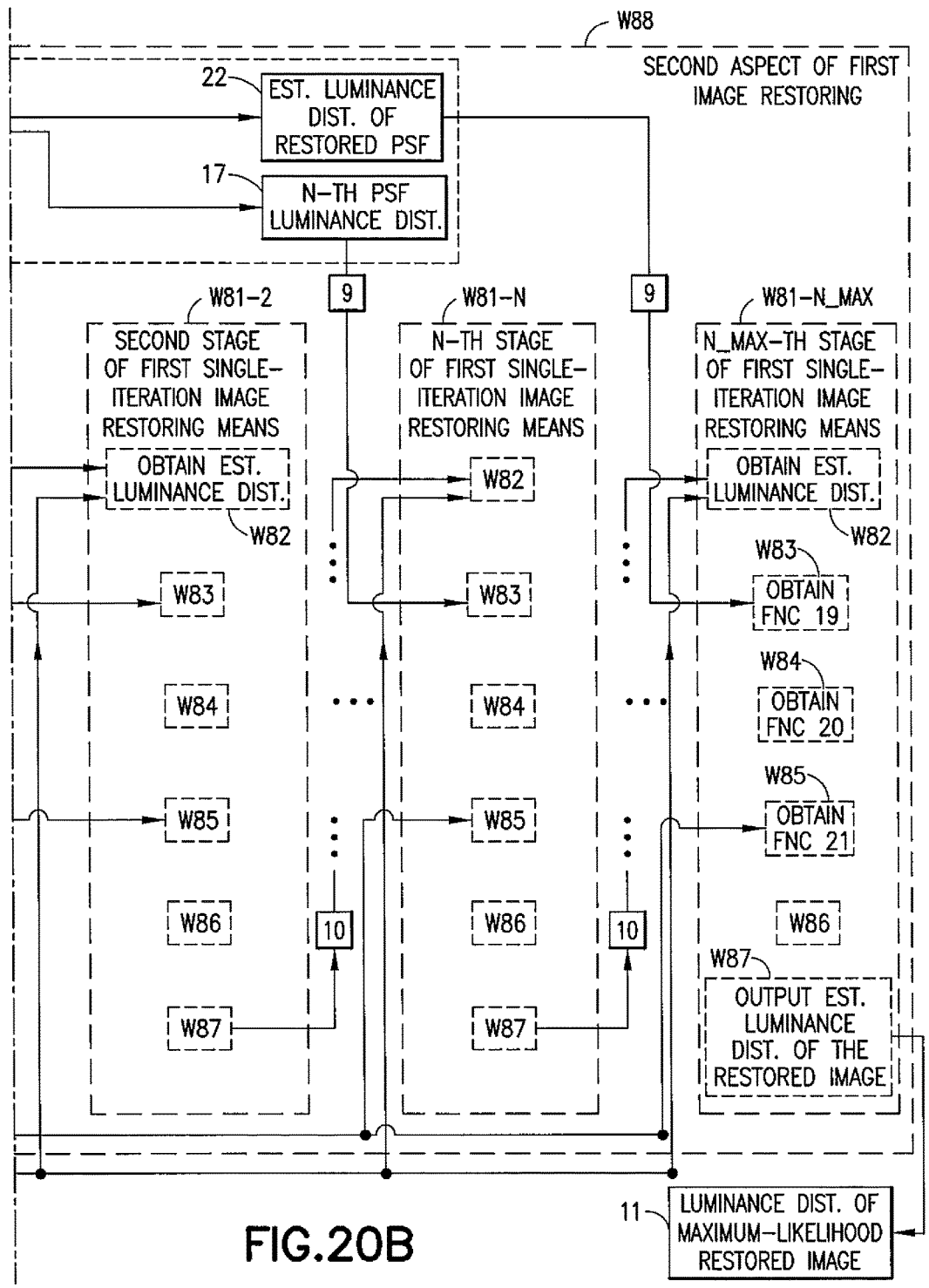

FIGS. 20A and 20B are diagrams showing an example relating to the configuration of a second image restoring means W88, as a second aspect of the first image restoring means W20, of a twentieth invention according to the present invention. In FIGS. 20A and 20B, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The second image restoring means W88 shown in FIGS. 20A and 20B is characterized by including (W80) a PSF providing means for providing an n-th stage W81-n of a first single-iteration image restoring means with an n-th PSF luminance distribution 17 as a PSF luminance distribution 9 among the series of PSF luminance distributions 3, where n_max signifies the maximum number of iterations 1 and n signifies a natural number less than n_max; and (W81) the single-iteration image restoring means for executing a computation corresponding to one iteration in iterations based on a formula of Bayse probability theory from the PSF luminance distribution 9, the estimated luminance distribution 6 of the restored-image initial values, and the luminance distribution 4 of the degraded image to obtain and output an estimated luminance distribution 10 of a restored image having a maximum likelihood for the luminance distribution 4 of the degraded image, the single-iteration image restoring means W81 including (W82) obtaining an estimated luminance distribution 8 of corrected-restored-image initial values by a second restored-image-initial-value correcting means constituted of the same configuration as the first restored-image-initial value correcting means W8; (W83) a means for convolving the PSF luminance distribution 9 with the estimated luminance distribution 8 of the corrected-restored-image initial values to obtain a nineteenth function; (W8 4) a means for inverting the nineteenth function to obtain a twentieth function; (W85) a means for multiplying the twentieth function by the luminance distribution of the degraded image to obtain a twenty-first function; (W86) a means for multiplying the estimated luminance distribution of the restored-image initial values by the twenty-first function to obtain an estimated luminance distribution 10 of a restored image; and (W8 7) a means for outputting the estimated luminance distribution 10 of the restored image, and is characterized by being (W88) a second image restoring means constituted of a series connection of n_max stages configured by connecting the output of means (W87) of the n-th stage W81-n of the first single iteration image restoring means to means (W82) of the (n+1)-th stage W81-(n+1) of the first single-iteration image restoring means, and in the second image restoring means W88, n_max iterations, corresponding to the number of stages of the first single-iteration image restoring means W81 connected in series, are executed, and the estimated luminance distribution 10 of the restored image output from the n_max-th stage W81-n_max of the first single-iteration image restoring means is output as a luminance distribution 11 of a maximum-likelihood restored image.

Figure 21A:
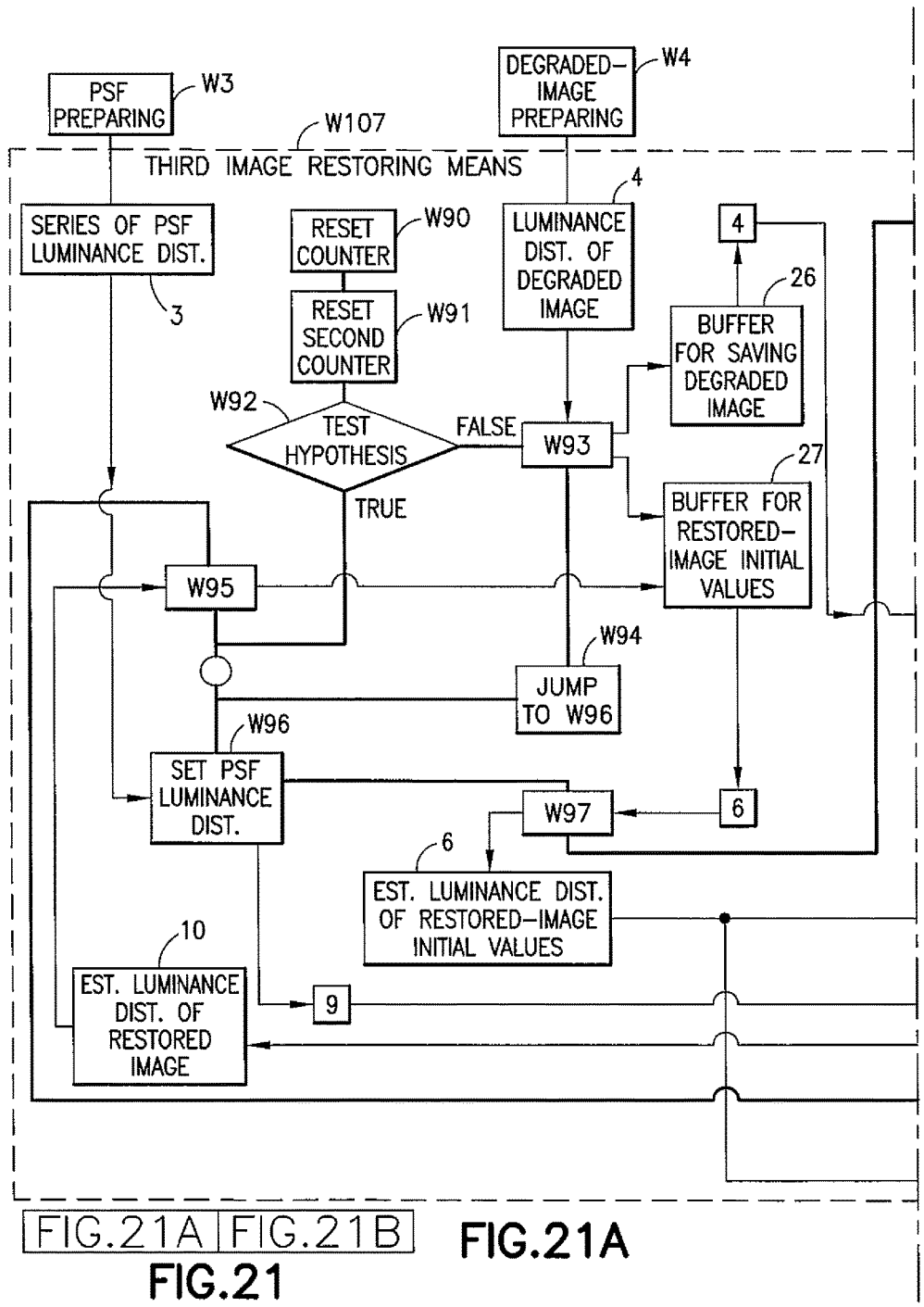
FIGS. 21A and 21B are diagrams showing an example relating to the configuration of a third image restoring means, as a third aspect of the first image restoring means, of a twenty-first invention according to the present invention.
Figure 21B:
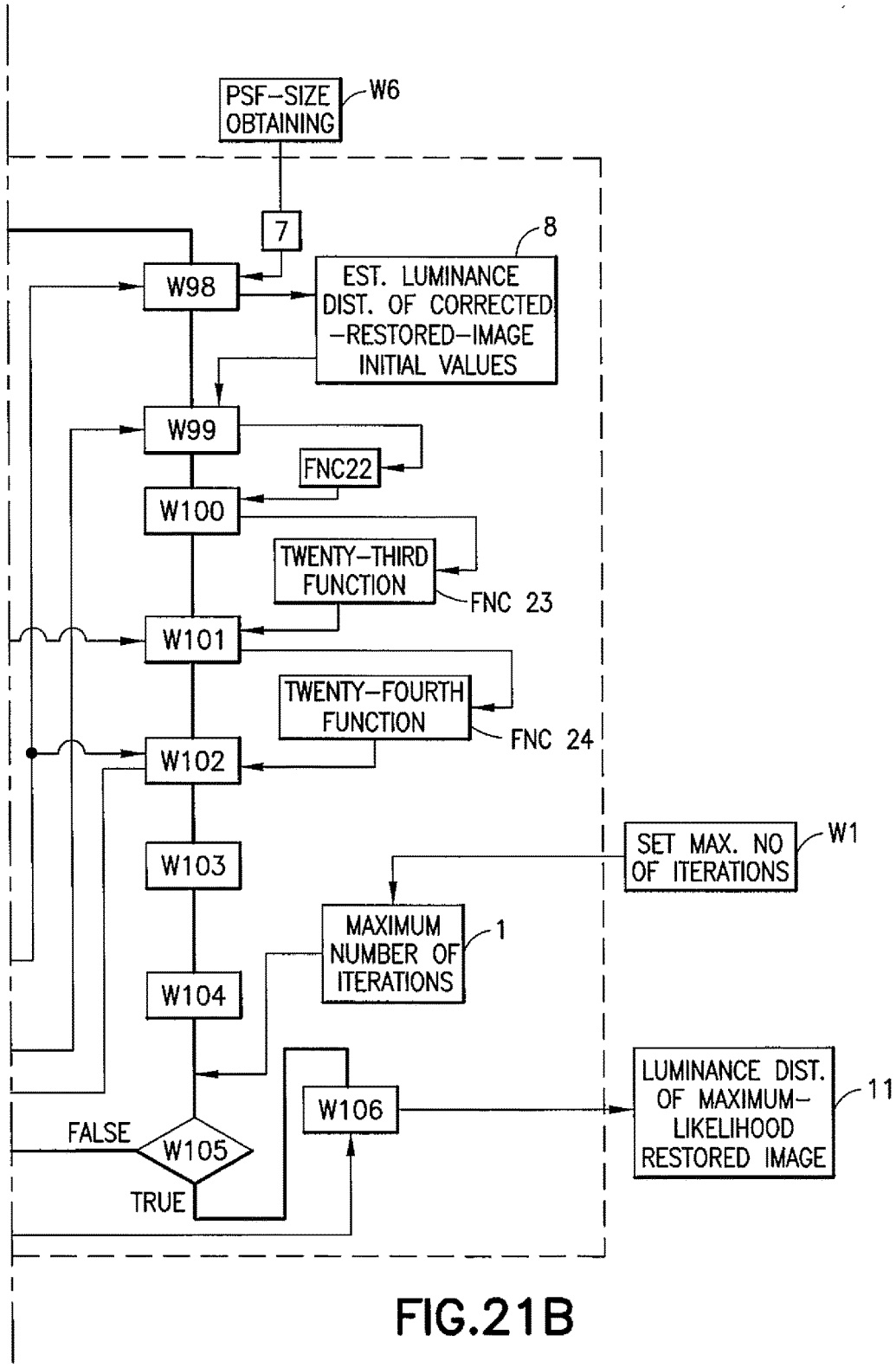

FIGS. 21A and 21B are diagrams showing an example relating to the configuration of a third image restoring means W107, as a third aspect of the first image restoring means W20, of a twenty-first invention according to the present invention. In FIGS. 21A and 21B, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The third image restoring means W107 shown in FIGS. 21A and 21B is characterized by including (W90) a means for assigning 0 to and thereby resetting the counter; (W91) a means for assigning 1 to and thereby resetting the second counter; (W92) a means for testing a hypothesis that the value of the counter is not 0, proceeding to means (W93) if the test result is false, and jumping to means (W96) if the test result is true; (W93) a means for transferring the luminance distribution 4 of the degraded image to a buffer 26 for saving the degraded image and to a buffer 2 7 for the restored-image initial values; (W94) a means for jumping to means (W96); (W95) a means for transferring an estimated luminance distribution 10 of a restored image of means (W102) to the buffer 27 for the restored-image initial values; (W96) a means for setting an mth PSF luminance distribution in the series of PSF luminance distributions 3 as a PSF luminance distribution 9, where m signifies the value of the second counter; (W97) a means for reading the estimated luminance distribution 6 of the restored-image initial values from the buffer 27 for the restored-image initial values; (W98) a third restored-image-initial-value correcting means, constituted of the same configuration as the first restored-image-initial-value correcting means, for correcting the estimated luminance distribution 6 of the restored-image initial values and setting the estimated luminance distribution as an estimated luminance distribution 8 of corrected-restored-image initial values; (W99) a means for convolving the PSF luminance distribution 9 with the estimated luminance distribution 8 of the corrected-restored-image initial values to obtain a twenty-second function; (W100) a means for inverting the twenty-second function to obtain a twenty-third function; (W101) a means for multiplying the twenty-third function by the luminance distribution 4 of the degraded image to obtain a twenty-fourth function; (W102) a means for multiplying the estimated luminance distribution 6 of the restored-image initial values by the twenty-fourth function to obtain an estimated luminance distribution 10 of a restored image; (W103) a means for incrementing the counter by 1; (W104) a means for incrementing the second counter by 1; (W105) a means for testing a hypothesis that the value of the counter has exceeded the maximum number of iterations 1, jumping to means (W95) if the test result is false, and proceeding to means (W106) if the test result is true; and (W106) a means for outputting the estimated luminance distribution 10 of the restored image as a luminance distribution 11 of a maximum likelihood restored image, and is characterized by being (W107) a third image restoring means for completing the maximum number of iterations 1 by executing iterations in ascending order of the index on S of the individual means and outputting the maximum-likelihood restored image 11 having a maximum likelihood.

Figure 22:
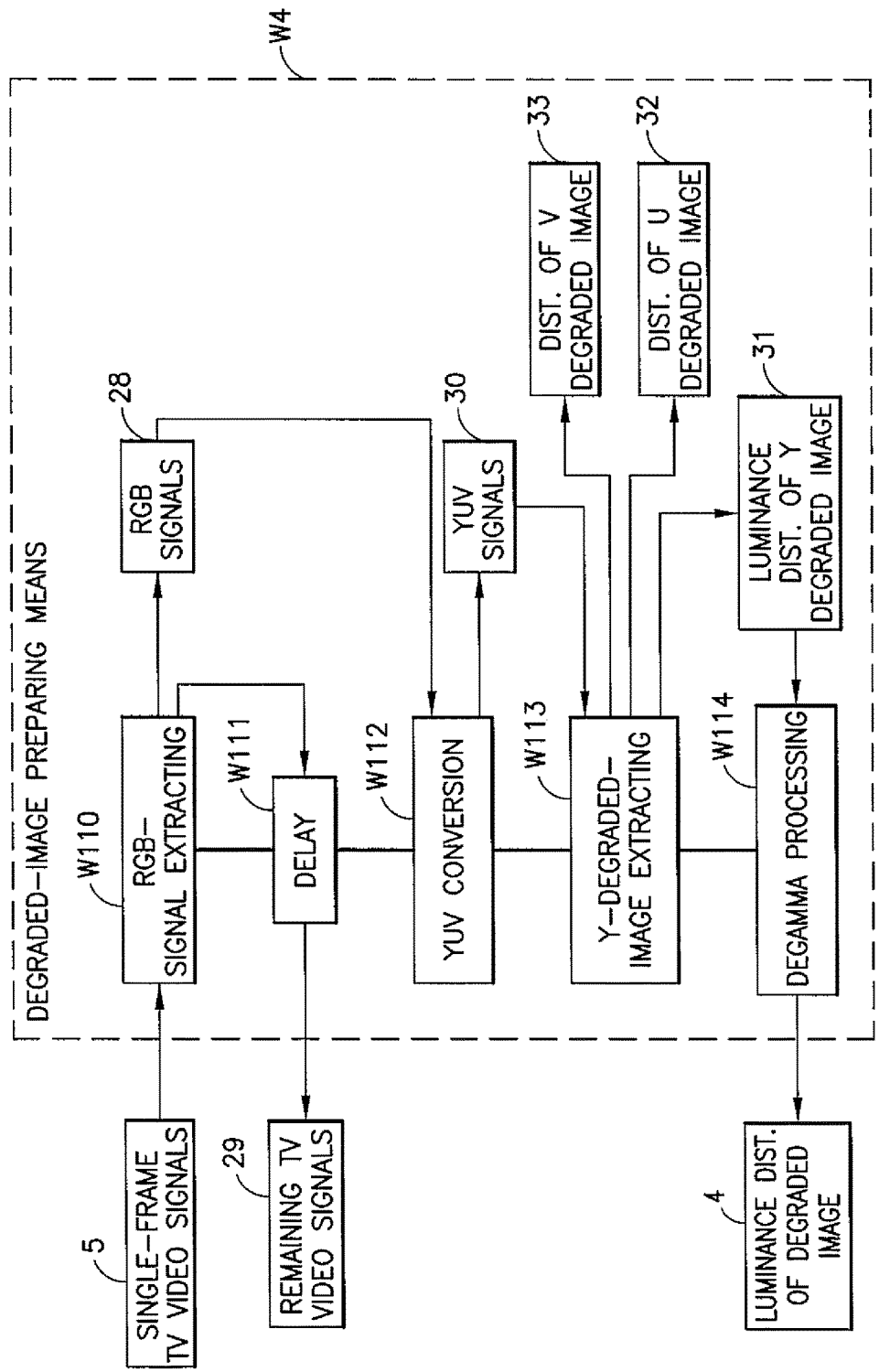
FIG. 22 is a diagram showing an example relating to the configuration of a degraded-image preparing means of a twenty-second invention according to the present invention.

FIG. 22 shows an example relating to the configuration of the degraded-image preparing means W4 of a twenty-second invention according to the present invention. In FIG. 22, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The degraded-image preparing means W4 shown in FIG. 22 is characterized by including (W110) an RGB-signal extracting means for extracting RGB signals 28 constituting a frame from TV video signals 5 for the frame; (W111) a delaying means for outputting, with a delay corresponding to one frame, the TV video signals 29 remaining after extracting the RGB signals 28 from the single-frame TV video signals 5; (W112) a YUV conversion means for subjecting the RGB signals 28 to YUV conversion to obtain YUV signals 30; (W113) a Y-degraded-image extracting means for extracting a luminance distribution 4 of a degraded image constituted of only Y signals representing luminance components among the YUV signals 30 to obtain a luminance distribution 31 of a Y degraded image and keeping a distribution 32 of a U degraded image constituted of only the remaining U signals and a distribution 33 of a V degraded image constituted of only the remaining V signals; and (W114) a degamma processing means for executing degamma processing of the luminance distribution 31 of the Y degraded image to obtain and output a luminance distribution 4 of a degraded image constituted of a single-frame luminance distribution.

Figure 23:
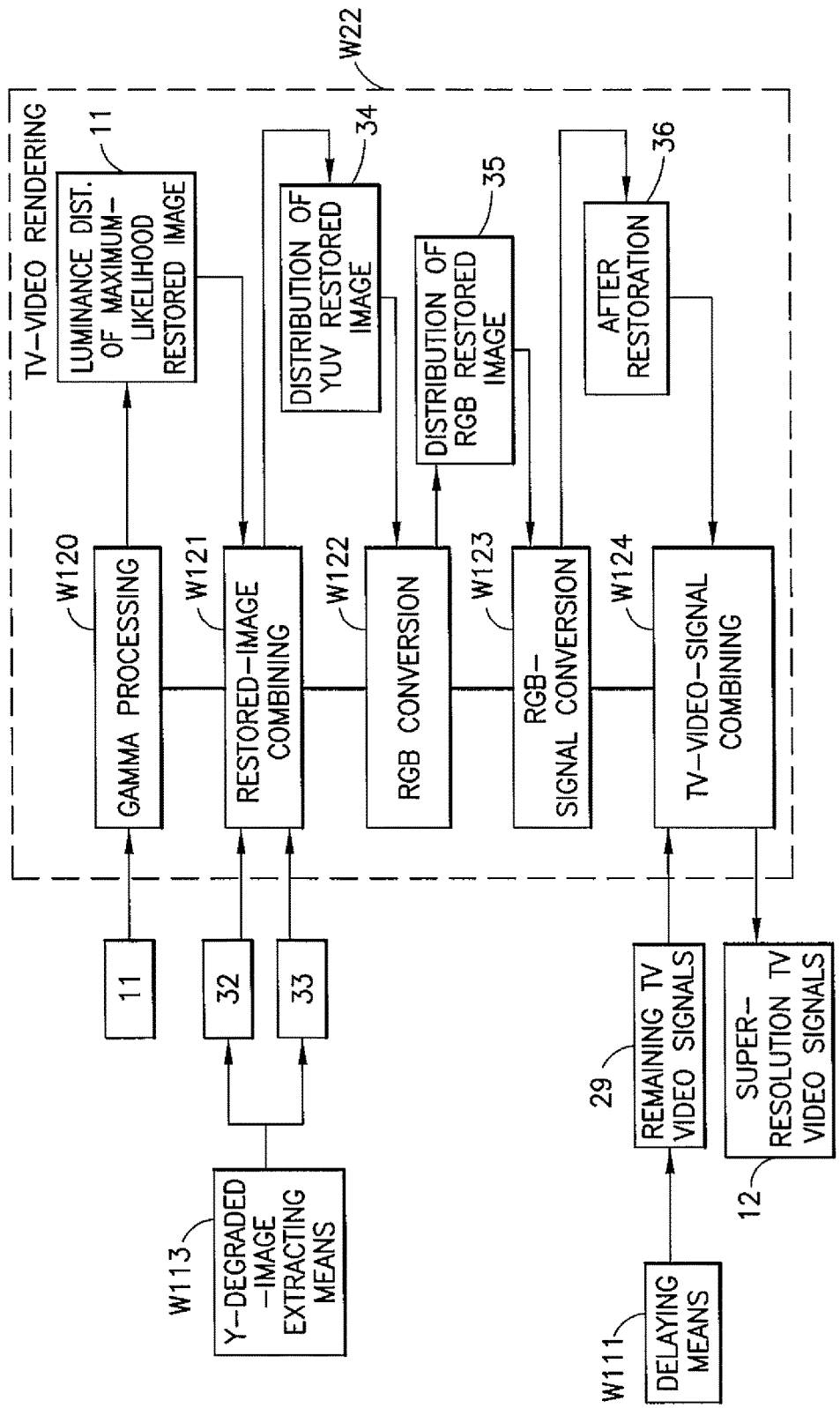
FIG. 23 is a diagram showing an example relating to the configuration of a TV-video rendering means of a twenty-third invention according to the present invention.

FIG. 23 shows an example relating to the configuration of the TV-video rendering means W22 of a twenty-third invention according to the present invention. In FIG. 23, rectangles containing numbers that indicate means on white backgrounds signify means other than means relating to determination and conditional branches, diamonds containing numbers that indicate means on white backgrounds signify means for determination and conditional branches, arrows signify directions of data input/output, rectangles containing numbers on white backgrounds signify elements, for example, 1 signifies the maximum number of iterations 1, thick lines signify processing flows, a circle having a white background signifies a joint of processing, and black circles signify branches and joints of data.

The TV-video rendering means shown in FIG. 23 is characterized by including (W120) a gamma processing means for executing gamma processing of the luminance distribution 11 of the maximum-likelihood restored image; (W121) a restored-image combining means for combining the distribution 32 of the U degraded image and the distribution 33 of the V degraded image kept by the Y-degraded-image extracting means W113 with the luminance distribution 11 of the maximum-likelihood restored image after the gamma processing constituted of Y components to obtain a distribution 34 of a single YUV restored image; (W122) an RGB conversion means for executing RGB conversion of the distribution 34 of the YUV restored image to obtain a distribution 35 of an RGB restored image; (W123) an RGB-signal conversion means for reading the distribution 35 of the RGB restored image and outputting RGB signals 36; and (W124) a TV-video-signal combining means for combining the RGB signals 36 with the remaining TV video signals 29 output by the delaying means W111 to obtain and output super-resolution TV video signals 12 constituted of single-frame TV video signals.

A fourth accelerated super-resolution processing program 43 of a twenty-fourth invention according to the present invention is a program in which a processing procedure for implementing and executing all the means in the preparing means W19 and the first image restoring means W20 is described.

A fifth accelerated super-resolution processing program 44 of a twenty-fifth invention according to the present invention is a program in which a processing procedure for implementing and executing all the means in the preparing means W19 and the second image restoring means W88 is described.

A sixth accelerated super-resolution processing program of a twenty-sixth invention according to the present invention is a program in which a processing procedure for implementing and executing all the means in the preparing means W19 and the third image restoring means W107 is described.

A twenty-seventh invention according to the present invention is a second storage medium 47 wherein the fourth accelerated super-resolution processing program 43, the fifth accelerated super-resolution processing program 44, and the sixth accelerated super-resolution processing program 45 are all encrypted, these encrypted fourth accelerated super-resolution processing program 43, fifth accelerated super-resolution processing program 44, and sixth accelerated super-resolution processing program 45 are stored, and the second storage medium 47 can be connected to a computer and can be read by the computer.

Embodiments

A first embodiment is a TV-video accelerated super-resolution processing system 49 in which the TV-video accelerated super-resolution processing device 40 according to the present invention is implemented on a computer 48 by using a first accelerated super-resolution processing program 37.

Figure 24:
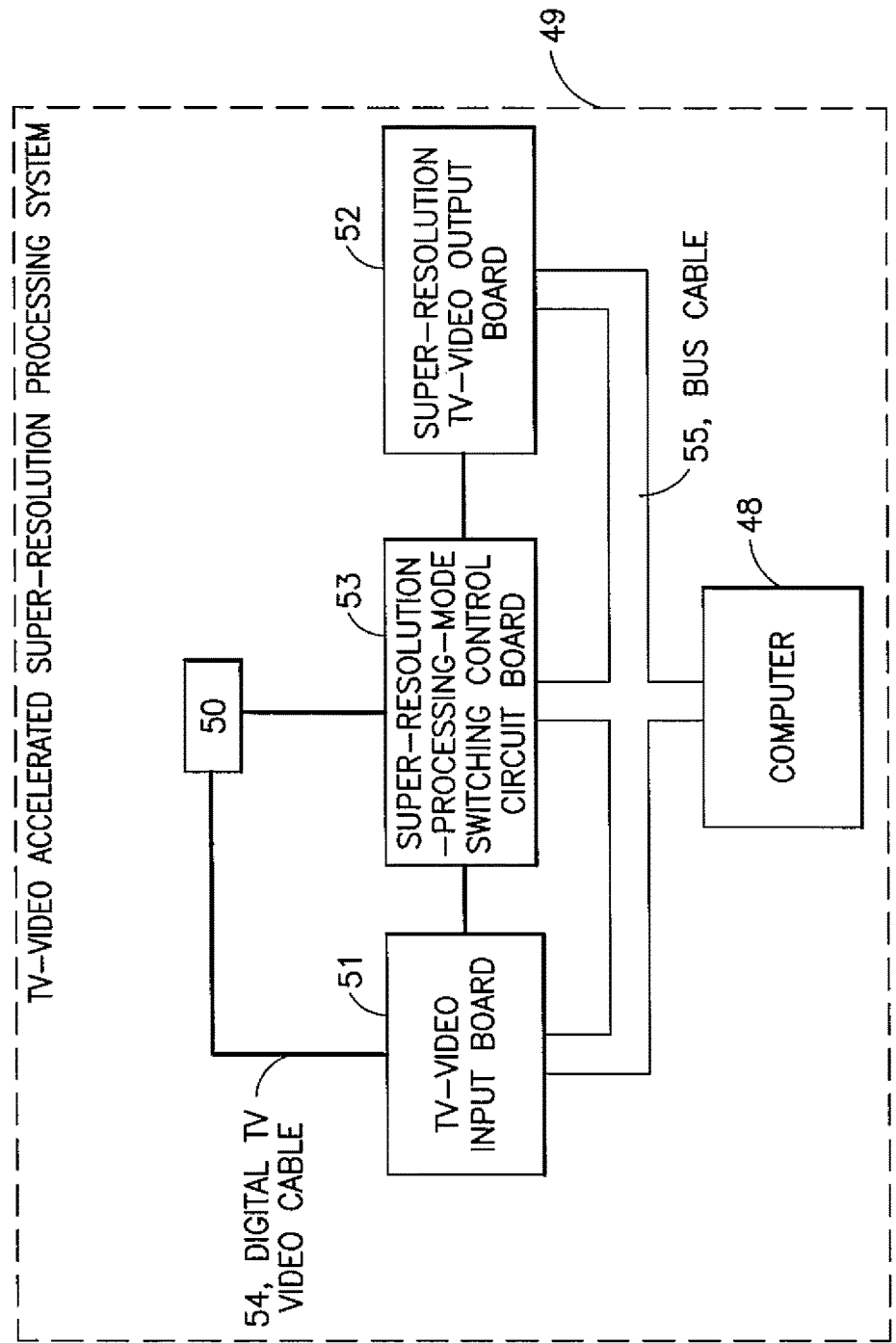
FIG. 24 is a diagram showing an example relating to the configuration of a TV-video accelerated super-resolution processing system of a first embodiment according to the present invention.

FIG. 24 shows an example relating to the configuration of the TV-video accelerated super-resolution processing system 49 of the first embodiment according to the present invention. The TV-video accelerated super-resolution processing system 49 shown in FIG. 24 is constituted of: a digital-TV-video-signal input/output terminal 50 used for input/output of digital TV video signals; a computer 48 having the TV-video accelerated super-resolution processing device 40 installed thereon; a TV-video input board 51 on which the degraded-image preparing means W4 for preparing a luminance distribution 4 of a degraded image from TV video 67 is implemented by using an FPGA; a super-resolution TV-video output board 52 on which the TV-video rendering means W22 for rendering a luminance distribution 11 of a maximum-likelihood restored image into TV video and outputting single-frame super-resolution TV-video signals 12 is implemented by using an FPGA; a super-resolution-processing-mode switching control circuit board 53 that reflects, on the super-resolution TV video signals 12, a video display mode designated by using a video-display-mode designating button 56 and whether to superimpose super-resolution processing conditions as designated by using a condition-display designating button 57; a digital TV-video cable 54; and a bus cable 55. In FIG. 24, a power supply cable is omitted.

Since most of the degraded-image preparing means W4 and the TV-video rendering means W22 of the TV-video accelerated super-resolution processing device in the computer 48 constituting the TV-video accelerated super-resolution processing system shown in FIG. 24 is implemented in hardware by using FPGAs, the degraded-image preparing means W4 is configured as a means for obtaining the luminance distribution of the degraded image, output from the TV-video input board 51, and the TV-video rendering means W22 is configured as a means for transferring the luminance distribution 11 of the maximum-likelihood restored image to the super-resolution TV-video output board 52.

Figure 25:
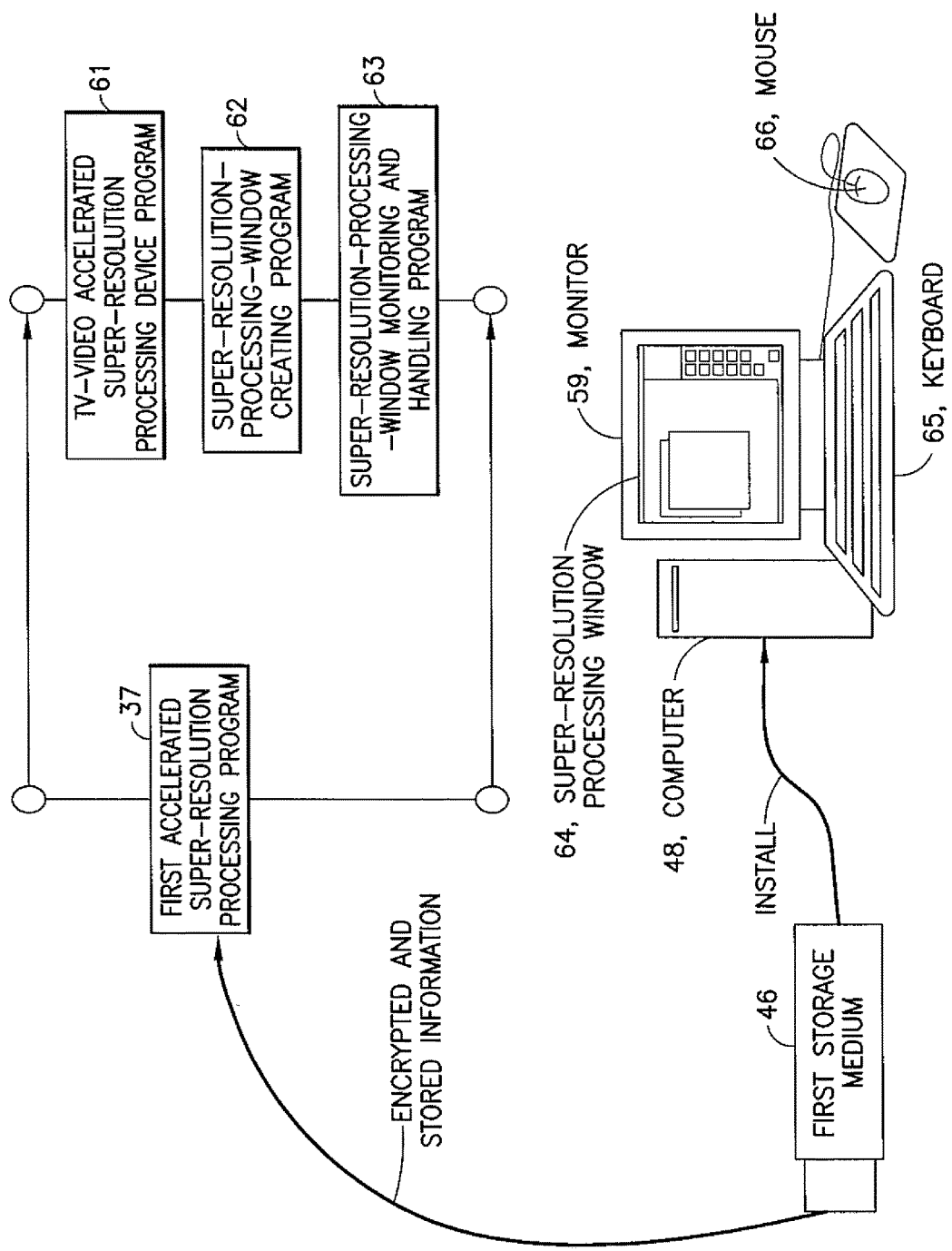
FIG. 25 is an illustration showing an example of the structure, as well as a state of its installation in a computer, of a first accelerated super-resolution processing program according to the present invention.

FIG. 25 shows an example of the configuration of the first accelerated super-resolution processing program 37 and an example of the state of installation of the program in the computer 48. Referring to FIG. 25, the first accelerated super-resolution processing program 37 is constituted of a TV-video accelerated super-resolution processing device program 61 for implementing all the means in the first accelerated super-resolution processing means W21 in the TV-video accelerated super-resolution processing device 40 that executes processing according to the TV-video super-resolution processing method; a super-resolution-processing-window creating program 62 for creating a super-resolution processing window 64 used to perform operations relating to super-resolution processing in the TV-video accelerated super-resolution processing device 40 and for displaying the super-resolution processing window 64 on a monitor 59; and a super-resolution-processing-window monitoring and handling program for constantly monitoring all the buttons in the super-resolution processing window 64, the buttons of a keyboard 65 of the computer 48, and the position designated by using a mouse 66 of the computer 48 and right clicking and left clicking at the position, and executing suitable processing for actions involving monitored targets, such as left clicking, if any, until a close button 79 in the super-resolution processing window 64 is pressed. The TV-video accelerated super-resolution processing device program 61, the super-resolution-processing-window creating program, and the super-resolution-processing-window monitoring and handling program 63 are executed in that order.

Referring to FIG. 25, in configuring the TV-video accelerated super-resolution processing device 40 on the computer 48, first, the first accelerated super-resolution processing program 37 stored in the first storage medium 46 is installed on the computer 48. Then, a TV-video accelerated super-resolution processing device icon 58 used to activate the TV-video accelerated super-resolution processing device 40 is displayed on a screen in the monitor 59 of the computer 48. Then, a user 60 clicks on the TV-video accelerated super-resolution processing device icon 58 to activate the TV-video accelerated super-resolution processing device 40. Then, the super-resolution processing window 64 is displayed on the monitor 59 to wait for an action by the user 60.

Figure 26:
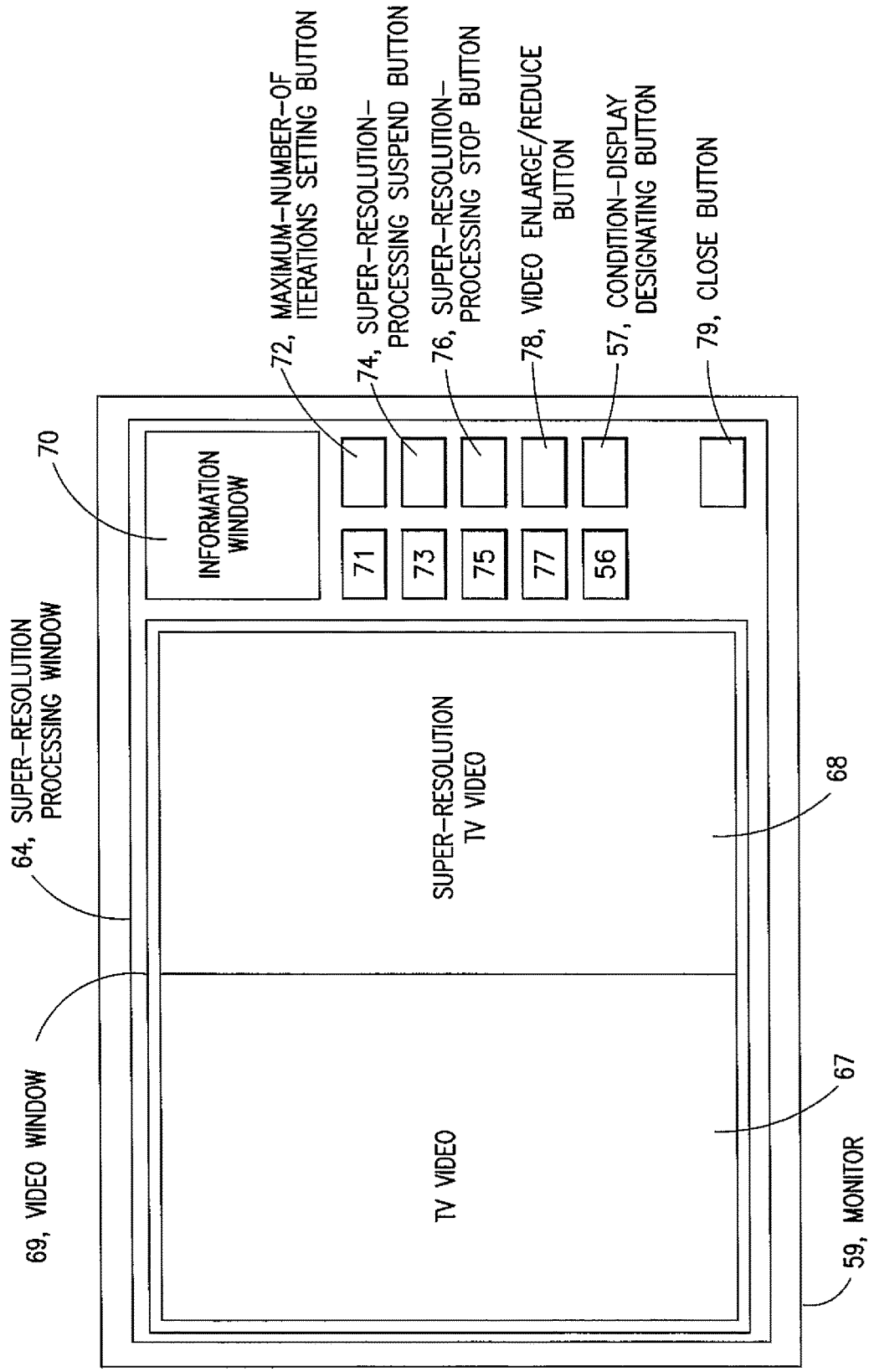
FIG. 26 is an illustration showing an example relating to the configuration of a super-resolution processing window according to the present invention.

FIG. 26 shows an example relating to the configuration of the super-resolution processing window 64. The super-resolution processing window 64 shown in FIG. 26 is constituted of: a video window 69 for displaying TV video 67, super-resolution TV video 68, etc.; an information window 70 for displaying the current date and time, super-resolution conditions, system messages, etc., provided with a vertical scroll bar at the right end thereof; a degradation-index setting button 71 for setting the degradation index 2 by designating a number from 0 to 255 representing 256 levels from a pull-down menu (a default value is indicated by a pale blue background in the pull-down menu in the present invention); a maximum-number-of-iterations setting button 72 used to select a value from a list in a combo box that opens when the button is clicked on or to directly enter and set a maximum number of iterations 1 over a default value displayed in a text box; a super-resolution-processing start button 73 that is clicked on to start super-resolution processing under the set conditions; a super-resolution-processing suspend button 74 that is clicked on to suspend super-resolution processing; a super-resolution-processing resume button 75 for resuming suspended super-resolution processing; a super-resolution-processing stop button 76 that is clicked on to stop super-resolution processing; a help button 77 for opening a help window and searching and displaying help content; a video enlarge/reduce button 78 that is used after video that is to be enlarged or reduced in the video window 69 is designated by clicking, the designated video being displayed in an enlarged form when "+" in this button is pressed, in an enlarged form when "−" is pressed, and at the original default magnification factor when "0" is pressed; a video-display-mode designating button 56 used for selecting, from a pull-down menu, a video display mode in the video window 69 from a half-division test mode, an input-video mode for displaying only TV video 67, and a super-resolution TV-video mode for displaying only super-resolution TV video 68; a condition-display designating button 57 in the form of a toggle switch, used for displaying a maximum number of iterations 1 and a degradation index 2 as super-resolution processing conditions in such a manner as to be superimposed at the top right corner of the super-resolution TV video 68; and a close button 55 used to close the super-resolution processing window 64. FIG. 26 shows the state of video display in the test mode.

The computer 48 is constituted of a 64-bit instruction set, 32-bit, 6-core/chip CPU (Central Processing Unit), a GPU (Graphic Processing Unit), a memory not less than 32 GBytes, an HDD having a storage capacity not less than 1 TBytes, an SDD (Solidstate Disk Drive) having a storage capacity not less than 128 GBytes, at least three USB terminals, at least one LAN (Local Area Network) terminal, a wireless communication module such as a WiFi (Wireless Fidelity) or Bluetooth (registered trademark) module, a phone terminal, a keyboard 65, a mouse 66, an FHD (Full High Definition) display, Windows (registered trademark) 8 O/S (Operating System) from Microsoft, Visual Studio 2010™ (including Visual C++ 2010) from Microsoft, and Office 2013™ from Microsoft. The computer 48 can communicate with other computers by way of WiFi, Bluetooth (registered trademark), LAN, USB, and the Internet. As the computer 48, a computer selected from a variety of desktop computers that are mass-produced and available on the market is used. Alternatively, however, a workstation having similar specifications may be used. Furthermore, although the type of O/S differs, a server may be used.

Figure 27:
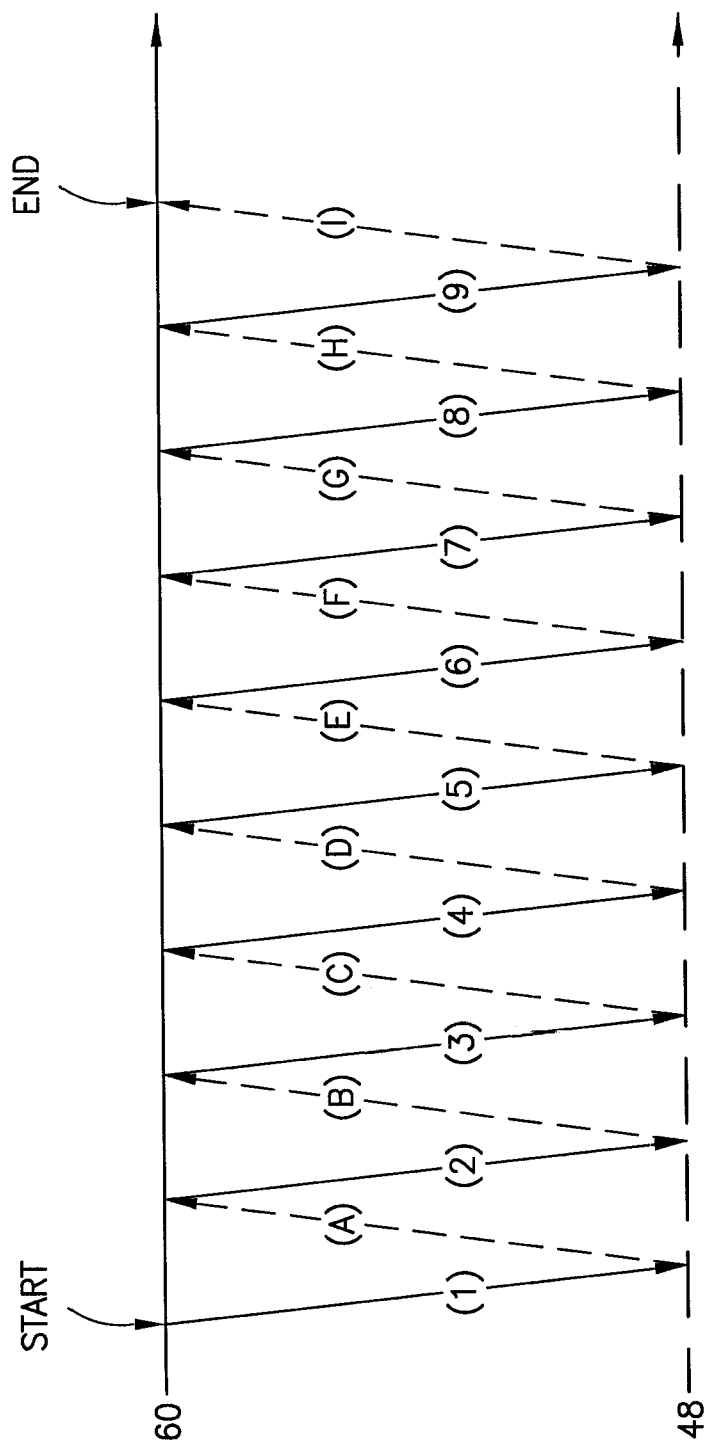
FIG. 27 is a diagram showing, in the form of a transaction table, an example of a procedure for executing superresolution processing in a TV-video accelerated super-resolution processing system according to the present invention.

FIG. 27 shows, in the form of a transaction table, an example of a procedure for executing super-resolution processing in the TV-video accelerated super-resolution processing system 49. The transaction table shown in FIG. 27 is constituted of arrows having numbers attached thereto and representing operations input by the user 60, dotted arrows having letters attached thereto and representing responses from the computer 48, a start symbol, an end symbol, a thick solid arrow representing a time axis for the user 60, and a thick dotted arrow representing a time axis for the computer 48.

The procedure for executing super-resolution processing in the TV-video accelerated super-resolution processing system 49 according to the transaction table shown in FIG. 27 is as follows. (1) In an "activation" step, the user 60 clicks on the TV-video accelerated super-resolution processing device icon 58, and then the computer 48 (A) displays the super-resolution processing window 64 on the monitor 59. (2) In a "super-resolution-processing-condition input-1"

step, the user 60 clicks on the degradation-index setting button 71, and then the computer 48 (B) expands and displays a pull-down menu at the position of the degradation-index setting button 71. (3) In a "super-resolution-processing-condition input-2" step, the user 60 selects an appropriate value from the pull-down menu, and then the computer 48 (C) captures the degradation index 2 and closes the pull-down menu. (4) In a "super-resolution-processing-condition input-3" step, the user 60 clicks on the maximum-number-of-iterations setting button 72, and then the computer 48 (D) expands a combo box at the position of the maximum-number-of-iterations setting button 72. (5) In a "super-resolution-processing-condition input-4" step, the user 60 selects from the combo box or enters an appropriate value, and then the computer 48 (E) captures the maximum number of iterations 1 and closes the combo box. (6) In a "super-resolution-processing-condition input-5" step, the user 60 clicks on the video-display-mode designating button 56, and then the computer 48 (F) expands a pull-down menu at the position of the video-display-mode designating button 56. (7) In a "super-resolution-processing-condition input-6" step, the user 60 selects an appropriate mode from the pull-down menu, and then the computer 48 (G) captures the video-display-mode designating button 56 and closes the pull-down menu. (8) In a "super-resolution-processing-condition input-7" step, the user 60 clicks on the condition-display designating button 57, and then the computer 48 (H) inverts the color of the condition-display designating button 57 to indicate display setting. (9) In a "super-resolution-processing start" step, the user 60 clicks on the super-resolution-processing start button 73, and then the computer 48 (I) executes super-resolution processing to display super-resolution TV video 68 and TV video 67 in the video window 69 according to the video-display-mode designating button 56 and the condition-display designating button 57.

Since accesses to the buttons in the super-resolution processing window 64 are constantly being monitored even during super-resolution processing, if the super-resolution-processing conditions are to be changed, when the user 60 clicks on the degradation-index setting button 71, the maximum-number-of-iterations setting button 72, the video-display-mode designating button 56, or the condition-display designating button 57 to set the conditions again, the changes in the super-resolution processing conditions are reflected while the video is continuously displayed. When the user 60 wants to quit super-resolution processing, the user 60 clicks on the close button 79. Then, the computer 48 closes the super-resolution processing window 64 in response to this clicking and also deactivates the TV-video accelerated super-resolution processing device 40.

According to the super-resolution processing procedure shown in FIG. 27, the user 60 first executed step (1) to display the super-resolution processing window 64 on the monitor 59. Then, the user 60 executed step (2) to expand and display a pull-down menu at the position of the degradation-index setting button 71. Then, in step (3), perceiving that the degree of degradation of the TV video 67 was small while viewing terrestrial digital TV 80 in which the TV video 67 was being displayed, the user 60 selected 14 as the degradation index 2 (the default value was 60 among 256 levels). Then, the user 60 executed step (4) to expand a combo box at the position of the maximum-number-of-iterations setting button 72. Then, in step (5), perceiving that the degree of degradation of the TV video 67 was small while viewing terrestrial digital TV 80 in which the TV video 67 was being displayed, the user 60 selected 4 as the maximum number of iterations 1 (the default value was 3).

Then, the user 60 executed step (6) to expand a pull-down menu at the position of the video-display-mode designating button 56. Then, in step (7), since the super-resolution processing conditions were not fixed yet, the user 60 selected the test mode. Then, the user 60 executed step (8) to select display setting with the condition-display designating button 57. Then, the user 60 executed step (9) to execute super-resolution processing. Then, the TV video 67 and the super-resolution TV video 68 were displayed side by side in a half-division fashion in the video window 69 of the super-resolution processing window 64. When the user 60 was satisfied with these super-resolution processing conditions and operated the terrestrial digital TV 80 to switch the input setting to video, the video being displayed in the video window 69 was displayed full-screen on the terrestrial digital TV 80. Then, the user 60 operated the video-display-mode designating button 56 to switch to the super-resolution-TV-video mode, thus viewing the super-resolution TV video 69 displayed in the video window 69 and in full-screen on the terrestrial digital TV 80.

Figure 28:
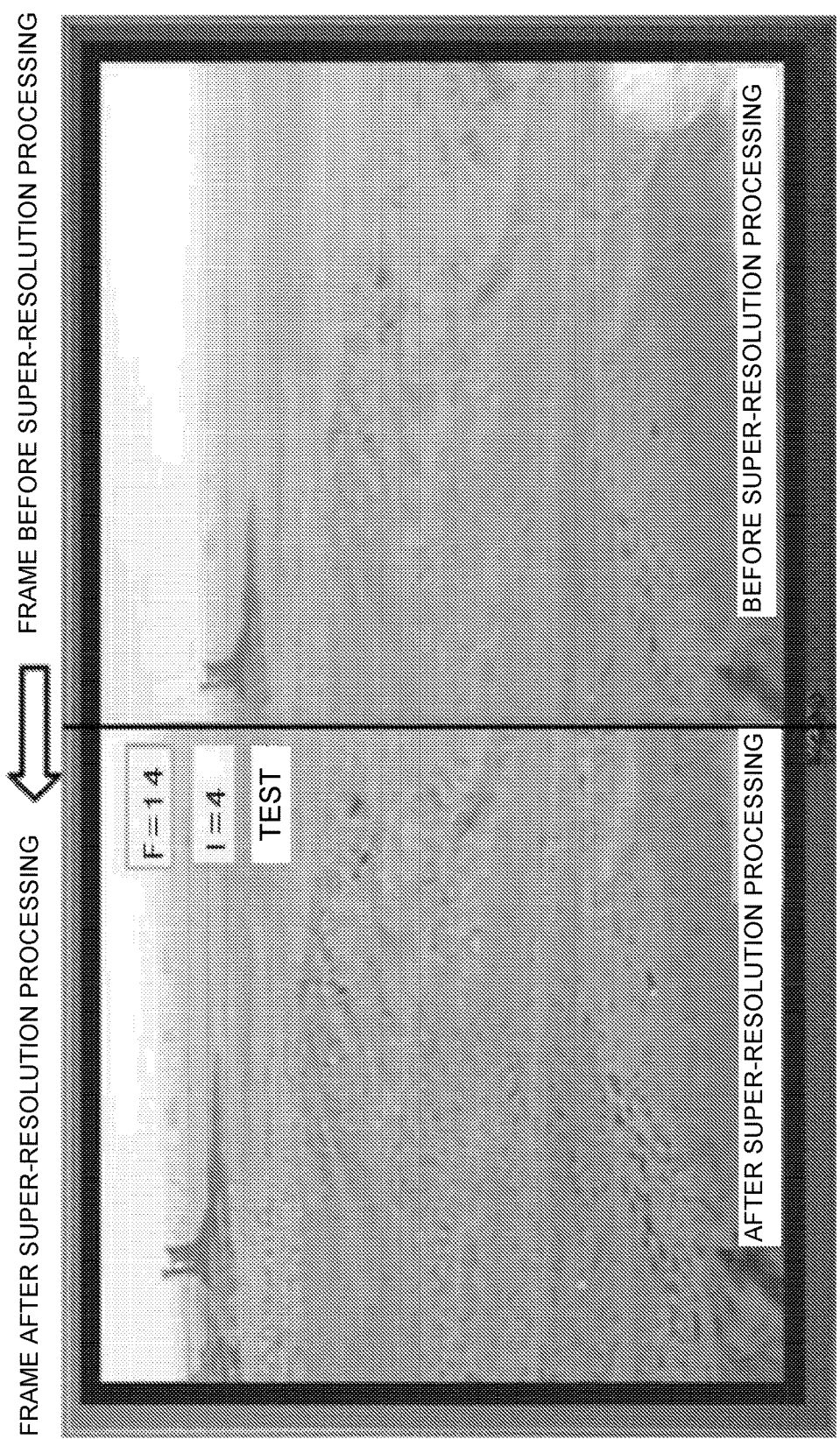
FIG. 28 is a drawing showing an example of the state of super-resolution processing in the first embodiment according of the present invention.

FIG. 28 is a drawing showing an example of the state of super-resolution processing according to the first embodiment. FIG. 28 shows one video frame displayed in a half-division fashion in the test mode such that the TV video 67 and the super-resolution TV video 68 are displayed side by side. The right half represents a frame of the TV video 67 before super-resolution processing, and the left half represents a frame of the super-resolution TV video 68, obtained by subjecting the frame in the right half to super-resolution processing. At the top right corner of the frame of the super-resolution TV video 68, the degradation index 2 is displayed with a symbol F, the maximum number of iterations 1 is displayed with a symbol I, and an abbreviation "test" is displayed to indicate that the video display mode is the test mode. It is understood from FIG. 28 that, although the display start position of the TV video 67 is somewhat shifted to the right compared with that of the super-resolution TV video 68, the super-resolution quality achieved by the TV-video accelerated super-resolution processing system 49 of the first embodiment according to the present invention is sufficiently practical.

The first image restoring means W20 constituting the TV-video accelerated super-resolution processing device 40 according to the present invention can be changed to the second image restoring means W88 by using the second accelerated super-resolution processing program 38 and can also be changed to the third image restoring means W107 by using the third accelerated super-resolution processing program 39. However, the system that is implemented on the computer 48 is the TV-video accelerated super-resolution processing system 49. Although the second image restoring means W88 and the third image restoring means W107 are image restoring means suitable for hardware implementations, the TV-video accelerated super-resolution processing system 49 is based on software, although hardware is used for signal processing. Thus, there is no considerable difference in speed, and there is no difference in processing quality.

A second embodiment is a first set-top box 81, which is a box implementation of the second aspect of the TV-video accelerated super-resolution processing device 40 employing a hardware implementation of the second image restoring means W88. The first set-top box 81 is implemented entirely in hardware since the preparing means W19 is all hardware except that the PSF preparing means W3-3 employs a software-defined computer board 93 and the second image restoring means W88 also employs hardware.

Thus, operation at a higher speed is possible compared with the TV-video accelerated super-resolution processing system 49 according to the first embodiment. The super-resolution quality of the first set-top box 81 is the same as that of the TV-video accelerated super-resolution processing system 49 according to the first embodiment.

Figure 29:
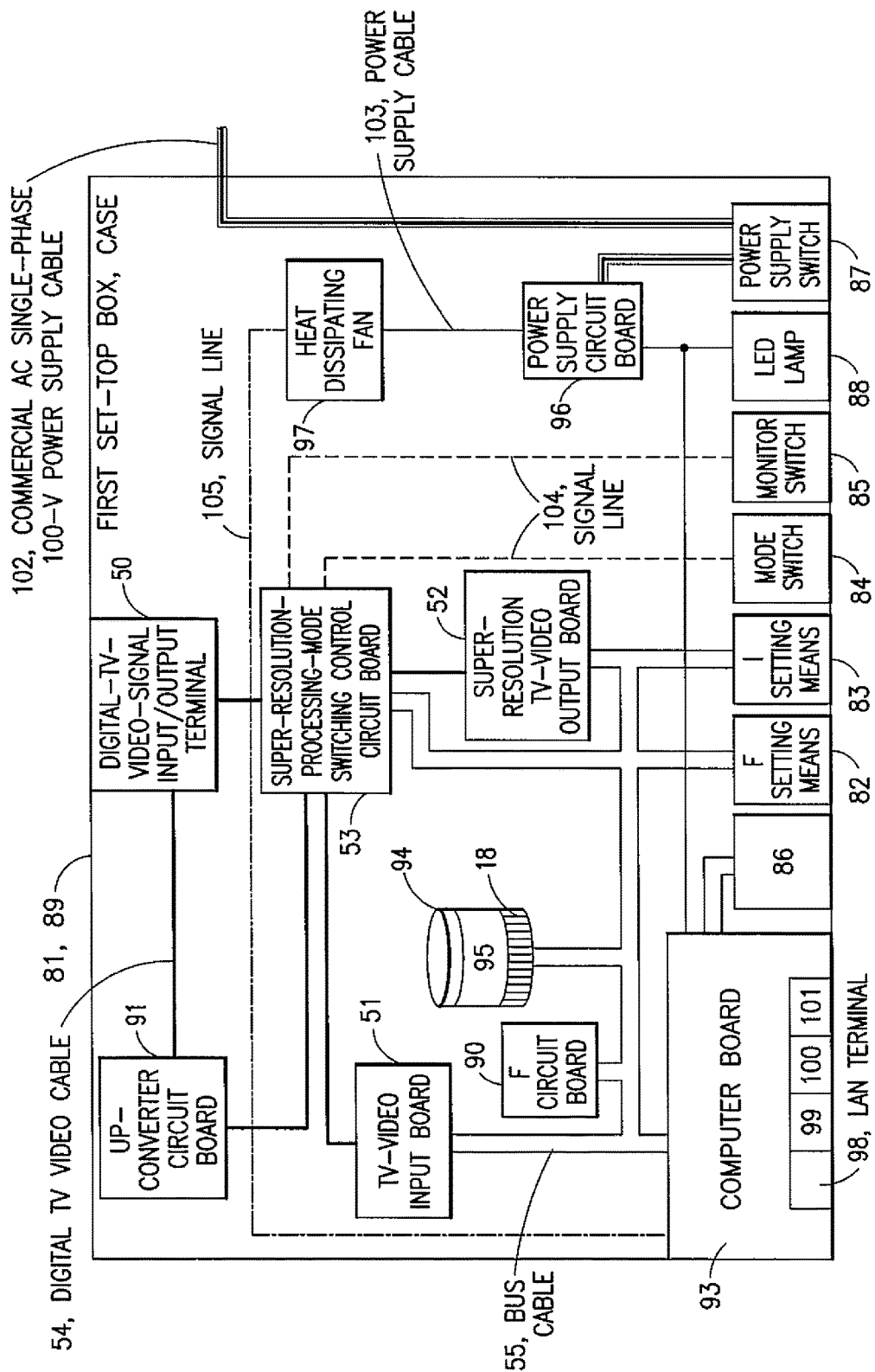
FIG. 29 is a diagram showing an example relating to the internal configuration of a first set-top box according to the present invention.

FIG. 29 is a diagram showing an example of the internal configuration of the first set-top box 81. The first set-top box 81 shown in FIG. 29 is constituted of: a digital-TV-video-signal input/output terminal 50 used for input/output of digital TV-video signals; a TV-video input board 51; a super-resolution TV-video output board 52; a super-resolution-processing-mode switching control circuit board 53; a digital TV video cable 54; a bus cable 55; an F setting means 80 used to set a degradation index 2 indicating a degree of degradation of TV video 67; an I setting means 83 used to set a maximum number of iterations 1; a mode switch 84 for switching the super-resolution processing mode between testing and main processing; a monitor switch 85 for designating whether to superimpose the super-resolution processing mode and the values of the F setting means 82 and I setting means 83 on TV video signals; an LCD (Liquid Crystal Display) monitor 86 for constantly monitoring the super-resolution processing mode and the values of the F setting means 82 and I setting means 83; a power supply switch 87 used to turn on/off the power supply for the first set-top box 81; an LED (Light Emitting Diode) lamp 88 that turns on only when the power supply switch 87 is on; a case 89; an F circuit board 90 in which the second image restoring means W88 of the TV-video accelerated super-resolution processing device 40 is fabricated by using an FPGA; an up-converter circuit board 91 that automatically determines whether digital TV video signals are digital interlace or progressive TV-video signals and that converts the digital TV-video signals into progressive TV video signals only in the case of digital interlace signals; a computer board 93 including a computer 92 having installed thereon in advance the PSF preparing means W3-3 for searching the extended PSF database 18 stored in an HDD 95, on the basis of the degradation index 2 designated by using the F setting means 82, to output a series of PSF luminance distributions 3; a PSF-preparing-means implementing program 94 for implementing all the means in the PSF preparing means W3-3 in the computer 48, in which a processing procedure for these means is described; the HDD 95; a power-supply circuit board 96 that supplies appropriate electric power as needed to the components in the first set-top box 81; a heat dissipating fan 97 that receives optimal driving conditions from the computer board 93 and assists heat dissipation with a suitable amount of wind; a LAN terminal 98; USB terminals 99 to 101; a commercial AC single-phase 100 V power supply cable 102; a power supply cable 103; a signal line 104; and a signal line 105.

The super-resolution-processing-mode switching control circuit board 53 constantly reads and automatically determines the states of the mode switch 84 and the monitor switch 85. (Mode 1) If the mode switch 84 designates the main-processing mode and the monitor switch 85 designates no superimposition, the super-resolution-processing-mode switching control circuit board 53 receives single-frame TV-video signals 5 from the up-converter circuit board 91 and outputs the TV-video signals 5 to the TV-video input board 51, and outputs single-frame super-resolution TV-video signals 12 after super-resolution processing, output from the super-resolution TV-video output board 52, to the digital-TV-video-signal input/output terminal 50. (Mode 2) If the mode switch 84 designates the main-processing mode and the monitor switch 85 designates superimposition, the super-resolution-processing-mode switching control circuit board 53 receives single-frame TV-video signals 5 from the up-converter circuit board 91 and outputs the TV-video signals 5 to the TV-video input board 51, and then outputs single-frame super-resolution TV-video signals 12 after super-resolution processing, output from the super-resolution TV-video output board 52, with information read from the computer board 93 superimposed at the top right corner, to the digital-TV-video-signal input/output terminal 50. (Mode 3) If the mode switch 84 designates the test mode and the monitor switch 85 designates no superimposition, the super-resolution-processing-mode switching control circuit board 53 receives single-frame TV-video signals 5 from the up-converter circuit board 39, copies the TV-video signals 5, outputs one version to the TV-video input board 51 while simultaneously delaying the other version by one frame, compresses the delayed version such that the horizontal width becomes half and it fits the right half of one screen, compresses single-frame super-resolution TV-video signals 12 after super-resolution processing, output from the super-resolution TV-video output board 52, such that the horizontal width becomes half and it fits the left half of one screen, combines these two halves, and outputs single-frame TV-video signals, adjusted such that the right half of one screen is the frame before super-resolution processing and the left half of the screen is the frame after super-resolution processing, to the digital-TV-video-signal input/output terminal 50. (Mode 4) If the mode switch 84 designates the test mode and the monitor switch 85 designates superimposition, the super-resolution-processing-mode switching control circuit board 53 receives single-frame TV-video signals 5 from the up-converter circuit board 91, copies the TV-video signals 5, outputs one version to the TV-video input board 51 while simultaneously delaying the other version by one frame, compresses the delayed version such that the horizontal width becomes half and it fits the right half of one screen, compresses single-frame super-resolution TV-video signals 12 after super-resolution processing, output from the super-resolution TV-video output board 52, such that the horizontal width becomes half and it fits the left half of one screen, combines these two halves, and outputs single-frame TV-video signals, adjusted such that the right half of one screen is the frame before super-resolution processing and the left half of the screen is the frame after super-resolution processing, with information read from the computer board 93 superimposed at the top right corner, to the digital-TV-video-signal input/output terminal 50.

The F setting means 82 is used to set a degradation index 2 corresponding to a degree of optical degradation of TV video 67 displayed on a TV monitor 106 of the terrestrial digital TV 80, and the F setting means 82 corresponds to the means W2 of the TV-video accelerated super-resolution processing device 40. The F setting means 82 is a bit switch that allows setting a three-digit decimal number. Data and electric power are supplied via the bus cable 55. Furthermore, a bit switch having specifications such that the set value can be read directly is preferred. It is possible to obtain a bit switch having such specifications on the market.

The I setting switch 83 is used to set a maximum number of iterations 1. The I setting means 83 is a bit switch that allows setting a three-digit decimal number. Data and electric power are supplied via the bus cable 55. Furthermore, a bit switch having specifications such that the set value can be read directly is preferred. It is possible to obtain a bit switch having such specifications on the market.

The computer board 93 is a computer based on the latest Windows (registered trademark) OS and is a PC motherboard that supports C++. The PC motherboard is preferred for the second embodiment since it has many external connection terminals, such as various I/O (Input/Output interface) terminals, LAN terminal 98, USB terminals 99 to 101, a microphone terminal, and a speaker terminal, and it is not so expensive. Various types of PC motherboard are available on the market, and any high-end motherboard can be used as long as it has a large amount of high-speed memory, such as a 16-GByte memory. Furthermore, C++ may be installed after purchasing the PC motherboard.

The PSF-preparing-means implementing program 94 is a program written in C++ and can be read and executed by a CPU installed on the computer board 93. The PSF-preparing-means implementing program 94 is installed in advance, whereby the PSF preparing means W3-3 is defined in the computer in the computer board 93, the extended PSF database 18 that is referred to by the PSF preparing means W3-3 is stored in the HDD 95, and a control system for the cooling fan 97 is defined. The PSF preparing means W3-3 and the control system for the cooling fan 97 are automatically executed after being initialized when the power supply switch 87 is turned on. However, the PSF preparing means W3-3 and the control system for the cooling fan 97 operate on an environment provided by the Windows (registered trademark) OS. Thus, various interfaces and functions provided by the Windows (registered trademark) OS can be used directly, and communication using LAN or USB is constantly available. Furthermore, operation on the environment provided by the Windows (registered trademark) OS allows sophisticated control. This reduces the risk of failure due to a temperature rise inside the first set-top box 81.

The HDD 95 stores Windows (registered trademark) OS (not shown), C++ (not shown), etc. as well as the PSF-preparing-means implementing program 94 and the extended PSF database 18. The HDD 95 may be any HDD as long as it has a capacity not less than 1 TBytes, allows high-speed random read/write operations, has a bus interface and a buffer having a capacity not less than 8 Mbytes, and has specifications such that data and signals are sent and received and electric power is supplied via the bus cable 55. Although various kinds of HDDs are available on the market, an HDD of the 2.5-inch size is preferred, considering the space.

The up-converter circuit board 91, the TV-video input board 51, the super-resolution TV-video output board 52, and the super-resolution-processing-mode switching control circuit board 53 have to be custom fabricated using FPGAs. However, as for the up-converter circuit board 91 and the power-supply circuit board 96, it is possible to purchase existing products satisfying design specifications on the market.

Figure 30:
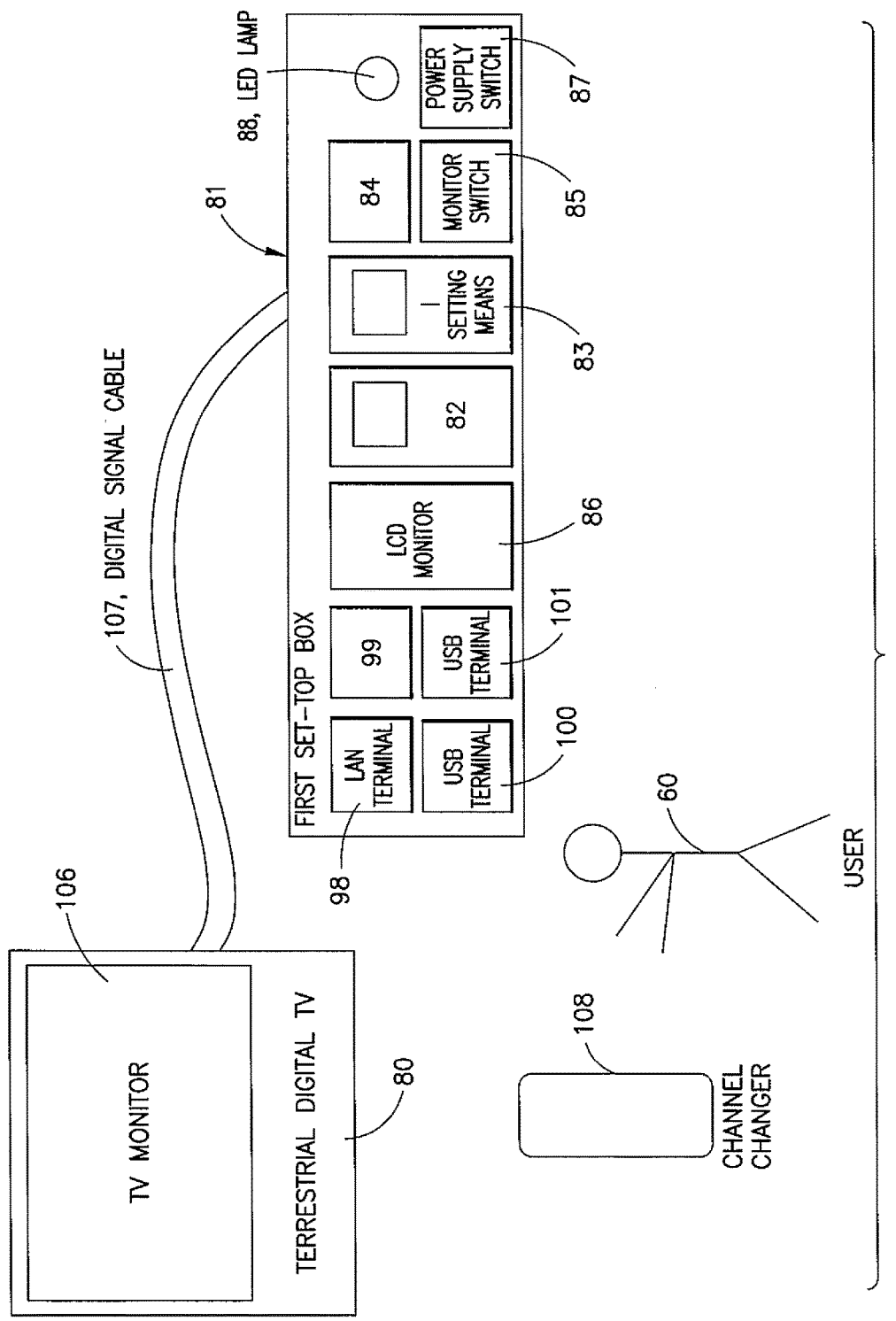
FIG. 30 is an illustration showing an example of the set-up state of the first set-top box according to the present invention.

FIG. 30 shows an example of the set-up state of the first set-top box 81. Referring to FIG. 30, the user 60 connected a digital signal cable 107 extending from a digital-video-signal/audio input/output terminal of the terrestrial digital TV 80 to the digital-TV-video-signal input/output terminal 50 of the first set-top box 81.

Then, the user 60 first turned on the power supply switch 87 of the first set-top box 81 for power-on, then powered on the terrestrial digital TV 80, tuned in to a channel of interest by using a channel changer 108 of the terrestrial digital TV 80, and switched the mode switch 84 to the test mode and the monitor switch 85 to the superimposition mode while viewing TV broadcast video on a TV monitor 106 of the terrestrial digital TV 80. Then, TV broadcast video before super-resolution processing is displayed in the right half of the TV monitor 106, and TV broadcast video after super-resolution processing under default conditions is displayed without delay in the left half of the TV monitor 106. Furthermore, at the top right corner of the TV monitor 106, the default conditions are superimposed on the TV video, specifically, the value of the maximum number of iterations is displayed as "I=6," the degree of blurring is displayed as "F=60," and "test mode" is displayed.

Then, since the optical degradation of the frame was small, the user 60 changed the degradation index 2 from the default value of 60 to 30 among the 256 levels by using the F setting means 70, maintained the maximum number of iterations at the default value of 2 among the 256 values by using the I setting means 83, and checked, on the TV monitor 106, how the image quality changed after the substantially real-time super-resolution processing. As a result, it was found that there was no significant change in the image quality and that values smaller than or equal to the default values work.

Furthermore, the user 60 can then discover a state of optimal image quality by changing the F setting means 82 and the I setting means 83 while checking, on the TV monitor 106, changes in the image quality after the substantially real-time super-resolution processing. Once the super-resolution processing conditions (the setting values of the F setting means 82 and the I setting means 83) are determined, it is possible to enjoy TV broadcast video after the super-resolution processing in full-screen on the TV monitor 106 by switching the mode switch 84. Even in this state, the super-resolution processing conditions can be changed.

Figure 31:
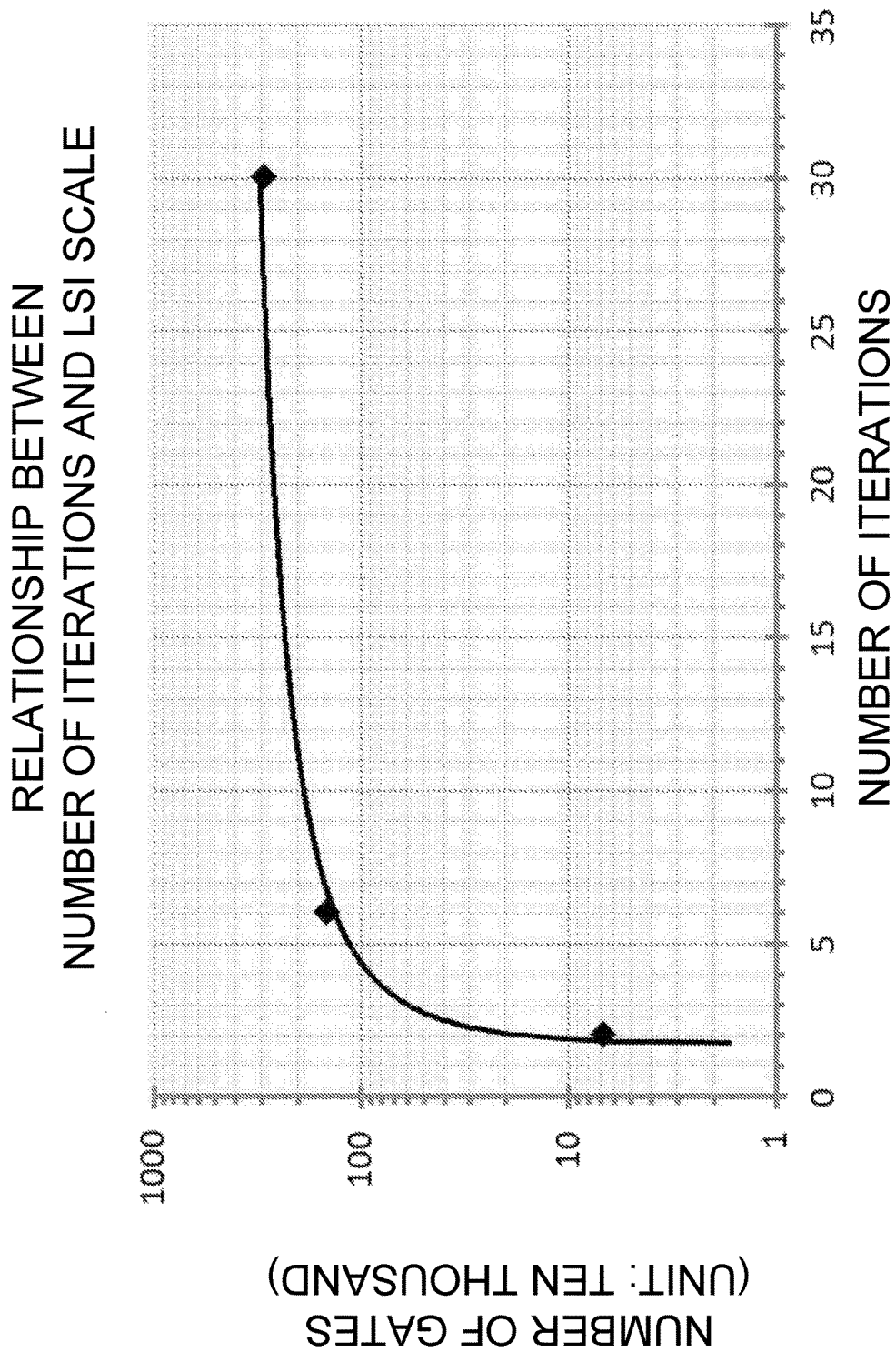
FIG. 31 is a chart showing an example of the relationship between the number of iterations and the LSI scale, based on development data of TV-video super-resolution processing methods by the inventor of the present invention.

FIG. 31 shows an example of the relationship between the number of iterations and the LSI scale based on development data of TV-video super-resolution methods by the inventor of the present invention. The standard of the maximum number of iterations 1 is 2 in the TV-video accelerated super-resolution processing system 49 according to the first embodiment and the first set-top box 81 according to the second embodiment, which are applications of the TV-video accelerated super-resolution processing device 40 based on the TV-video accelerated super-resolution processing method. In FIG. 31, this corresponds to the point at the left end. The second point from the left in FIG. 31 corresponds to the standard maximum number of iterations in the TV-video super-resolution processing method in a related art invented by the inventor of the present invention, which is 6. As is apparent from FIG. 31, as a result of switching from the related art invented by the inventor of the present invention to the TV-video accelerated super-resolution processing method, the number of iterations is reduced to one third, and the number of gates in an FPGA implementation of an image restoring means in the form of an LSI can be reduced considerably from 1.5 million to 70 thousand.

Figure 32:
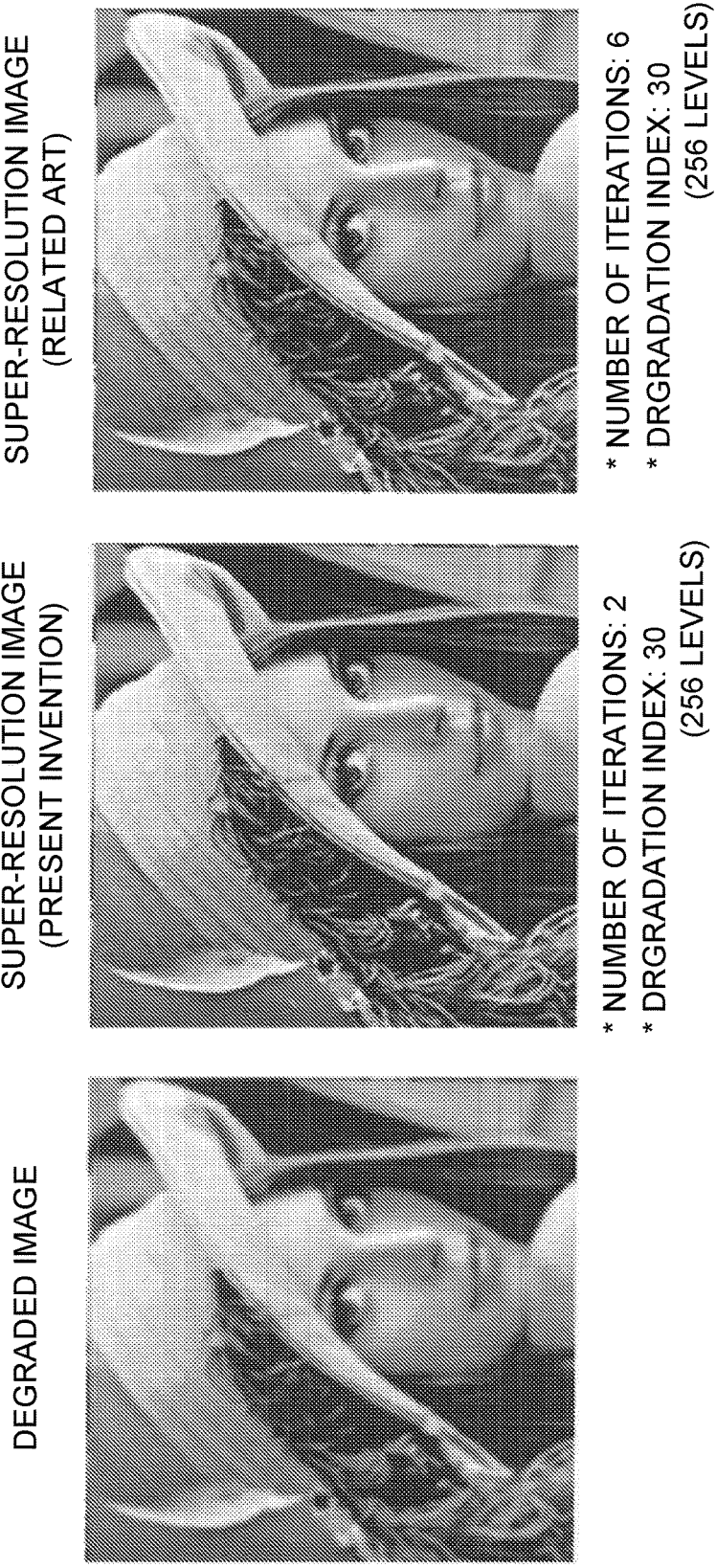
FIG. 32 is a drawing showing an example of comparison of the super-resolution processing quality between related art by the inventor of the present invention and a TV-video accelerated super-resolution processing method.

FIG. 32 shows an example of comparison of the super-resolution processing quality between the related art invented by the inventor of the present invention and the TV-video accelerated super-resolution processing method. The left image in FIG. 32 is an unprocessed degraded image composed of only luminance components of a color standard image. The center image in FIG. 32 is obtained by the TV-video accelerated super-resolution processing, but by using a modification of the first set-top box 81 adapted to processing of one frame instead of video. The maximum number of iterations 1 is 2, and the degradation index 2 is 30. The right image in FIG. 32 is obtained by the related art invented by the inventor of the present invention. The image is obtained by using a set-top box modified so as to be adapted to processing of one frame instead of video. The maximum number of iterations 1 is 6, and the degradation index is 2. It is understood from FIG. 32 that the super-resolution processing quality is better with the TV-video accelerated super-resolution processing method than compared with the related art invented by the inventor of the present invention. This result coincides with the results of many experiments, and the result shown in FIG. 32 is an example demonstrating that the super-resolution processing quality of the TV-video accelerated super-resolution processing method is equivalent to or higher than that of the related art invented by the inventor of the present invention.

Figure 33:
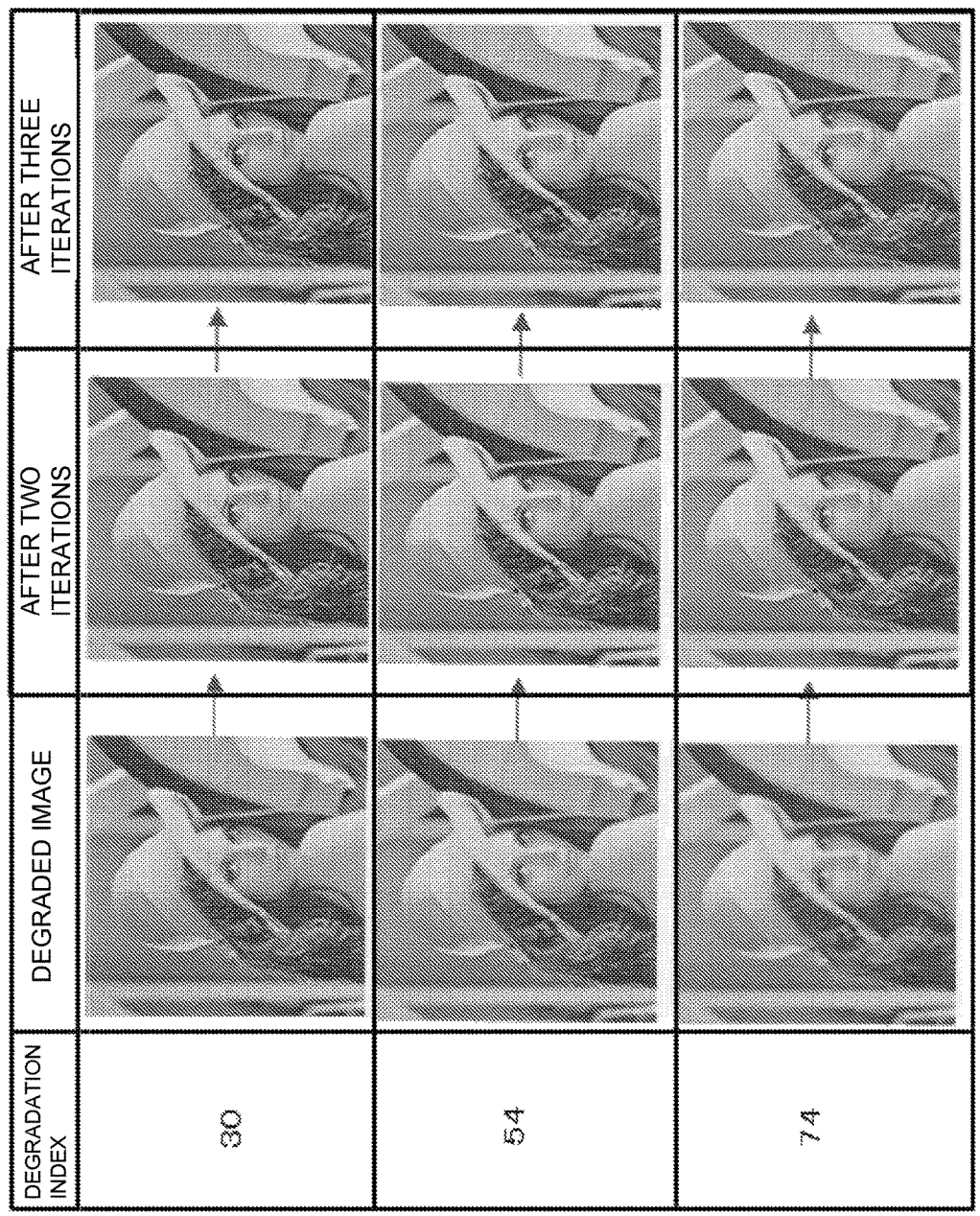
FIG. 33 is a drawing showing an example of the relationship between the degree of degradation of a standard image and the super-resolution processing quality depending on the number of iterations.

FIG. 33 shows an example of the relationship between the degree of degradation of standard images and the number of iterations and the super-resolution processing quality. FIG. 33 summarizes, in relation to degradation indices 2 and maximum numbers of iterations 1, super-resolution processing images obtained by preparing standard images degraded to degrees corresponding to degradation indices 2 of 30, 54, and 74 and executing super-resolution processing with maximum numbers of iterations 1 of 2 and 3 according to the TV-video accelerated super-resolution processing method by using a modification of the first set-top box 81 adapted to processing of one frame instead of video. It is understood from FIG. 33 that the super-resolution processing quality is good and the effect due to the degradation index 2 and the maximum number of iterations 1 can be ignored if the degradation index 2 falls in a range of 30 to 74 and if the maximum number of iterations 1 is at least 2. The range of 30 to 74 of the degradation index 2 falls in a range from standard to quite poor in the current terrestrial digital TV video. Thus, it is understood that the TV-video accelerated super-resolution processing method is suitable for processing of terrestrial digital TV video.

A third embodiment is a second set-top box 109, which is an application of the third aspect of the TV-video accelerated super-resolution processing device 40, in which the second image restoring means 88 of the TV-video accelerated super-resolution processing device 40 according to the present invention is changed to the third restoring means. The hardware configuration of the second set-top box 109 is exactly the same as that of the first set-top box 81. The only difference between the first set-top box 81 and the second set-top box 109 is that the means implemented in the F circuit board 90 is changed from the second image restoring means W88 to the third image restoring means. Thus, FIG. 29 is not redrawn. Furthermore, the only difference between the appearance of the first set-top box 81 and the second set-top box 109 is the reference numbers of these set-top boxes; that is, there is no substantial difference. Thus, FIG. 30 is not redrawn. Also, there is no difference in the super-resolution processing quality, and a result equivalent to that shown in FIG. 28 is obtained.

INDUSTRIAL APPLICABILITY

The present invention is applicable to any application that utilizes TV video. Thus, the present invention can be utilized in the precision equipment industry and electronics industry that develop and manufacture video cameras and digital cameras, the software industry involving applications, games, etc., the medical equipment industry involving endoscopes, MRI, etc., the information equipment industry involving monitors, etc., the anti-disaster and anti-crime equipment industry involving surveillance cameras, etc., the archiving industries, etc.

REFERENCE SIGNS LIST (1) to (9) Inputs by user
(A) to (I) Responses by computer
1 Maximum number of iterations
2 Degradation index
3 Series of PSFs
3 Series of PSF luminance distributions
4 Luminance distribution of degraded image
5 Single-frame TV video signals
6 Estimated luminance distribution of restored-image initial values
7 PSF size
8 Estimated luminance distribution of corrected-restored-image initial values
9 PSF luminance distribution
10 Estimated luminance distribution of restored image
11 Luminance distribution of maximum-likelihood restored image
12 Super-resolution TV video signals
13 PSF database
14 First PSF luminance distribution
15 Luminance distribution of PSF initial values
16 Luminance distribution of maximum-likelihood restored PSF
17 n-th PSF luminance distribution
18 Extended PSF database
19 Luminance distribution of degraded PSF
20 Estimated luminance distribution of restored-PSF initial values
21 Estimated luminance distribution of corrected-restored-PSF initial values
22 Estimated luminance distribution of restored PSF
23 Image filename of PSF luminance distribution 9
24 Second PSF luminance distribution
25 n_max-th PSF luminance distribution
26 Buffer for saving degraded image
27 Buffer for restored-image initial values
28 RGB signals
29 Remaining TV video signals
30 YUV signals
31 Luminance distribution of Y degraded image
32 Distribution of U degraded image
33 Distribution of V degraded image
34 Distribution of YUV restored image
35 Distribution of RGB restored image
36 After restoration
37 Not shown
37 First accelerated super-resolution processing program
38 Second accelerated super-resolution processing program
39 Third accelerated super-resolution processing program
40 TV-video accelerated super-resolution processing device
41 W22
42 Region where computation is difficult
43 Fourth accelerated super-resolution processing program
44 Fifth accelerated super-resolution processing program
45 Sixth accelerated super-resolution processing program
46 First storage medium
47 Second storage medium
48 Computer
49 TV-video accelerated super-resolution processing system
50 Digital-TV-video-signal input/output terminal
51 TV-video input board
52 Super-resolution TV-video output board
53 Super-resolution-processing-mode switching control circuit board
54 Digital TV video cable 55 Bus cable
56 Video-display-mode designating button
56 Not shown
57 Condition-display designating button
57 Not shown
58 TV-video-accelerated-super-resolution-processing-device icon
59 Monitor
60 User
61 TV-video accelerated super-resolution processing device program
62 Super-resolution-processing-window creating program
63 Super-resolution-processing-window monitoring and handling program
64 Super-resolution processing window
65 Keyboard
66 Mouse
67 TV video
68 Super-resolution TV video
69 Video window
70 Information window
71 Degradation-index setting button
72 Maximum-number-of-iterations setting button
73 Super-resolution-processing start button
74 Super-resolution-processing suspend button
75 Super-resolution-processing resume button
76 Super-resolution-processing stop button
77 Help button
78 Video enlarge/reduce button
79 Close button
80 Terrestrial digital TV
81 First set-top box
82 F setting means
83 I setting means
84 Mode switch
85 Monitor switch
86 LCD monitor
87 Power supply switch
88 LED lamp
89 Case
90 F circuit board
91 Up-converter circuit board
92 Computer
93 Not shown
94 PSF-preparing-means implementing program
95 HDD
96 Power-supply circuit board
97 Heat dissipating fan
98 LAN terminal
99 USB terminal
100 USB terminal
101 USB terminal
102 Commercial AC single-phase 100-V power supply cable
103 Power supply cable
104 Signal line
105 Signal line
106 TV monitor
106 Not shown
107 Digital signal cable
108 Channel changer
109 Second set-top box
F Degradation index
FCN 13 Thirteenth function
FCN 14 Fourteenth function
FCN 15 Fifteenth function
FNC 16 Sixteenth function
FNC 17 Seventeenth function
FNC 18 Eighteenth function
FNC 19 Nineteenth function
FNC 20 Twentieth function
FNC 21 Twenty-first function
FNC 22 Twenty-second function
FNC 23 Twenty-third function
FNC 24 Twenty-fourth function
I Number of iterations
S1 Step
S2 Degradation-index designating step
S3 PSF preparing step
S3-2 Second aspect of PSF preparing step S3
S3-3 Third aspect of PSF preparing step S3
S4 Degraded-image preparing step
S5 Restored-image-initial-value preparing step
S6 PSF-size obtaining step
S7 First resetting step
S8 Step
S8 First restored-image-initial-value correcting step
S9 PSF selecting step
S10 to S18 Steps
S19 Preparing step
S20 First image restoring step
S21 First accelerated super-resolution processing step
S22 TV-video rendering step
S30 to S63 Steps
S64 PSF restoring step
S65 to S76 Steps
S80 PSF providing step
S81 First single-iteration image restoring step
S81-1 First iteration of first single-iteration image restoring step
S81-2 Second iteration of first single-iteration image restoring step
S81-$n$_max n_max-th iteration of first single-iteration image restoring step
S81-$n$ n-th iteration of first single-iteration image restoring step
S82 to S87 Steps
S88 Second image restoring step
S90 to S106 Steps
S107 Third image restoring step
S110 RGB-signal extracting step
S111 Delaying step
S112 YUV conversion step
S113 Y-degraded-image extracting step
S114 Degamma processing step
S120 to S124 Steps
W1 Means
W2 Degradation-index designating means
W3 PSF preparing means
W3-2 Second aspect of PSF preparing means
W3-3 Third aspect of PSF preparing means
W4 Degraded-image preparing means
W5 Restored-image-initial-value preparing means
W6 PSF-size obtaining means
W7 First resetting means
W8 Means
W8 First restored-image-initial-value correcting means
W9 PSF selecting means
W10 to W18 Means
W19 Preparing means
W20 First image restoring means
W21 First accelerated super-resolution processing means
W22 TV-video rendering means
W30 to W63 Means
W64 PSF restoring means W70 to W80 Means
W81 First single-iteration image restoring means
W81-1 First stage of first single-iteration image restoring means
W81-2 Second stage of first single-iteration image restoring means
W81-$n$_max $n$_max-th stage of first single-iteration image restoring means
W81-$n$ n-th stage of first single-iteration image restoring means
W82 to W87 Means
W88 Second image restoring means
W96 to W106 Means
W107 Third image restoring means
W110 RGB-signal extracting means
W111 Delaying means
W112 YUV conversion means
W113 Y-degraded-image extracting means
W114 Degamma processing means
W120 to W124 Means
}

The invention claimed is:

1. A TV-video accelerated super-resolution processing method for reducing optical degradation from a frame included in single-frame TV video signals to restore degraded TV video signals to pre-degradation single-frame TV video signals, the TV-video accelerated super-resolution processing method characterized by comprising:

(S1) a step of setting a maximum number of iterations;
(S2) a degradation-index designating step of designating a degradation index suitable for a degradation state of the TV video while the TV video is being viewed;
(S3) a PSF (Point Spread Function) preparing step of preparing a first PSF luminance distribution associated with the degradation index and a series of PSF luminance distributions derived from the first PSF luminance distribution and organized in association with numbers of iterations;
(S4) a degraded-image preparing step of preparing, from single-frame TV video signals, a luminance distribution of a degraded image constituted of a single-frame luminance distribution;
(S5) a restored-image-initial-value preparing step of setting the luminance distribution of the degraded image as an estimated luminance distribution of restored-image initial values;
(S6) a PSF-size obtaining step of obtaining a PSF size, the PSF size referring to an image size that is the same among the series of PSF luminance distributions;
(S7) a first resetting step of setting a counter that counts the number of iterations to 1;
(S8) a first restored-image-initial-value correcting step of copying the estimated luminance distribution of the restored-image initial values, setting the estimated luminance distribution as an estimated luminance distribution of corrected-restored-image initial values, and correcting the estimated luminance distribution of the corrected-restored-image initial values on the basis of the PSF size;
(S9) a PSF selecting step of selecting one PSF luminance distribution associated with the value of the counter from the series of PSF luminance distributions and setting the selected one as a PSF luminance distribution;
(S10) a step of convolving the estimated luminance distribution of the corrected-restored-image initial values with the PSF luminance distribution to obtain a first function;
(S11) a step of inverting the first function to obtain a second function;
(S12) a step of multiplying the second function by the luminance distribution of the degraded image to obtain a third function;
(S13) a step of multiplying the estimated luminance distribution of the restored-image initial values by the third function to obtain an estimated luminance distribution of a restored image;
(S14) a step of incrementing the counter by 1;
(S15) a step of testing a hypothesis that the value of the counter is greater than or equal to the maximum number of iterations, proceeding to step (S16) if the test result is false, and proceeding to step (S18) if the test result is true;
(S16) a step of substituting the estimated luminance distribution of the restored image for the estimated luminance distribution of the restored-image initial values;
(S17) a step of returning to step (S8);
(S18) a step of outputting the estimated luminance distribution of the restored image as a luminance distribution of a maximum-likelihood restored image;
(S19) a preparing step constituted of steps (S1) to (S7);
(S20) a first image restoring step constituted of steps (S8) to (S18), and the TV-video accelerated super-resolution processing method also characterized by comprising:

(S21) a first accelerated super-resolution processing step of completing the maximum number of iterations by executing iterations in ascending order of the index on S of steps in the preparing step S19 and the first image restoring step S20 and outputting the luminance distribution of the maximum-likelihood restored image; and
(S22) a TV-video rendering step of rendering the luminance distribution of the maximum-likelihood restored image into single-frame TV video signals and outputting the TV video signals as super-resolution TV video signals.

2. A TV-video accelerated super-resolution processing method according to claim 1, characterized in that a second aspect of the PSF preparing step includes:

(S30) a step of searching, by using the degradation index, a PSF database created by organizing PSF luminance distributions in one-to-one association with degradation indices and setting a hit PSF luminance distribution as a first PSF luminance distribution;
(S31) a step of inputting 1 to and thereby resetting a second counter that counts numbers;
(S32) a step of setting the first PSF luminance distribution as a luminance distribution of PSF initial values;
(S33) a step of incrementing the second counter by 1;
(S34) a step of testing a hypothesis that the value of the second counter has exceeded the maximum number of iterations, proceeding to step (S35) if the test result is false, and jumping to step (S38) if the test result is true;
(S35) a step of restoring a luminance distribution of PSF initial values through a PSF restoring step to obtain a luminance distribution of a maximum-likelihood restored PSF;

(S36) a step of setting the luminance distribution of the maximum-likelihood restored PSF as an n-th PSF luminance distribution, where n signifies the value of the second counter;

(S37) a step of returning to step (S33); and (S38) a step of connecting the first PSF luminance distribution to the n_max-th PSF luminance distribution in that order to form a series of PSF luminance distributions, where n_max signifies the maximum number of iterations and n signifies a natural number less than n_max, and labeling the series of PSF luminance distributions with the degradation indices to create the series of PSF luminance distributions associated with the degradation indices.

3. A TV-video accelerated super-resolution processing method according to claim 2, characterized in that the PSF restoring step includes:

(S50) a step of assigning 6 to the maximum number of iterations;

(S51) a step of considering the luminance distribution of the PSF initial values as a luminance distribution of a degraded image and setting the luminance distribution as a degraded PSF luminance distribution;

(S52) a step of setting the luminance distribution of the PSF initial values as an estimated luminance distribution of restored PSF initial values;

(S53) a step of assigning 1 to and thereby resetting the counter;

(S54) a restored-PSF-initial-value correcting step of setting the estimated luminance distribution of the restored-PSF initial values as an estimated luminance distribution of corrected-restored-PSF initial values and, when convolving the luminance distribution of the PSF initial values with the estimated luminance distribution of the corrected-restored-PSF initial values, calculating a region where computation is difficult, the region occurring in a peripheral region in the estimated luminance distribution of the corrected-restored-PSF initial values, on the basis of the image size of the luminance distribution of the PSF initial values, copying the pixels associated with a top-edge boundary in the region where computation is difficult, pasting the copied pixels to the outside of the top-edge boundary of the estimated luminance distribution of the corrected-restored-PSF initial values in mirror symmetry with respect to the top-edge boundary, and executing similar computations clockwise for a right edge, a bottom edge, and finally a left edge, thereby correcting the estimated luminance distribution of the corrected-restored-PSF initial values;

(S55) a step of convolving the luminance distribution of the PSF initial values with the estimated luminance distribution of the corrected-restored-PSF initial values to obtain a fourth function;

(S56) a step of inverting the fourth function to obtain a fifth function;

(S57) a step of multiplying the fifth function by the degraded PSF luminance distribution to obtain a sixth function;

(S58) a step of multiplying the estimated luminance distribution of the restored-PSF initial values by the sixth function to obtain an estimated luminance distribution of a restored PSF;

(S59) a step of incrementing the counter by 1;

(S60) a step of testing a hypothesis that the value of the counter has exceeded the maximum number of iterations, proceeding to step (S61) if the test result is false, and jumping to step (S63) if the test result is true;

(S61) a step of substituting the estimated luminance distribution of the restored PSF for the estimated luminance distribution of the restored-PSF initial values;

(S62) a step of jumping to step (S54); and (S63) a step of outputting the estimated luminance distribution of the restored PSF as a luminance distribution of a maximum-likelihood restored PSF.

4. A TV-video accelerated super-resolution processing method according to claim 1, characterized in that a third aspect of the PSF preparing step includes:

(S40) a step of setting the maximum number of iterations to 5;

(S41) a step of executing the PSF preparing step in advance for all the pairs of degradation indices and PSF luminance distributions associated therewith in the PSF database to obtain a series of PSF luminance distributions for each of the degradation indices and editing the series of PSF luminance distributions for each of the degradation indices to prepare an extended PSF database in which the series of PSF luminance distributions is organized in association with the degradation indices; and (S42) a step of searching the extended PSF database by using the degradation index and retrieving and outputting a hit series of PSF luminance distributions.

5. A TV-video accelerated super-resolution processing method according to claim 1, characterized in that the first restored-image-initial-value correcting step includes:

(S70) a step of setting the estimated luminance distribution of the restored-image initial values as an estimated luminance distribution of corrected-restored-image initial values;

(S71) a step of calculating, on the basis of the PSF size, a region where computation is difficult, the region occurring in a peripheral region in the estimated luminance distribution of the corrected-restored-image initial values when convolving one of the series of PSF luminance distributions with the estimated luminance distribution of the corrected-restored-image initial values;

(S72) a step of copying the pixels in the region where computation is difficult in the estimated luminance distribution of the corrected-restored-image initial values, individually inverting the copied pixels in mirror symmetry with respect to the four edges of the estimated luminance distribution of the corrected-restored-image initial values, and pasting the pixels to the outside of the boundaries at the four edges of the estimated luminance distribution of the corrected-restored-image initial values to correct the estimated luminance distribution;

(S73) a step of copying the pixels in a top-left corner region in the region where computation is difficult in the estimated luminance distribution of the corrected-restored-image initial values, rotating the copied pixels in the top-left corner region by 180 degrees about the vertex at the top-left corner, and pasting the pixels to a blank region generated in the top-left corner region of the estimated luminance distribution of the corrected-restored-image initial values to correct the estimated luminance distribution;

(S74) a step of copying the pixels in a top-right corner region in the region where computation is difficult in the estimated luminance distribution of the corrected-restored-image initial values, rotating the copied pixels in the top-right corner region by 180 degrees about the vertex at the top-right corner, and pasting the pixels to a blank region generated in the top-right corner region of the estimated luminance distribution of the corrected-restored-image initial values to correct the estimated luminance distribution;

(S75) a step of copying the pixels in a bottom-left corner region in the region where computation is difficult in the estimated luminance distribution of the corrected-restored-image initial values, rotating the copied pixels in the bottom-left corner region by 180 degrees about the vertex at the top-left corner, and pasting the pixels to a blank region generated in the bottom-left corner region of the estimated luminance distribution of the corrected-restored-image initial values to correct the estimated luminance distribution; and (S76) a step of copying the pixels in a bottom-right corner region in the region where computation is difficult in the estimated luminance distribution of the corrected-restored-image initial values, rotating the copied pixels in the bottom-right corner region by 180 degrees about the vertex at the top-right corner, and pasting the pixels to a blank region generated in the bottom-right corner region of the estimated luminance distribution of the corrected-restored-image initial values to correct the estimated luminance distribution.

6. A TV-video accelerated super-resolution processing method according to claim 1, characterized in that:

a second aspect of the first image restoring step includes:

(S80) a PSF providing step of providing an n-th iteration of a first single-iteration image restoring step with an n-th PSF luminance distribution as a PSF luminance distribution among the series of PSF luminance distributions, where n_max signifies the maximum number of iterations and n signifies a natural number less than n_max; and (S81) the single-iteration image restoring step of executing a computation corresponding to one iteration in iterations based on a formula of Bayse probability theory from the PSF luminance distribution, the estimated luminance distribution of the restored-image initial values, and the luminance distribution of the degraded image to obtain and output an estimated luminance distribution of a restored image having a maximum likelihood for the luminance distribution of the degraded image, the single-iteration image restoring step S81 includes:

(S82) a second restored-image-initial-value correcting step, constituted of the same processing procedure as the first restored-image-initial-value correcting step, of correcting the estimated luminance distribution of the restored-image initial values on the basis of the PSF size to obtain an estimated luminance distribution of corrected-restored-image initial values;

(S83) a step of convolving the PSF luminance distribution with the estimated luminance distribution of the corrected-restored-image initial values to obtain a seventh function;

(S84) a step of inverting the seventh function to obtain an eighth function;

(S85) a step of multiplying the eighth function by the luminance distribution of the degraded image to obtain a ninth function;

(S86) a step of multiplying the estimated luminance distribution of the restored-image initial values by the ninth function to obtain an estimated luminance distribution of a restored image; and (S87) a step of outputting the estimated luminance distribution of the restored image, and (S88) the second aspect of the first image restoring step is a second image restoring step constituted of a series connection of n_max iterations configured by connecting the output of step (S87) of the n-th iteration S81-$n$ of the first single-iteration image restoring step to step (S82) of the (n+1)-th iteration S81-($n$+1) of the first single-iteration image restoring step, and in the second image restoring step S88, n_max iterations, corresponding to the number of iterations of the first single-iteration image restoring step S81 connected in series, are executed, and the estimated luminance distribution of the restored image output from the n_max-th iteration S81-$n$_max of the first single-iteration image restoring step is output as a luminance distribution of a maximum-likelihood restored image.

7. A second accelerated super-resolution processing program stored on a non-transitory medium, where the program is configured for causing a computer to execute the method according to claim 6.

8. A TV-video super-resolution processing method according to claim 1, characterized in that:

a third aspect of the first image restoring step includes:

(S90) a step of assigning 0 to and thereby resetting the counter;

(S91) a step of assigning 1 to and thereby resetting the second counter;

(S92) a step of testing a hypothesis that the value of the counter is not 0, proceeding to step (S93) if the test result is false, and jumping to step (S96) if the test result is true;

(S93) a step of transferring the luminance distribution of the degraded image to a buffer for saving the degraded image and to a buffer for the restored-image initial values;

(S94) a step of jumping to step (S96);

(S95) a step of transferring an estimated luminance distribution of a restored image in step (S102) to the buffer for the restored-image initial values;

(S96) a step of setting an m-th PSF luminance distribution in the series of PSF luminance distributions as a PSF luminance distribution, where m signifies the value of the second counter;

(S97) a step of reading the estimated luminance distribution of the restored-image initial values from the buffer for the restored-image initial values;

(S98) a third restored-image-initial-value correcting step, constituted of the same processing procedure as the first restored-image-initial-value correcting step, of correcting the estimated luminance distribution of the restored-image initial values on the basis of the PSF size and setting the result as an estimated luminance distribution of corrected-restored-image initial values;

(S99) a step of convolving the PSF luminance distribution with the estimated luminance distribution of the corrected-restored-image initial values to obtain a tenth function;

(S100) a step of inverting the tenth function to obtain an eleventh function;

(S101) a step of reading the luminance distribution of the degraded image from the buffer for saving the degraded image and multiplying the eleventh function by the luminance distribution to obtain a twelfth function;

(S102) a step of multiplying the estimated luminance distribution of the restored-image initial values by the twelfth function to obtain an estimated luminance distribution of a restored image;

(S103) a step of incrementing the counter by 1;

(S104) a step of incrementing the second counter by 1;

(S105) a step of testing a hypothesis that the value of the counter has exceeded the maximum number of iterations, jumping to step (S95) to the buffer for the restored-image initial values if the test result is false, and proceeding to step (S106) if the test result is true; and (S106) a step of outputting the estimated luminance distribution of the restored image as a luminance distribution of a maximum-likelihood restored image, and (S107) the third aspect of the first image restoring step is a third image restoring step of completing the maximum number of iterations by executing iterations in ascending order of the index on S in the individual steps and outputting the maximum-likelihood restored image having a maximum likelihood.

9. A third accelerated super-resolution processing program stored on a non-transitory medium, where the program is configured for causing a computer to execute the method according to claim 8.

10. A TV-video accelerated super-resolution processing method according to claim 1, characterized in that the degraded-image preparing step includes:

(S110) an RGB-signal extracting step of extracting RGB signals constituting a frame from single-frame TV video signals;

(S111) a delaying step of outputting, with a delay corresponding to one frame, the TV video signals remaining after extracting the RGB signals from the single-frame TV video signals;

(S112) a YUV conversion step of subjecting the RGB signals to YUV conversion to obtain YUV signals;

(S113) a Y-degraded-image extracting step of extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and (S114) a degamma processing step of executing degamma processing of the luminance distribution of the Y degraded image to obtain and output a luminance distribution of a degraded image constituted of a single-frame luminance distribution.

11. A TV-video accelerated super-resolution processing method according to claim 1, characterized in that the TV-video rendering step includes:

(S120) a gamma processing step of executing gamma processing of the luminance distribution of the maximum-likelihood restored image;

(S121) a restored-image combining step of combining the distribution of the U degraded image and the distribution of the V degraded image kept in the Y-degraded-image extracting step with the luminance distribution of the maximum-likelihood restored image after the gamma processing constituted of Y components to obtain a distribution of a single YUV restored image;

(S122) an RGB conversion step of executing RGB conversion of the distribution of the YUV restored image to obtain a distribution of an RGB restored image;

(S123) an RGB-signal conversion step of reading the distribution of the RGB restored image and outputting RGB signals; and (S124) a TV-video-signal combining step of combining the RGB signals with the remaining TV video signals output in the delaying step to obtain and output super-resolution TV video signals constituted of single-frame TV video signals.

12. A TV-video accelerated super-resolution processing method according to claim 1, characterized in that the PSF luminance distributions are constituted of frameless square pixels of the same size, constitute two-dimensional normal distributions in which the centers are brightest, and have a size of 5×5 pixels.

13. A computer program product comprising a non-transitory computer readable medium including a first accelerated super-resolution processing program for a data processing apparatus, comprising software code portions for causing the data processing apparatus to execute the preparing step and first image restoring step described in claim 1.

14. A TV-video accelerated super-resolution processing device for reducing optical degradation from a frame included in single-frame TV video signals to restore the degraded TV video signals to the pre-degradation single-frame TV video signals in accordance with the TV-video accelerated super-resolution processing methods according to claim 1, the TV-video accelerated super-resolution processing device characterized by comprising:

(W1) a means for setting a maximum number of iterations;

(W2) a degradation-index designating means for designating a degradation index suitable for a degradation state of the TV video while the TV video is being viewed;

(W3) a PSF preparing means for preparing a first PSF luminance distribution associated with the degradation index and a series of PSF luminance distributions derived from the first PSF luminance distribution and organized in association with numbers of iterations;

(W4) a degraded-image preparing means for preparing, from single-frame TV video signals, a luminance distribution of a degraded image constituted of a single-frame luminance distribution;

(W5) a restored-image-initial-value preparing means for setting the luminance distribution of the degraded image as an estimated luminance distribution of restored-image initial values;

(W6) a PSF-size obtaining means for obtaining a PSF size, the PSF size referring to an image size that is the same among the series of PSF luminance distributions;

(W7) a first resetting means for setting a counter that counts the number of iterations to 1;

(W8) a first restored-image-initial-value correcting means for copying the estimated luminance distribution of the restored-image initial values, setting the estimated luminance distribution as an estimated luminance distribution of corrected-restored-image initial values, and correcting the estimated luminance distribution of the corrected-restored-image initial values on the basis of the PSF size;

(W9) a PSF selecting means for selecting one PSF luminance distribution associated with the value of the counter from the series of PSF luminance distributions and setting the selected one as a PSF luminance distribution;

(W10) a means for convolving the estimated luminance distribution of the corrected-restored-image initial values with the PSF luminance distribution to obtain a thirteenth function;

(W11) a means for inverting the thirteenth function to obtain a fourteenth function;

(W12) a means for multiplying the fourteenth function by the luminance distribution of the degraded image to obtain a fifteenth function;

(W13) a means for multiplying the estimated luminance distribution of the restored-image initial values by the fifteenth function to obtain an estimated luminance distribution of a restored image;

(W14) a means for incrementing the counter by 1;

(W15) a means for testing a hypothesis that the value of the counter is greater than or equal to the maximum number of iterations, proceeding to means (W16) if the test result is false, and proceeding to means (W18) if the test result is true;

(W16) a means for substituting the estimated luminance distribution of the restored image for the estimated luminance distribution of the restored-image initial values;

(W17) a means for returning to means (W8);

(W18) a means for outputting the estimated luminance distribution of the restored image as a luminance distribution of a maximum-likelihood restored image;

(W19) a preparing means constituted of means (W1) to (W7);

(W20) a first image restoring means constituted of means (W8) to (W18), and the TV-video accelerated super-resolution processing device also characterized by comprising:

(W21) a first accelerated super-resolution processing means for completing the maximum number of iterations by executing iterations in ascending order of the index on W of means in the preparing means W19 and the first image restoring means W20 and outputting the luminance distribution of the maximum-likelihood restored image; and (W22) a TV-video rendering means for rendering the luminance distribution of the maximum-likelihood restored image into single-frame TV video signals and outputting the TV video signals as super-resolution TV video signals.

15. A TV-video accelerated super-resolution processing device according to claim 14, characterized in that a second aspect of the PSF preparing means includes:

(W30) a means for searching, by using the degradation index, a PSF database created by organizing PSF luminance distributions in one-to-one association with degradation indices and setting a hit PSF luminance distribution as a first PSF luminance distribution;

(W31) a means for inputting 1 to and thereby resetting a second counter that counts numbers;

(W32) a means for setting the first PSF luminance distribution as a luminance distribution of PSF initial values;

(W33) a means for incrementing the second counter by 1;

(W34) a means for testing a hypothesis that the value of the second counter has exceeded the maximum number of iterations, proceeding to means (W35) if the test result is false, and jumping to means (W38) if the test result is true;

(W35) a means for restoring a luminance distribution of PSF initial values with a PSF restoring means to obtain a luminance distribution of a maximum-likelihood restored PSF;

(W36) a means for setting the luminance distribution of the maximum-likelihood restored PSF as an n-th PSF luminance distribution, where n signifies the value of the second counter;

(W37) a means for returning to means (W33); and (W38) a means for connecting the first PSF luminance distribution to the n_max-th PSF luminance distribution in that order to form a series of PSF luminance distributions, where n_max signifies the maximum number of iterations and n signifies a natural number less than n_max, and labeling the series of PSF luminance distributions with the degradation indices to create the series of PSF luminance distributions associated with the degradation indices.

16. A TV-video accelerated super-resolution processing device according to claim 15, characterized in that the PSF restoring means includes:

(W50) a means for assigning 6 to the maximum number of iterations;

(W51) a means for considering the luminance distribution of the PSF initial values as a luminance distribution of a degraded image and setting the luminance distribution as a degraded PSF luminance distribution;

(W52) a means for setting the luminance distribution of the PSF initial values as an estimated luminance distribution of restored PSF initial values;

(W53) a means for assigning 1 to and thereby resetting the counter;

(W54) a restored-PSF-initial-value correcting means for setting the estimated luminance distribution of the restored-PSF initial values as an estimated luminance distribution of corrected-restored-PSF initial values and, when convolving the luminance distribution of the PSF initial values with the estimated luminance distribution of the corrected-restored-PSF initial values, calculating a region where computation is difficult, the region occurring in a peripheral region in the estimated luminance distribution of the corrected-restored-PSF initial values, on the basis of the image size of the luminance distribution of the PSF initial values, copying the pixels associated with a top-edge boundary in the region where computation is difficult, pasting the copied pixels to the outside of the top-edge boundary of the estimated luminance distribution of the corrected-restored-PSF initial values in mirror symmetry with respect to the top-edge boundary, and executing similar computations clockwise for a right edge, a bottom edge, and finally a left edge, thereby correcting the estimated luminance distribution of the corrected-restored-PSF initial values;

(W55) a means for convolving the luminance distribution of the PSF initial values with the estimated luminance distribution of the corrected-restored-PSF initial values to obtain a sixteenth function;

(W56) a means for inverting the sixteenth function to obtain a seventeenth function;

(W57) a means for multiplying the seventeenth function by the degraded PSF luminance distribution to obtain an eighteenth function;

(W58) a means for multiplying the estimated luminance distribution of the restored-PSF initial values by the eighteenth function to obtain an estimated luminance distribution of a restored PSF;

(W59) a means for incrementing the counter by 1;

(W60) a means for testing a hypothesis that the value of the counter has exceeded the maximum number of iterations, proceeding to means (W61) if the test result is false, and jumping to means (W63) if the test result is true;

(W61) a means for substituting the estimated luminance distribution of the restored PSF for the estimated luminance distribution of the restored-PSF initial values;

(W62) a means for jumping to means (W54); and (W63) a means for outputting the estimated luminance distribution of the restored PSF as a luminance distribution of a maximum-likelihood restored PSF.

17. A TV-video accelerated super-resolution processing device according to claim 14, characterized in that a third aspect of the PSF preparing means includes:

(W40) a means for setting the maximum number of iterations to 5;

(W41) a means for executing the PSF preparing means in advance for all the pairs of degradation indices and PSF luminance distributions associated therewith in the PSF database to obtain a series of PSF luminance distributions for each of the degradation indices and editing the series of PSF luminance distributions for each of the degradation indices to prepare an extended PSF database in which the series of PSF luminance distributions is organized in association with the degradation indices; and (W42) a means for searching the extended PSF database by using the degradation index and retrieving and outputting a hit series of PSF luminance distributions.

18. A TV-video accelerated super-resolution processing device according to claim 14, characterized in that the first restored-image-initial-value correcting means includes:

(W70) a means for setting the estimated luminance distribution of the restored-image initial values as an estimated luminance distribution of corrected-restored-image initial values;

(W71) a means for calculating, on the basis of the PSF size, a region where computation is difficult, the region occurring in a peripheral region in the estimated luminance distribution of the corrected-restored-image initial values when convolving one of the series of PSF luminance distributions with the estimated luminance distribution of the corrected-restored-image initial values;

(W72) a means for copying the pixels in the region where computation is difficult in the estimated luminance distribution of the corrected-restored-image initial values, individually inverting the copied pixels in mirror symmetry with respect to the four edges of the estimated luminance distribution of the corrected-restored-image initial values, and pasting the pixels to the outside of the boundaries at the four edges of the estimated luminance distribution of the corrected-restored-image initial values to correct the estimated luminance distribution;

(W73) a means for copying the pixels in a top-left corner region in the region where computation is difficult in the estimated luminance distribution of the corrected-restored-image initial values, rotating the copied pixels in the top-left corner region by 180 degrees about the vertex at the top-left corner, and pasting the pixels to a blank region generated in the top-left corner region of the estimated luminance distribution of the corrected-restored-image initial values to correct the estimated luminance distribution;

(W74) a means for copying the pixels in a top-right corner region in the region where computation is difficult in the estimated luminance distribution of the corrected-restored-image initial values, rotating the copied pixels in the top-right corner region by 180 degrees about the vertex at the top-right corner, and pasting the pixels to a blank region generated in the top-right corner region of the estimated luminance distribution of the corrected-restored-image initial values to correct the estimated luminance distribution;

(W75) a means for copying the pixels in a bottom-left corner region in the region where computation is difficult in the estimated luminance distribution of the corrected-restored-image initial values, rotating the copied pixels in the bottom-left corner region by 180 degrees about the vertex at the top-left corner, and pasting the pixels to a blank region generated in the bottom-left corner region of the estimated luminance distribution of the corrected-restored-image initial values to correct the estimated luminance distribution; and (W76) a means for copying the pixels in a bottom-right corner region in the region where computation is difficult in the estimated luminance distribution of the corrected-restored-image initial values, rotating the copied pixels in the bottom-right corner region by 180 degrees about the vertex at the top-right corner, and pasting the pixels to a blank region generated in the bottom-right corner region of the estimated luminance distribution of the corrected-restored-image initial values to correct the estimated luminance distribution.

19. A TV-video accelerated super-resolution processing device according to claim 14, characterized in that:

a second aspect of the first image restoring means includes:

(W80) a PSF providing means for providing an n-th stage of a first single-iteration image restoring means with an n-th PSF luminance distribution as a PSF luminance distribution among the series of PSF luminance distributions, where n_max signifies the maximum number of iterations and n signifies a natural number less than n_max;

(W81) the single-iteration image restoring means for executing a computation corresponding to one iteration in iterations based on a formula of Bayse probability theory from the PSF luminance distribution, the estimated luminance distribution of the restored-image initial values, and the luminance distribution of the degraded image to obtain and output an estimated luminance distribution of a restored image having a maximum likelihood for the luminance distribution of the degraded image;

the single-iteration image restoring means includes:

(W82) a means for obtaining an estimated luminance distribution of corrected-restored-image initial values by a second restored-image-initial-value correcting means constituted of the same configuration as the first restored-image-initial-value correcting means;

(W83) a means for convolving the PSF luminance distribution with the estimated luminance distribution of the corrected-restored-image initial values to obtain a nineteenth function;

(W84) a means for inverting the nineteenth function to obtain a twentieth function;

(W85) a means for multiplying the twentieth function by the luminance distribution of the degraded image to obtain a twenty-first function;

(W86) a means for multiplying the estimated luminance distribution of the restored-image initial values by the twenty-first function to obtain an estimated luminance distribution of a restored image; and (W87) a means for outputting the estimated luminance distribution of the restored image, and (W88) the second aspect of the first image restoring means is a second image restoring means constituted of a series connection of n_max stages configured by connecting the output of means (W87) of the n-th stage W81-$n$ of the first single-iteration image restoring means to means (W82) of the (n+1)-th stage W81-($n$+1) of the first single-iteration image restoring means, and in the second image restoring means W88, n_max iterations, corresponding to the number of stages of the first single-iteration image restoring means W81 connected in series, are executed, and the estimated luminance distribution of the restored image output from the n_max-th stage W81-$n$_max of the first single-iteration image restoring means is output as a luminance distribution of a maximum-likelihood restored image.

20. A TV-video super-resolution processing device according to claim 14, characterized in that:
a third aspect of the first image restoring means includes:
(W90) a means for assigning 0 to and thereby resetting the counter;
(W91) a means for assigning 1 to and thereby resetting the second counter;
(W92) a means for testing a hypothesis that the value of the counter is not 0, proceeding to means (W93) if the test result is false, and jumping to means (W96) if the test result is true;
(W93) a means for transferring the luminance distribution of the degraded image to a buffer for saving the degraded image and to a buffer for the restored-image initial values;
(W94) a means for jumping to means (W96);
(W95) a means for transferring an estimated luminance distribution of a restored image of means (W102) to the buffer for the restored-image initial values;
(W96) a means for setting an m-th PSF luminance distribution in the series of PSF luminance distributions as a PSF luminance distribution, where m signifies the value of the second counter;
(W97) a means for reading the estimated luminance distribution of the restored-image initial values from the buffer for the restored-image initial values;
(W98) a third restored-image-initial-value correcting means, constituted of the same configuration as the first restored-image-initial-value correcting means, for correcting the estimated luminance distribution of the restored-image initial values and setting the estimated luminance distribution as an estimated luminance distribution of corrected-restored-image initial values;
(W99) a means for convolving the PSF luminance distribution with the estimated luminance distribution of the corrected-restored-image initial values to obtain a twenty-second function;
(W100) a means for inverting the twenty-second function to obtain a twenty-third function;
(W101) a means for multiplying the twenty-third function by the luminance distribution of the degraded image to obtain a twenty-fourth function;
(W102) a means for multiplying the estimated luminance distribution of the restored-image initial values by the twenty-fourth function to obtain an estimated luminance distribution of a restored image;
(W103) a means for incrementing the counter by 1;
(W104) a means for incrementing the second counter by 1;

(W105) a means for testing a hypothesis that the value of the counter has exceeded the maximum number of iterations, jumping to means (W95) if the test result is false, and proceeding to means (W106) if the test result is true; and (W106) a means for outputting the estimated luminance distribution of the restored image as a luminance distribution of a maximum-likelihood restored image, and (W107) the third aspect of the first image restoring means is a third image restoring means for completing the maximum number of iterations by executing iterations in ascending order of the index on S of the individual means and outputting the maximum-likelihood restored image having a maximum likelihood.

21. A TV-video accelerated super-resolution processing device according to claim 14, characterized in that the degraded-image preparing means includes:
(W110) an RGB-signal extracting means for extracting RGB signals constituting a frame from TV video signals for the frame;
(W111) a delaying means for outputting, with a delay corresponding to one frame, the TV video signals remaining after extracting the RGB signals from the single-frame TV video signals;
(W112) a YUV conversion means for subjecting the RGB signals to YUV conversion to obtain YUV signals;
(W113) a Y-degraded-image extracting means for extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and
(W114) a degamma processing means for executing degamma processing of the luminance distribution of the Y degraded image to obtain and output a luminance distribution of a degraded image constituted of a single-frame luminance distribution.

22. A TV-video accelerated super-resolution processing device according to claim 14, characterized in that the TV-video rendering means includes:
(W120) a gamma processing means for executing gamma processing of the luminance distribution of the maximum-likelihood restored image;
(W121) a restored-image combining means for combining the distribution of the U degraded image and the distribution of the V degraded image kept by the Y-degraded-image extracting means with the luminance distribution of the maximum-likelihood restored image after the gamma processing constituted of Y components to obtain a distribution of a single YUV restored image;
(W122) an RGB conversion means for executing RGB conversion of the distribution of the YUV restored image to obtain a distribution of an RGB restored image;
(W123) an RGB-signal conversion means for reading the distribution of the RGB restored image and outputting RGB signals; and (W124) a TV-video-signal combining means for combining the RGB signals with the remaining TV video signals output by the delaying means to obtain and output super-resolution TV video signals constituted of single-frame TV video signals.

\* \* \* \* \*